(12) United States Patent
Hiramatsu et al.

(10) Patent No.: US 6,456,677 B1
(45) Date of Patent: Sep. 24, 2002

(54) SYNCHRONIZATION EQUIPMENT

(75) Inventors: Katsuhiko Hiramatsu; Mitsuru Uesugi; Hiroaki Sudo, all of Yokohama (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 70 days.

(21) Appl. No.: 09/709,650

(22) Filed: Nov. 13, 2000

Related U.S. Application Data

(62) Division of application No. 08/867,806, filed on Jun. 3, 1997, now Pat. No. 6,208,701.

(30) Foreign Application Priority Data

| Jun. 4, 1996 | (JP) | ............................................. 8-142033 |
| Jun. 20, 1996 | (JP) | ............................................. 8-159893 |
| Aug. 5, 1996 | (JP) | ............................................. 8-205823 |
| Nov. 29, 1996 | (JP) | ............................................. 8-320515 |
| Apr. 8, 1997 | (JP) | ............................................. 9-089824 |

(51) Int. Cl.[7] .............................................. H04L 7/00
(52) U.S. Cl. ..................................... 375/354; 375/355
(58) Field of Search ................................ 375/363, 340, 375/354, 355, 373, 360

(56) References Cited

U.S. PATENT DOCUMENTS

| 4,166,979 A | * | 9/1979 | Waggner ..................... 375/376 |
| 4,189,622 A | | 2/1980 | Foshee ........................ 178/69.1 |
| 5,444,697 A | * | 8/1995 | Leung et al. ................ 375/362 |
| 5,452,331 A | | 9/1995 | Shihabi et al. .............. 375/324 |
| 5,586,150 A | | 12/1996 | Balasubramaniam ....... 375/354 |
| 5,764,706 A | | 6/1998 | Carlin et al. ................. 375/355 |

FOREIGN PATENT DOCUMENTS

| EP | 0 480 165 A | 2/1992 |
| GB | 2 253 122 A | 8/1992 |
| JP | 7-307730 A | 11/1995 |

OTHER PUBLICATIONS

Edward A. Lee et al, "Digital Communication," Kluwer Academic Publisher, Boston/Dordercht/London, pp. 569–571 (1988).
T. Hata et al, "How To Use PLL–IC," Akiba, pp. 20–32, Nov. 1976.

* cited by examiner

*Primary Examiner*—Tesfaldet Bocure
(74) *Attorney, Agent, or Firm*—Venable; Robert J. Frank; Catherine M. Voorhees

(57) ABSTRACT

The synchronizing apparatus includes a block for detecting a code from an input signal, a block for detecting from the code the variable points of the code at several times as high as the symbol rate, a block for calculating a histogram of the detected variables of the code to time, and a block for deciding that the phase number at which the calculated histogram takes the maximum value is a symbol synchronization point. This synchronizing apparatus detects the zero-cross points of an intermediate frequency band signal at N times as high as the symbol rate. It also calculates a histogram of detected time (0 to N–1). The time (0 to N–1) at which the histogram is the maximum within a predetermined detected time is selected as a symbol clock, and thereby symbol synchronization is established.

11 Claims, 47 Drawing Sheets

FIG. 39A SIGNAL A
FIG. 39B SIGNAL B
FIG. 39C SIGNAL C
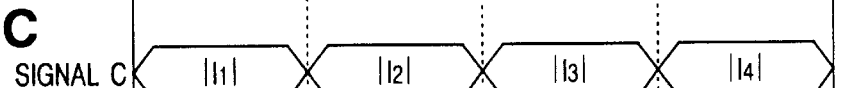
FIG. 39D SIGNAL D
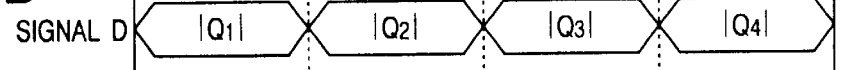
FIG. 39E SIGNAL E
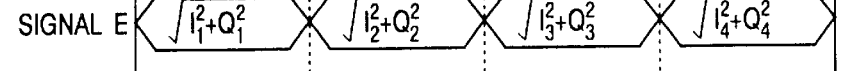
FIG. 39F SIGNAL F
FIG. 39G SIGNAL G
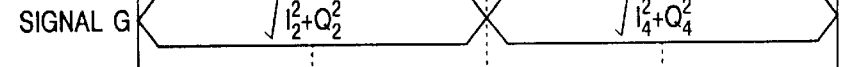
FIG. 39H SIGNAL H
FIG. 39I SIGNAL I
FIG. 39J SIGANL J
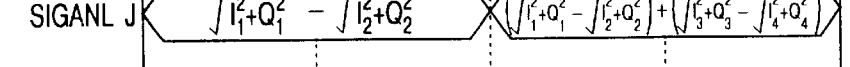
TIME (SYMBOL PERIOD)

SIGNAL A

SIGNAL B

SIGNAL C  |I1|  |I2|  |I3|  |I4|

SIGNAL D  |Q1|  |Q2|  |Q3|  |Q4|

SIGNAL K  |I1|−|Q1|  |I2|−|Q2|  |I3|−|Q3|  |I4|−|Q4|

SIGNAL L

SIGNAL M  |I1|  |I2|  |I3|  |I4|

SIGNAL N  0.375|Q1|  0.375|Q2|  0.375|Q3|  0.375|Q4|

SIGNAL O  |I1|+0.375|Q1|  |I2|+0.375|Q2|  |I3|+0.375|Q3|  |I4|+0.375|Q4|

$\frac{1}{2}T$  $T$  $\frac{3}{2}T$  $2T$

TIME (SYMBOL PERIOD)

SIGNAL A

SIGNAL B

SIGNAL C  $|I_1|$  $|I_2|$  $|I_3|$  $|I_4|$

SIGNAL D  $|Q_1|$  $|Q_2|$  $|Q_3|$  $|Q_4|$

SIGNAL K  $|I_1|-|Q_1|$  $|I_2|-|Q_2|$  $|I_3|-|Q_3|$  $|I_4|-|Q_4|$

SIGNAL P  $D_1$  $D_2$  $D_3$  $D_4$

SIGNAL Q

SIGNAL R  $|I_1|$  $|I_2|$  $|I_3|$  $|I_4|$

SIGNAL S  $0.375|Q_1|$  $0.375|Q_2|$  $0.375|Q_3|$  $0.375|Q_4|$

SIGNAL T  $|I_1|+0.375|Q_1|$  $|I_2|+0.375|Q_2|$  $|I_3|+0.375|Q_3|$  $|I_4|+0.375|Q_4|$ $\frac{1}{2}T$  $T$  $\frac{3}{2}T$  $2T$

TIME (SYMBOL PERIOD)

SYNCHRONIZATION EQUIPMENT

CROSS-REFERENCE TO RELATED APPLICATION

This is a division of application Ser. No. 08/867,806, filed Jun. 3, 1997 (now U.S. Pat. No. 6,208,701, issued Mar. 27, 2001), the disclosure of which is incorporated herein by reference.

BACKGROUND OF THE INVENTION

1. Field of the Invention

Synchronization Equipment

The present invention relates to a synchronizing apparatus for use in the receiver of a digital communication system.

2. Description of the Related Art

Digitalization in communication has remarkably advanced lately and is still progressing. In digital communication, the receiving side needs means for pulling frame synchronization in with high speed and high precision.

A conventional synchronizing apparatus for pulling-in of synchronization employs a PLL (phase-locked loop) as described in "HOW TO USE PLL-IC" (written by Tuneyasu Hata and Kazuaki Furukawa, and published by Akiba, pp. 20–32, November 1976). With reference to FIG. 1, this apparatus has a digital VCO (voltage-controlled oscillator) 1 for finally producing a signal synchronized with an input signal under the control of the PLL, a binary quantizing phase comparator 2 for comparing the phase of the input signal with the phase of the output signal from the digital VCO 1, and producing data of +1 or −1 as a result of the comparison, and a sequential loop filter 3 for counting the output signal from the binary quantizing phase comparator 2 and supplying a correction signal to the digital voltage-controlled oscillator 1 when the count exceeds a certain value (N). The binary quantizing phase comparator 2 includes a phase comparator 4 for comparing the phase of the input signal with the phase of the output signal from the digital VCO 1, and a quantizer 5 for quantizing the result from the comparator into a binary value. The digital VCO 1 includes a fixed oscillator 6 for oscillating at a fixed frequency, a pulse addition/removal circuit 7 for adding or removing a pulse to or from the output of the fixed oscillator 6 when the sequential loop filter 3 generates the output signal, and a frequency divider 8 for dividing the frequency of the output signal from the fixed oscillator 6 to or from which the pulse has been added or removed.

In this synchronizing apparatus, the phase comparator 4 of the binary quantizing phase comparator 2 compares the phase of the input signal with the phase of the output signal from the digital VCO 1. The quantizer 5 produces a value of −1 when the phase of the output signal from the digital VCO 1 is larger than that of the input signal, or when the output signal is ahead of the input signal, but it produces a value of +1 when it is smaller than that, or when the output signal is behind the input signal. The sequential loop filter 3 counts the output from the quantizer 5, and supplies to the pulse addition/removal circuit 7 the correction signal for controlling a pulse to be removed when the count arrives at +N, or for controlling a pulse to be added when the count reaches −N.

Therefore, in this synchronizing apparatus used as a frame synchronizer, when the phase of the output signal from the digital VCO 1 shifts in the positive or negative direction relative to the phase of the frame synchronizing signal, the sequential loop filter 3 supplies the first correction signal N frames after the start of pulling-in of synchronization.

When the correction signal is supplied to the digital VCO 1, the pulse addition/removal circuit 7 inserts a pulse in the output signal from the fixed oscillator 6 or removes it therefrom in response to this correction signal. Since the oscillation frequency of the fixed oscillator 6 is selected to be R times as high as the input frequency in order that the quantized value for phase control can be reduced, the output signal from the fixed oscillator 6 in which a pulse has been inserted or from which a pulse has been removed by the pulse addition/removal circuit 7 is supplied to the frequency divider 8 where its frequency is divided by R, and the frequency-divided signal is produced from the output end of the digital VCO 1.

When there is still a phase difference between the output signal from the digital VCO 1 and the input signal even after the insertion or removal of a pulse, the above operations are repeated, and finally the output signal from the digital VCO 1 is controlled so that the phase difference between the output signal from the digital VCO 1 and the input signal can be minimized.

In this apparatus, if $\Phi$ is the initial phase difference at the time of pulling-in of frame synchronization, the time in which the phase pulling-in is caused within an error $\delta$ is given by the following equation (1)

$$T_O = \{(\Phi-\delta)R/360\} \times N \quad (1)$$

where 360°/R is the phase change in one cycle.

The average time in which the frame synchronization is established is derived from Eq. (1) as in the following equation (2).

$$T_{AVE} = \int_0^{180} \left\{ \frac{(\phi-\delta)}{360/R} \times N \right\} d\phi = (0.25 - \delta/360)NR \quad (2)$$

Here, if it is assumed that $\delta=180/R$, the frequency for comparison is 50 Hz, or the frame frequency of full rate of PDC, and the oscillation frequency of the fixed oscillator 6 is 12.6 kHz, then R=252 can be obtained, and thus the average pull-in time is 62.5×N, or 3.125 seconds.

However, since the above conventional synchronizing apparatus employs an analog PLL, it is easily affected by temperature change, timing aging and environmental variation such as voltage fluctuation. In addition, after synchronization is locked by an alternating pattern for synchronization, synchronization holding by use of information symbol is made unstable by the information symbol pattern.

SUMMARY OF THE INVENTION

It is an object of the present invention to provide a high-performance synchronizing apparatus all formed of digital circuits to have high resistance to environmental change irrespective of whether the transmitted symbol pattern. is an alternating pattern for synchronization or information symbol that has no random property.

According to the invention, there is provided a synchronizing apparatus that is all formed of digital circuits, detects the zero-cross points of a received signal of IF band at N times as high as the symbol rate, and establishes the optimum symbol synchronization from the histogram to the detected time. Therefore, in the present invention, since the histogram of the zero-cross points is detected, erroneous operation is not caused even when zero-cross points do not successively occur during some symbol periods in any symbols like information symbol. In addition, when the burst length is short or when the clock precision is very high, synchronization can be established and held by a small number of symbols, and thus low power consumption can be achieved by stopping the synchronizing circuit. More-over, even when the burst length is long or when the clock precision is low, synchronization can be detected in information symbols, and thus synchronization tracking can be realized by the addition of simple circuits.

The first synchronizing apparatus according to the present invention includes means for detecting a code from an input signal, means for detecting from the code the variable points of the code at several times as high as the symbol rate, means for calculating a histogram of the detected variable points of the code to time, and means for deciding that the phase number at which the calculated histogram takes the maximum value is a symbol synchronization point. In other words, the zero-cross points of a signal of IF band are detected at N times the symbol rate, a histogram to the detected time (0 to N−1) is calculated, and the time (0 to N−1) at which the histogram takes the maximum value within a certain detected period is selected as a symbol clock, thereby establishing symbol synchronization.

The second synchronizing apparatus according to the present invention includes means for detecting a code from an input signal, latch means for detecting from the code the variable points of the code at several times as high as the symbol rate, means for calculating a histogram of the detected variable points of the code to time, and means for deciding that the phase number at which the calculated histogram first exceeds a threshold is a symbol synchronization point. In other words, the zero-cross points of a signal of IF band are detected at N times the symbol rate, the histogram to the detected time (0 to N−1) is calculated, and the time (0 to N−1) at which the histogram exceeds a threshold is selected as a symbol clock, thereby establishing symbol synchronization.

The third synchronizing apparatus according to the present invention includes means for detecting a code from an input signal, latch means for detecting from the code the variable points of the code at several times as high as the symbol rate, means for calculating a histogram of the detected variable points of the code to time, and means for deciding that the phase number at which the calculated histogram first exceeds a threshold is a symbol synchronization point and that when the histogram does not exceed the threshold within a certain detected period, the phase number at which the calculated histogram takes the maximum value is a symbol synchronization point. In other words, the zero-cross points of a signal of IF band are detected at N times as high as the symbol rate, a histogram to the detected time (0 to N−1) is calculated, the time (0 to N−1) at which the histogram exceeds the threshold within a certain detected period is selected as a symbol clock, and when the histogram does not exceed the threshold within the certain detected period, the time (0 to N−1) at which the histogram takes the maximum value is selected as the symbol clock, thereby quickly establishing the symbol synchronization.

The fourth synchronizing apparatus according to the present invention is one according to any one of the first to third synchronizing apparatus, wherein after synchronization establishment, timing correction is performed by calculating the histogram at a position, a certain phase unit before and after the synchronization establishment point, and detecting the associated phase number. In other words, after the symbol synchronization establishment, the zero-cross points of a signal of IF band are detected at N times as high as the symbol rate, and the histogram to the detected time (0 to N−1) is calculated. At this time, when the time at which the histogram exceeds a threshold is before the synchronization establishment time (k: $0 \leq k \leq N-1$), the symbol synchronization point is corrected to proceed by one clock ($1/(N \times f_s)$), and when the time at which the histogram exceeds the threshold is after that, the symbol synchronization point is corrected to be recede by one clock ($1/(N \times f_s)$) If the time at which the histogram exceeds the threshold is equal to the synchronization establishment point, no correction is made. Thus, correct symbol synchronization can be established.

The fifth synchronizing apparatus according to the present invention is one according to the fourth synchronizing apparatus, wherein when the frequency precision is known to be low, the phase number detection is made more frequently to follow the synchronization, and when the frequency precision is known to be high, the phase number detection is made less frequently. Thus, after the symbol synchronization is established, the synchronization correction frequency is controlled in accordance with the burst length and clock precision, so that the consumption power can be reduced.

The sixth synchronizing apparatus according to the present invention is one according to any one of the first to fifth synchronizing apparatus for acquiring synchronization by use of data after A/D conversion, wherein when the difference between the times necessary for signals to reach the synchronizing circuit and the A/D converter causes a more serious problem than use of analog data before A/D conversion (particularly when the symbol rate is high), a desired accurate synchronization point can be detected.

The seventh synchronizing apparatus according to the present invention is one according to the sixth synchronizing apparatus, wherein when the synchronizing signal is a sine wave of which the phase is changed 180 degrees at each symbol, each of the absolute values of in-phase and quadrature signals, or I, Q signals of the sampled data after A/D conversion is added, and after the addition, a more accurate one of both sums is selected, so that a desired correct synchronization position can be detected even if there is delay in the analog circuits.

The eighth synchronizing apparatus according to the present invention is one according to the sixth synchronizing apparatus, wherein when the synchronizing signal is a sine wave of which the phase is changed 180 degrees at each symbol, the absolute values of the sampled data after A/D conversion are added and used without separating the sampled data into the I and Q signals, so that the circuits can be smaller-sized than in the seventh synchronizing apparatus and that a desired correct synchronization position can be detected even if there is delay in the analog circuits.

The ninth synchronizing apparatus according to the present invention is one according to the seventh or eighth synchronizing apparatus, wherein when the synchronizing signal is a sine wave of which the phase is changed 180 degrees at each symbol, calculation is made for the sum of the absolute values of each of the I and Q signals of the sampled data after A/D conversion at four times as high as the symbol rate, selection is made for a pair of adjacent maximum values of a larger level one of the I and Q signals of which the levels are previously determined, calculation is again made for the sum of the absolute values of the larger level signal of the sampled data sampled at an intermediate sampling timing rate therebetween, the resulting three values are compared, and synchronization is acquired by determining the timing for the largest value. Thus, a desired correct synchronization position can be detected even if there is delay in the analog circuits.

The tenth synchronizing apparatus according to the present invention is one according to the seventh or eighth synchronizing apparatus, wherein when the synchronizing signal is a sine wave of which the phase is changed 180 degrees at each symbol, calculation is made for the sums of the absolute values of the sampled data after A/D conversion, sampled at four times as high as the symbol rate without separating the sampled data into I and Q signals, selection is made for a pair of two adjacent maximum values of the sampled data, calculation is again made for the sum of the absolute values of the sampled data sampled at an intermediate sampling timing rate therebetween, the resulting three values are compared, and the timing for the largest one is determined, thereby acquiring synchronization. Thus, a desired correct synchronization position can be detected even if there is delay in the analog circuits.

The eleventh synchronizing apparatus according to the present invention is one according to the ninth or tenth synchronizing apparatus, wherein selection is made for a pair of two adjacent minimum values, calculation is again made for the sum of the absolute values of the sampled data sampled at an intermediate sampling timing rate therebetween, the resulting three values are compared, and synchronization is acquired by determining the timing for the smallest one. Thus, the precision is higher than in the ninth or tenth synchronizing apparatus, and a desired correct synchronization position can be detected even if there is delay in the analog circuits. In this case, the correct synchronization timing is ½ symbol after the above synchronization acquisition timing.

The twelfth synchronizing apparatus according to the present invention is one in which synchronization is acquired by calculating the sum of the absolute values of I and Q signals after A/D conversion and comparing a plurality of integrated values of the sampled data sampled at different sampling timing rates. Thus, when the difference between the times required for signals to reach the synchronizing circuit and the A/D converter causes a more serious problem (particularly when the symbol rate is high) than the use of analog data before A/D conversion, a desired correct synchronization position can be detected by synchronization acquisition using A/D-converted data, and synchronization can be pulled in with high speed and high accuracy by comparing a plurality of integrated values of the sampled data sampled at different rates.

The thirteenth synchronizing apparatus according to the present invention is one in which synchronization acquisition is started by a start trigger, synchronization acquisition is detected by use of information of both demodulated result and synchronization acquired state, and the synchronization is started to hold. Thus, when the difference between the times required for signals to reach the synchronizing circuit and the A/D converter causes a more serious problem (particularly when the symbol rate is high) than the use of analog data before A/D conversion, a desired accurate synchronization position can be detected by synchronization acquisition using digital data after A/D conversion. In addition, since the end of synchronization pulling-in can be detected from the clock reproduction circuit state and detection result and shifted to the synchronization holding state, the jitter in the data interval can be suppressed, and the error rate characteristic can be improved. Moreover, since the synchronization start and hold timing control is not necessary, the control can be simplified. When a particular synchronizing pattern is added to the head of data, synchronization can be pulled in with high speed and high precision by a method particularized for the pattern.

The fourteenth synchronizing apparatus according to the present invention is one according to the twelfth synchronizing apparatus, wherein when a particular preamble pattern is added to the head of data, the synchronization pulling-in detection and synchronization holding start are performed by counting the number of error in the demodulated result of the preamble. Automatic detection of synchronization pulling-in can suppress the jitter in the data interval and improve the error rate characteristic. Since the synchronization hold timing control is not necessary, the control can be simplified. In addition, when a particular synchronizing pattern is added to the head of data, synchronization can be pulled in with high speed and high precision by a method specialized for the particular pattern, since the data portion is stopped from clock reproduction. At this time, since this construction employs the sampled data after A/d conversion, the desired synchronization position can be precisely detected even if signals are delayed in the analog circuits.

The fifteenth synchronizing apparatus according to the present invention is one according to the fourteenth synchronizing apparatus, wherein the synchronization acquisition detection precision can be increased by use of both the decision reference on which decision is made of how many symbols are successively correct in the demodulated result and the histogram under synchronization acquisition. The synchronization pulling-in can be detected precisely by reflecting the result of the observation of the histogram at the synchronization position. The histogram is used such that it is detected whether the sums of the values of the histogram to the current sampling timing position and both adjacent timing positions thereto, of a plurality of sampling timing positions, have exceeded a certain threshold. At this time, by clearing the histogram values to the other timing positions, it is possible to increase the detection precision. This construction can detect a desired accurate synchronization position by use of the sampled data after A/D conversion even if signals are delayed in the analog circuits.

The sixteenth synchronizing apparatus according to the present invention is one according to the twelfth to fifteenth synchronizing apparatus, wherein after the synchronization holding state is brought about, the sampling frequency of the A/D converter is reduced to the same frequency as the symbol rate of the I signal and Q signals. By reducing the sampling frequency of the A/D converter to the same frequency as the symbol rate of the I, Q signals after the synchronization holding state, it is possible to reduce the sampling frequency of the A/D converter to ½ that of the twelfth synchronizing apparatus, and thus the consumption power can be further decreased.

The seventeenth synchronizing apparatus according to the present invention is one according to the sixteenth synchronizing apparatus, wherein the reduction of the sampling frequency of the A/D converter after the synchronization holding state is brought about is performed by use of information of whether the I signal or Q signal after A/D conversion is in phase with or has an opposite phase to that one sampling period after. By reducing the sampling frequency in accordance with the information of whether the I signal or Q signal after A/D conversion is in phase with or has an opposite phase to that one sampling period after ((one symbol period)/2 after), it is possible to prevent erroneous synchronization from occurring immediately after the synchronization holding state.

The eighteenth synchronizing apparatus according to the present invention is one according to the sixteenth synchronizing apparatus, wherein the reduction of the sampling frequency of the A/D converter after the synchronization holding state is performed by use of information of whether the I signal and Q signals produced after A/D conversion are in phase with or have opposite phases with those one sampling period after. Since a control signal for controlling a selector is generated by use of both I and Q signals after A/D conversion, synchronization can be more accurately acquired than in the seventeenth synchronizing apparatus.

The nineteenth synchronizing apparatus according to the present invention is one according to the seventeenth or eighteenth synchronizing apparatus, wherein the reduction of the sampling frequency of the A/D converter after the synchronization holding state is performed by use of the integrated value of information of whether the I signal and/or Q signal after A/D conversion are in phase with or have an opposite phase to those one sampling period after. Since a control signal for controlling a selector is generated by use of the integrated value of the information of whether one or both of I, Q signals after A/D conversion are in phase with or have opposite phases to those one sampling period after, synchronization can be more precisely acquired.

The twentieth synchronizing apparatus according to the present invention is one according to any one of the sixteenth to nineteenth synchronizing apparatus, wherein a DC offset is removed from the I signal and Q signal produced from the A/D converter. Thus, by removing a DC offset from the I and Q signals outputted from the A/D converter, it is possible to acquire synchronization more precisely.

The twenty-first synchronizing apparatus according to the present invention is one according to any one of the sixteenth to twentieth synchronizing apparatus, wherein frame synchronization can be acquired together with the demodulated data by integrating the demodulated data. Thus, by integrating the demodulated data over the range corresponding to data number of the preamble and detecting the time at which the integrated value is the maximum, it is possible to acquire frame synchronization together with the demodulated data.

The twenty-second synchronizing apparatus according to the present invention is one according to the twenty-first synchronizing apparatus, wherein the integrated value of the current demodulated data is added to those of both adjacent demodulated data, and frame synchronization is acquired by use of this sum of the integrated values. Thus, by adding the integrated values of the current demodulated data and both adjacent demodulated data integrated over the range corresponding to data number of the preamble, and detecting the time at which the integrated value is the maximum, it is possible to acquire higher-precision frame synchronization.

The twenty-third synchronizing apparatus according to the present invention is one according to the twenty-first synchronizing apparatus, wherein the integrated values of the current demodulated data and both adjacent demodulated data are weighted and added. It is possible to acquire higher-precision frame synchronization by weighting the integrated values of the current demodulated data and both adjacent demodulated data and adding them, and by detecting the time at which the integrated value is the maximum.

The twenty-fourth synchronizing apparatus according to the present invention is able to acquire synchronization by integrating the I signal or Q signal after A/D conversion, and comparing the absolute values of the integrated values of the sampled data sampled at different sampling timing rates. Since synchronization can be acquired by integrating the I signal or Q signal after A/D conversion, and comparing the absolute values of the integrated values of the sampled data sampled at different sampling timing rates, the thermal noise components can be reduced by a simpler circuit than in the sixteenth synchronizing apparatus, and thus the synchronization acquisition can be performed with higher precision.

The twenty-fifth synchronizing apparatus according to the present invention is able to acquire synchronization by integrating both I signal and Q signal after A/D conversion, adding the integrated values of I signal and Q signal, and comparing the absolute values of the sums of the sampled data sampled at different sampling timing rates. Since synchronization is acquired by integrating both I signal and Q signal after A/D conversion, adding the integrated values of I signal and Q signal and comparing the absolute values of the sums for different sampling timings, synchronization can be more precisely acquired than in the twenty-fourth synchronizing apparatus.

The twenty-sixth synchronizing apparatus according to the present invention is able to acquire synchronization by calculating the absolute value of I signal or Q signal after A/D conversion, comparing the absolute values of the sampled data sampled at different timing rates, calculating the integrated values of the compared results and using the integrated values. Since synchronization is acquired by calculating the absolute value of I signal or Q signal after A/D conversion, comparing the absolute values for different sampling timings, calculating the integrated values of the compared results, and using the integrated values, the number of necessary integrators can be decreased to one, and thus the circuit scale can be reduced to about ½ that in the sixteenth synchronizing apparatus.

The twenty-seventh synchronizing apparatus according to the present invention is able to acquire synchronization by calculating the sum of the absolute values of I signal and Q signal after A/D conversion, comparing the absolute values of the sampled data sampled at different sampling timing rates, calculating the integrated values of the compared results and using the integrated values. Since synchronization is acquired by calculating the sum of the absolute values of I signal and Q signal after A/D conversion, and using the sum of the absolute values, synchronization can be more precisely acquired than in the twenty-sixth synchronizing apparatus.

The twenty-eighth synchronizing apparatus according to the present invention is one according to any of the twelfth, sixteenth, eighteenth, twentieth to twenty-third, twenty-fifth and twenty-seventh synchronizing apparatus, wherein the absolute value calculator and adder for calculating the sum of the absolute values of I signal and Q signal after A/D conversion are operated at the same sampling frequency as the signal transmission speed. Since the absolute value calculator and adder for calculating the sum of the absolute values of I signal and Q signal after A/D conversion are operated at the same sampling frequency as the signal transmission speed, the consumption power can be further reduced.

The twenty-ninth synchronizing apparatus according to the present invention is able to acquire synchronization by use of the absolute value of the sum of I signal and Q signal after A/D conversion. Since synchronization is acquired by use of the absolute value of the sum of I signal and Q signal after A/D conversion, the thermal noise components can be further reduced without increasing the number of integrators, and thus synchronization can be acquired with higher precision.

The thirtieth synchronizing apparatus according to the present invention is one according to the twenty-ninth synchronizing apparatus, wherein when the polarities of I signal and Q signal after A/D conversion are different, the polarity of I signal or Q signal after A/D conversion is inverted, and then the I signal and Q signal are added. Since when the polarities of the I signal and Q signal after A/D conversion are different the polarity of the I signal or Q signal is inverted and then the I signal and Q signal are added, it can be prevented that the signal level is lowered and that the precision of synchronization acquisition is reduced even if the polarities of I signal and Q signal are different.

The thirty-first synchronizing apparatus according to the present invention is one according to the twenty-ninth synchronizing apparatus, wherein the information of whether the polarities of I signal and Q signal after A/D conversion are different or not is integrated, and when the polarities of this integrated values are different, the polarity of I signal or Q signal after A/D conversion is inverted. Since the information of whether the polarities of I signal and Q signal after A/D conversion are different or not are integrated, and since when the polarities of the integrated values are different, the polarity of I signal or Q signal after A/D conversion is inverted, synchronization can be acquired with higher precision than in the thirtieth synchronizing apparatus.

The thirty-second synchronizing apparatus according to the present invention includes an envelope generator for generating an envelope signal from the absolute values of I signal and Q signal after A/D conversion, so that synchronization can be acquired by use of the envelope signal. Thus, it is able to prevent the synchronization acquisition characteristic from being deteriorated by frequency offset.

The thirty-third synchronizing apparatus according to the present invention is one according to the thirty-second synchronizing apparatus, wherein the envelope generator generates the envelope signal by adding a larger one of the absolute values of I and Q signals to the smaller one multiplied by 0.375. Thus, in addition to the effect of the thirty-second synchronizing apparatus, it is possible to make I and Q signals fast, reduction of the circuit scale, and small power consumption of circuits.

The thirty-fourth synchronizing apparatus according to the present invention is one according to the thirty-third synchronizing apparatus, wherein the comparison between the absolute values of the I and Q signals in the envelope generator is made by use of a signal of the integration of the difference between the absolute values of the I and Q signals. Thus, in addition to the effect of the thirty-second synchronizing apparatus, it is possible to increase the accuracy in the envelope signal generation, and improve the synchronization acquisition characteristic.

The thirty-fifth synchronizing apparatus of the invention is one according to any one of the thirty-second to thirty-fourth synchronizing apparatus, wherein the envelope generator is operated at the same sampling rate as the signal transmission speed. Thus, in addition to the effect of the thirty-second synchronizing apparatus, it is possible to achieve high symbol rate and low power consumption.

The thirty-sixth synchronizing apparatus according to the present invention is one according to the thirty-fifth synchronizing apparatus, wherein the absolute value calculators for calculating the absolute values of the I and Q signals are operated at the same sampling rate as the signal transmission speed as well as the envelope generator. Thus, it is possible to further increase the symbol rate and decrease the power consumption as compared with the thirty-fifth synchronizing apparatus.

BRIEF DESCRIPTION OF THE DRAWINGS

FIGS. 39A–39J are timing charts to which reference are made in explaining the operation of the receiver shown in FIG. 38.

DESCRIPTION OF THE PREFERRED EMBODIMENTS (First Embodiment)

Figure 1:
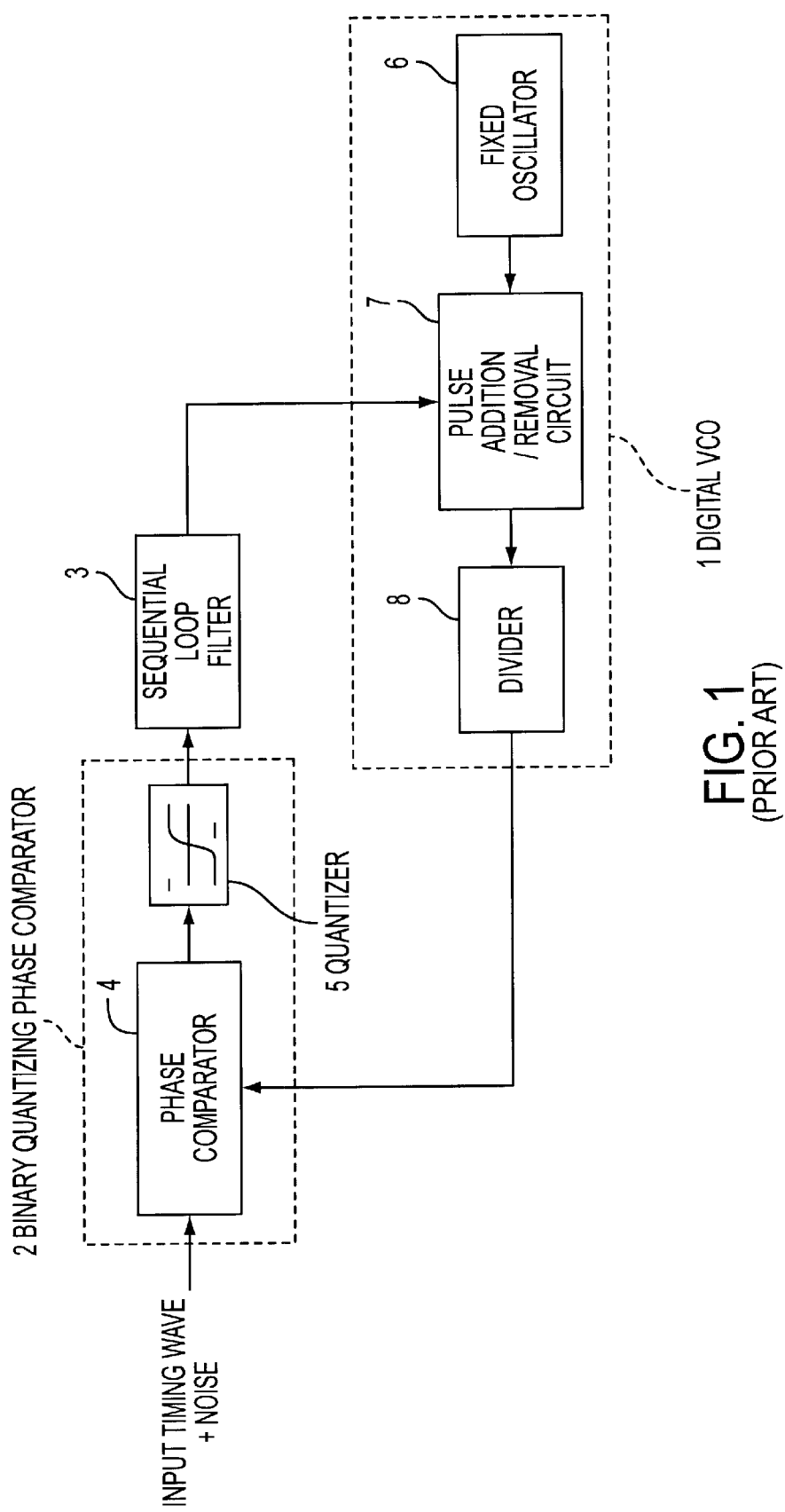
FIG. 1 is a block diagram of a conventional synchronizing apparatus.
Figure 2:
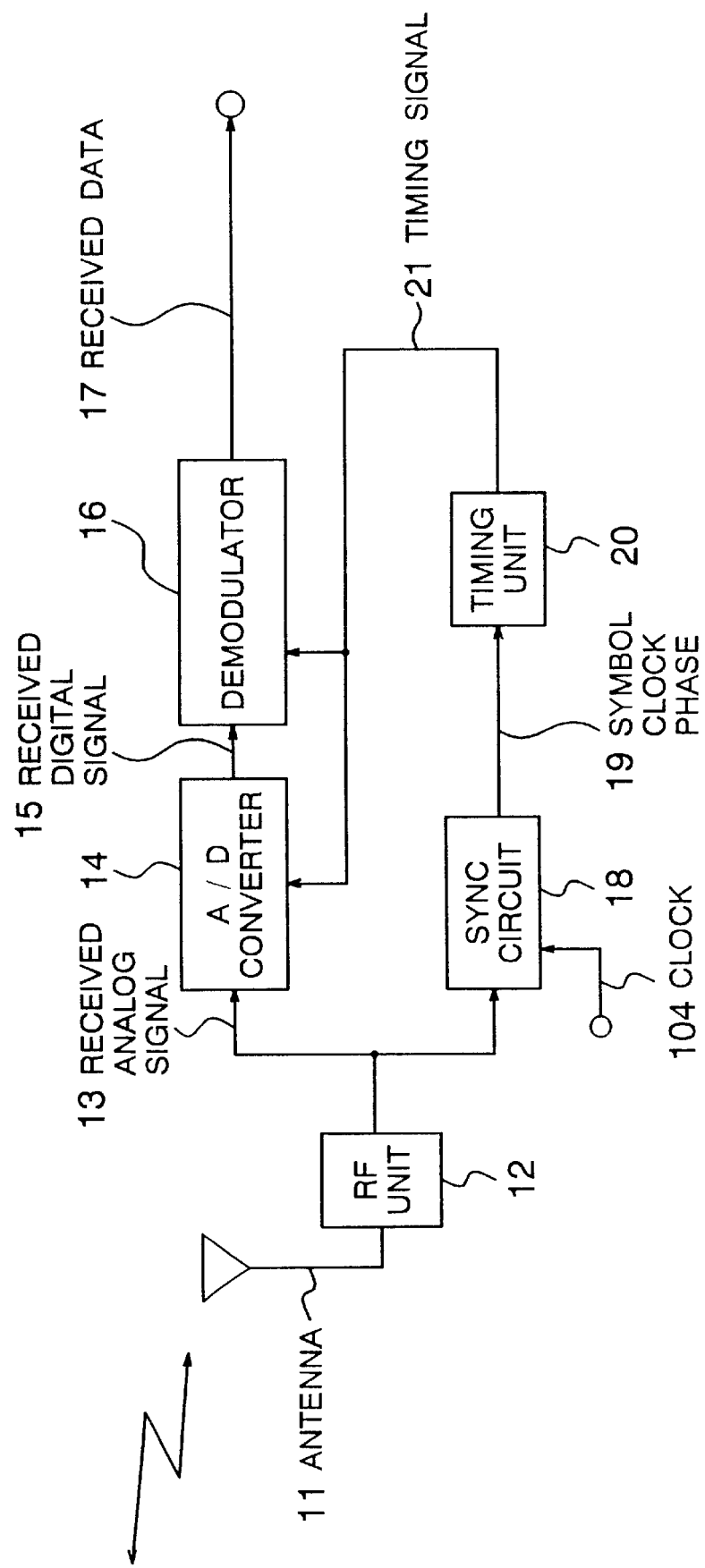
FIG. 2 is a block diagram of a receiver including a synchronizing apparatus of a first embodiment of the present invention.

FIG. 2 shows the receiver of a digital mobile communication system having the synchronizing apparatus of the first embodiment of the present invention. This receiver includes an antenna 11, an RF unit 12 for converting the frequencies of a received high-frequency signal from the antenna 11 down into an intermediate frequency band (IF band) of a received analog signal 13, an analog-to-digital converter (A/D converter) 14 for converting the received analog signal 13 from the RF unit 12 into a received digital signal 15, a demodulator 16 for demodulating the digital received signal 15 from the A/D converter 14 to thereby produce received data 17, a synchronizing circuit 18 for establishing symbol synchronization on the basis of the received analog signal 13 from the RF unit 12, and a timing unit 20 for generating a timing signal 21, on the basis of a phase 19 of a symbol clock from the synchronizing circuit 18, to control the sampling timing in the A/D converter 14, the demodulation timing in the demodulator 16 and the output timing of the received data 17.

Figure 3:
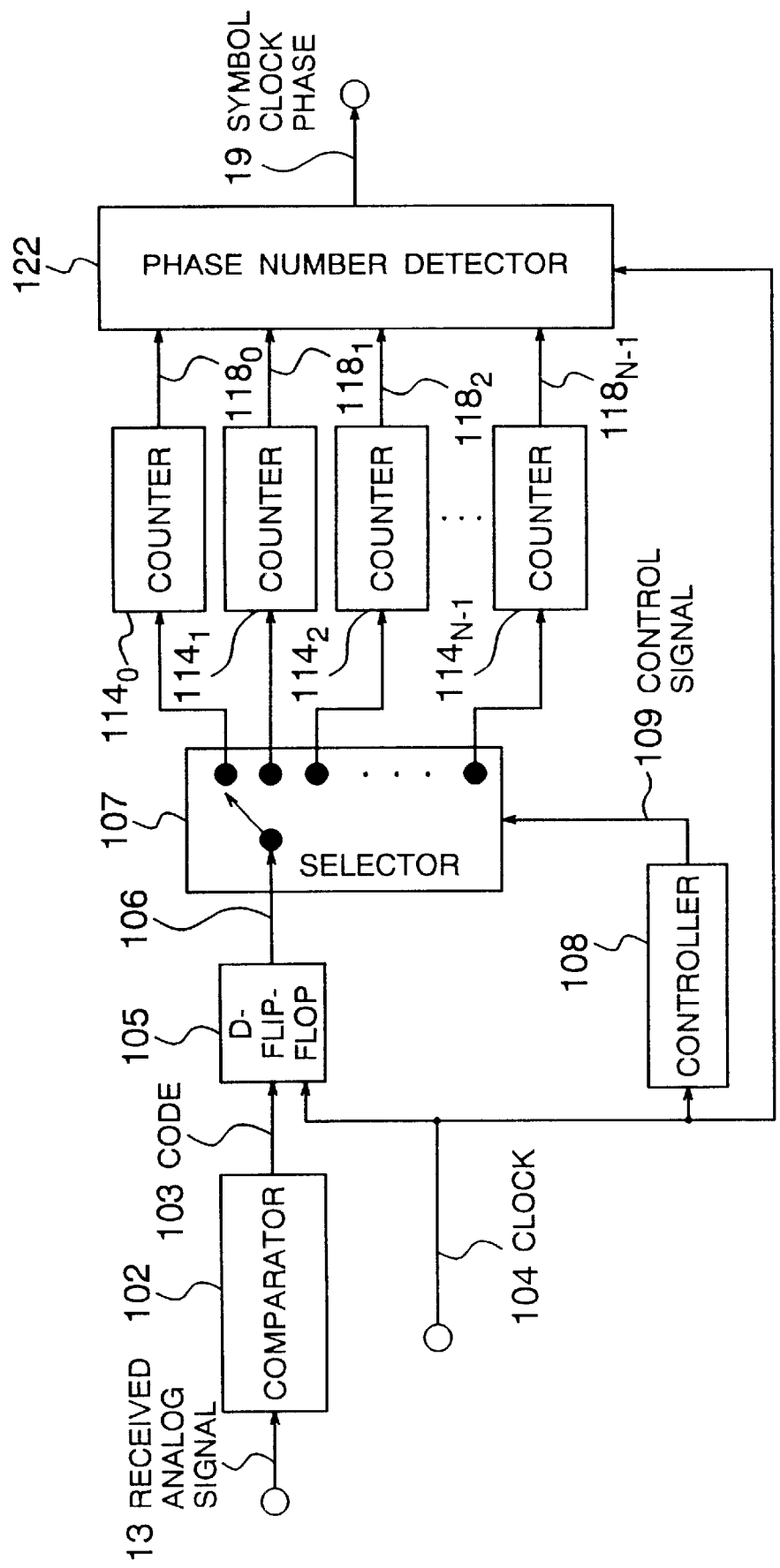
FIG. 3 is a block diagram of the synchronizing apparatus of the first embodiment of the present invention.

The synchronizing circuit 18 has, as shown in FIG. 3, a comparator 102, a D-flip-flop 105, a selector 107, a controller 108, N counters $114_0$–$114_{N-1}$ and a phase number detector 122. The comparator 102 detects a code 103 from the received analog signal 13 of the IF band from the RF unit 12. The D-flip-flop 105 detects the variable points of the code 103 detected by the comparator 102 with the precision of a clock signal or clock 104 from the outside, and establishes symbol synchronization on the basis of the detected variable points of the code. The frequency of clock 104 is N times as high as the symbol clock frequency $f_s$, or is $f_s \times N$. The controller 108 generates a control signal 109 for switching the contact positions of the selector 107 in accordance with the clock 104 from the outside. The selector 107 changes its contact position in response to the control signal 109 from the controller 108. Thus, the output signal 106 from the D-flip-flop 105 is distributed to the N counters $114_0$–$114_{N-1}$ in accordance with the clock number (or the time $t_0$–$t_{N-1}$) of the clock 104. The content of each of the N counters $114_0$–$114_{N-1}$ is incremented each time it receives the output signal 106 from the D-flip-flop 105. Thus, the output signals $118_0$–$118_{N-1}$ from the N counters $114_0$–$114_{N-1}$ indicate histograms of the variable points of the code at the N detected time points. The phase number detector 122 selects the maximum one of the output signals $118_0$–$118_{N-1}$ from the N counters $114_0$–$114_{N-1}$ (that is, the time, of the N detected time points, at which the histogram of the variable points of the code is the maximum)i thus detecting the phase 19 of the symbol clock. The detected symbol clock phase 19 is supplied to the timing unit 20 (see FIG. 2).

Figure 4:
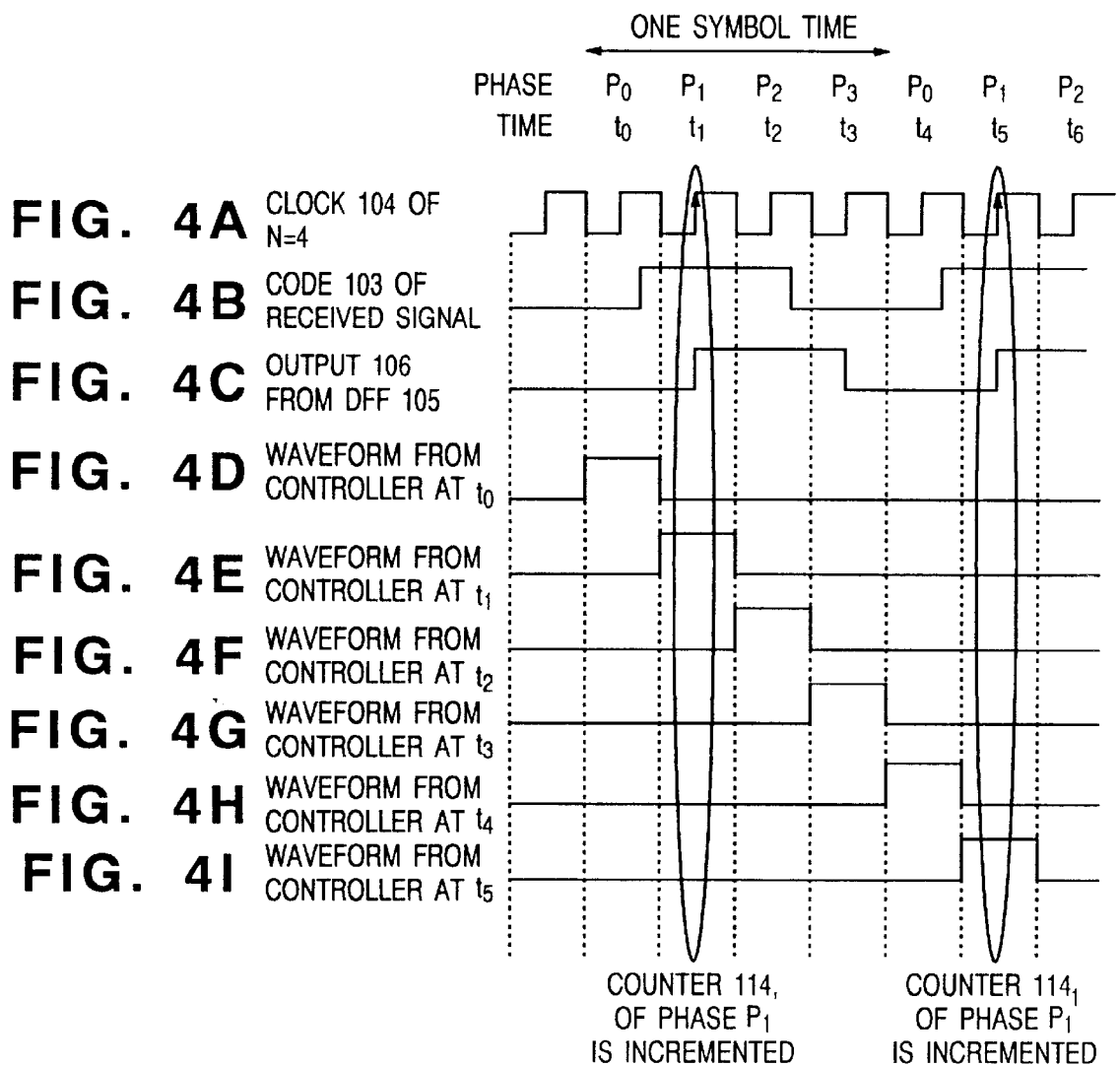
FIGS. 4A–4I are a timing chart useful for explaining the operation of the synchronizing apparatus shown in FIG. 3.

The operation of the synchronizing circuit 18 will be described with reference to FIGS. 4A–4I. The phase detection is made at, for example, four times the symbol rate (namely, four times the symbol clock frequency $f_s$). Thus, as shown in FIG. 4A, there are four phases $P_0$–$P_3$ within each symbol time. FIG. 4A illustrates the shape of the clock 104 having N times the symbol clock frequency $f_s$ ($f_s \times N$). When the received signal code 103 as shown in FIG. 4B is supplied from the comparator 102 to the D-flip-flop 105, the code 103 is received at the leading edge of clock 104. Thus, the output signal 106 from the D-flip-flop 105 has a waveform synchronized with the leading edge of the clock 104 as shown in FIG. 4C. In this example, the output signal 106 from the D-flip-flop 105 has a pulse waveform which rises at time $t_1$, $t_5$ corresponding to phase P1 and then falls off at time $t_3$ corresponding to phase $P_3$. The control signal 109 generated from the controller 108 on the basis of the clock 104 has such waveforms as shown in FIGS. 4D–4I at times $t_0$–$t_5$. Therefore, at time $t_1$, the D-flip-flop 105 is connected to the counter $114_1$ corresponding to time $t_1$ since the selector 107 is switched to the associated contact position by the control signal 109 (see FIG. 4E) from the controller 108. As a result, the counter $114_1$ is incremented in its contents by the leading edge of the output signal 106 from the D-flip-flop 105. At time $t_5$, the D-flip-flop 105 is again connected to the counter $114_5$ corresponding to time $t_5$ since the selector 107 is switched to the associated contact position by the control signal 109 (see FIG. 4I) from the controller 108. Consequently, the counter $114_5$ is again incremented in its contents by the leading edge of the output signal 106 from the D-flip-flop 105.

Figure 5:
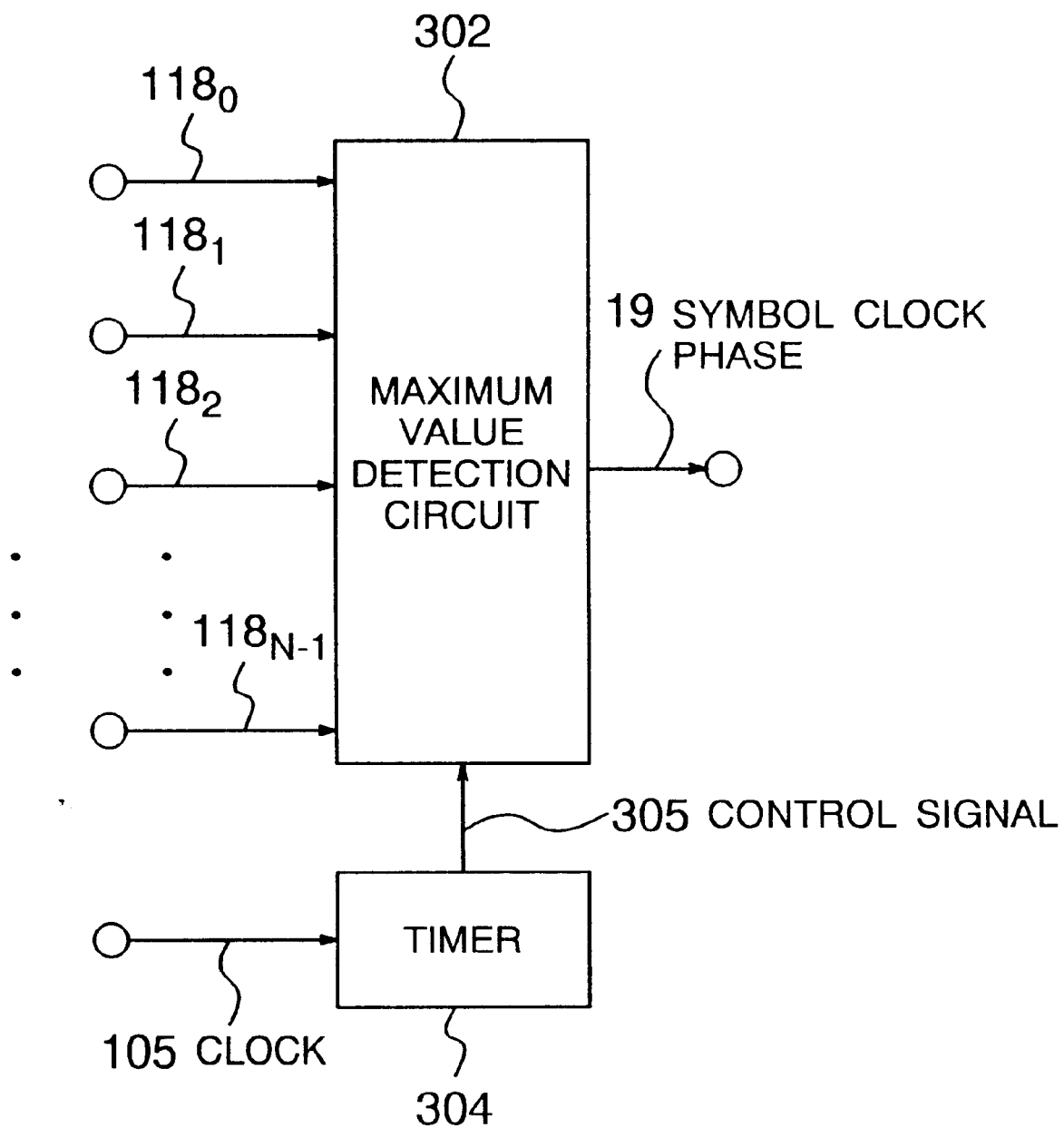
FIG. 5 is a block diagram of a phase number detector shown in FIG. 3.

The phase number detector 122 shown in FIG. 3 has, as illustrated in FIG. 5, a maximum value detection circuit 302 for detecting the maximum one of the output signals $118_0$–$118_{N-1}$ from the N counters $114_0$–$114_{N-1}$ and producing the counter number (from 0 to N−1) corresponding to the counter with the detected maximum value as the symbol clock phase 19, and a timer 304 for measuring time on the basis of the clock 104 from the outside and generating a control signal 305 for controlling the maximum value detection circuit 302 to start its operation. Therefore, the phase number detector 122 selects the time, of the N detected time points, at which the histogram of the variable points of code 103 provides the maximum.

As described above, since the synchronizing apparatus of this embodiment can all be formed of digital circuits as seen from the synchronizing circuit 18, it is possible to detect the zero-cross points of the received signal of the IF band at a rate N times as high as the symbol rate and thereby to establish the optimum symbol synchronization from the histogram at the detected time points. In addition, since the histogram detection is made at the zero-cross points, no erroneous operation is caused even if zero-cross points do not occur sequentially over several symbols like information symbols.

(Second Embodiment)

The synchronizing apparatus of the second embodiment of the present invention is different from that of the first embodiment in that when any one of the counts of the N counters $114_0$–$114_N$ exceeds a predetermined threshold, a phase number detector $112_1$ produces as the symbol clock phase 19 the counter number of the counter having that count. Therefore, in the synchronizing apparatus of this embodiment, the symbol synchronization can be established earlier in the high-precision receiving environment than in the first embodiment of the invention in which the symbol synchronization is established after the lapse of a constant detected time as described above.

Figure 6:
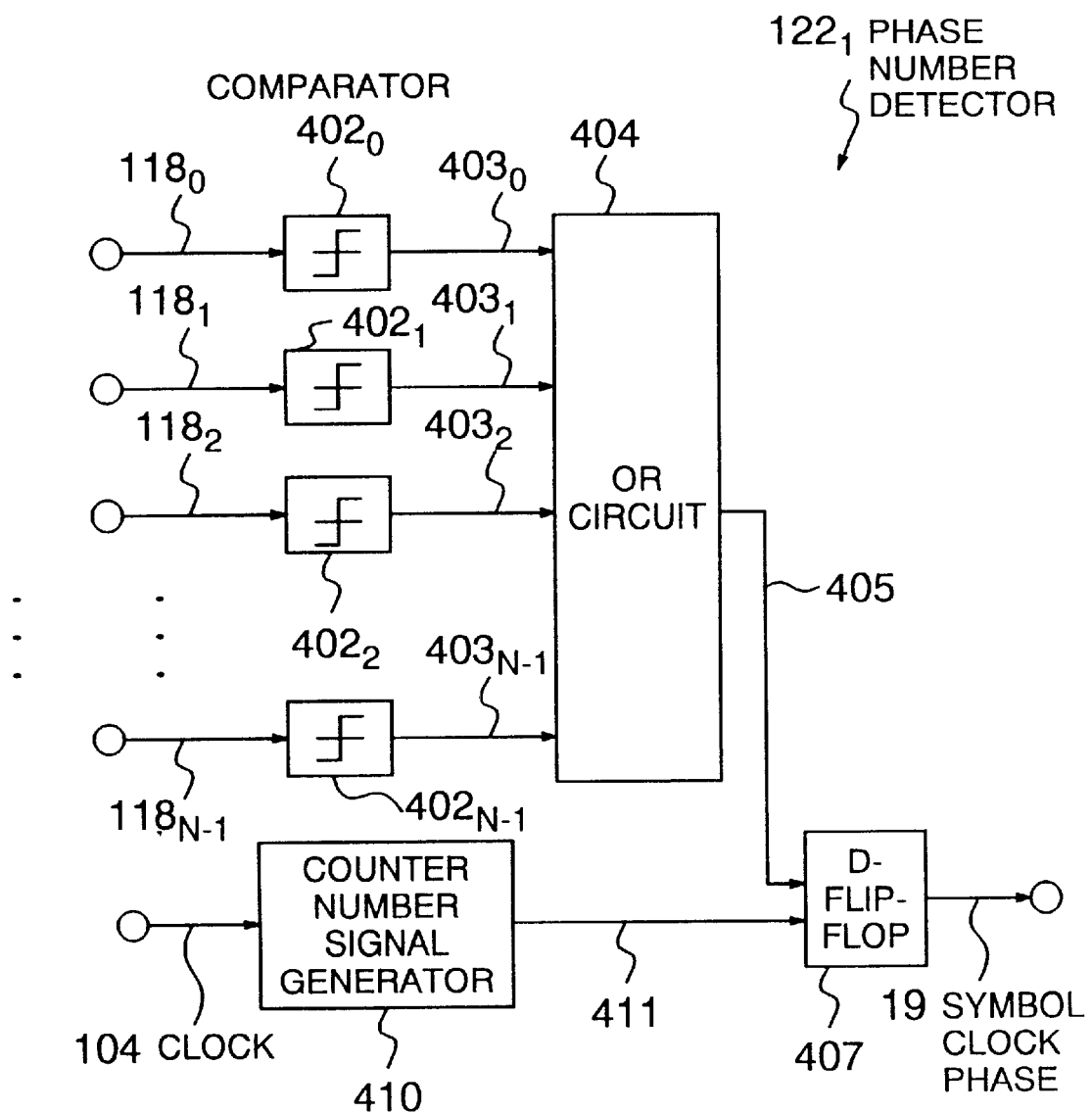
FIG. 6 is a block diagram of a phase number detector included in a synchronizing apparatus of a second embodiment of the present invention.

The phase number detector $122_1$ of the synchronizing apparatus of this embodiment has, as shown in FIG. 6, N comparators $402_0$–$402_{N-1}$ for comparing a certain threshold and the output signals $118_0$–$118_{N-1}$ from the N counters $114_0$–$114_{N-1}$ (see FIG. 3) and for producing output signals $403_0$–$403_{N-1}$ when the output signals $118_0$–$118_{N-1}$ respectively exceed the certain threshold, an OR circuit 404 for calculating the logical sum of the output signals $403_0$–$403_{N-1}$ from the N comparators $402_0$–$402_{N-1}$, a counter number signal generator 410 for generating a counter number signal 411 indicating the counter numbers (from 0 to N−1) of the N counters $114_0$–$114_{N-1}$ on the basis of the clock 104 from the outside, and a D-flip-flop 407 for latching the counter number signal 411 from the counter number signal generator 410 in response to an output signal 405 from the OR circuit 404. Here, since the N counters $114_0$–$114_{N-1}$ are associated with the particular phase points of the symbol clock, respectively (see FIGS. 4A–4I), the output signal from the D-flip-flop 407 indicates the symbol clock phase 19.

In the phase number detector $122_1$, when any one of the output signals $118_0$–$118_{N-1}$ from the N counters $114_0$–$114_{N-1}$ is larger than a predetermined threshold, the OR circuit 404 produces the output signal 405, and the D-flip-flop 407 latches the associated counter number. Consequently, the synchronizing apparatus of this embodiment can detect the symbol clock phase 19 earlier than that of the first embodiment.

(Third Embodiment)

The synchronizing apparatus of the third embodiment of the present invention is different from those of the first and second embodiments in that the phase number detector is formed by a combination of the phase number detectors shown in FIGS. 5 and 6. Thus, the synchronizing apparatus of this embodiment can establish the symbol synchronization earlier in a high-precision receiving environment, and even under a low-precision receiving environment, it can establish the symbol synchronization after the lapse of a constant detected time.

Figure 7:
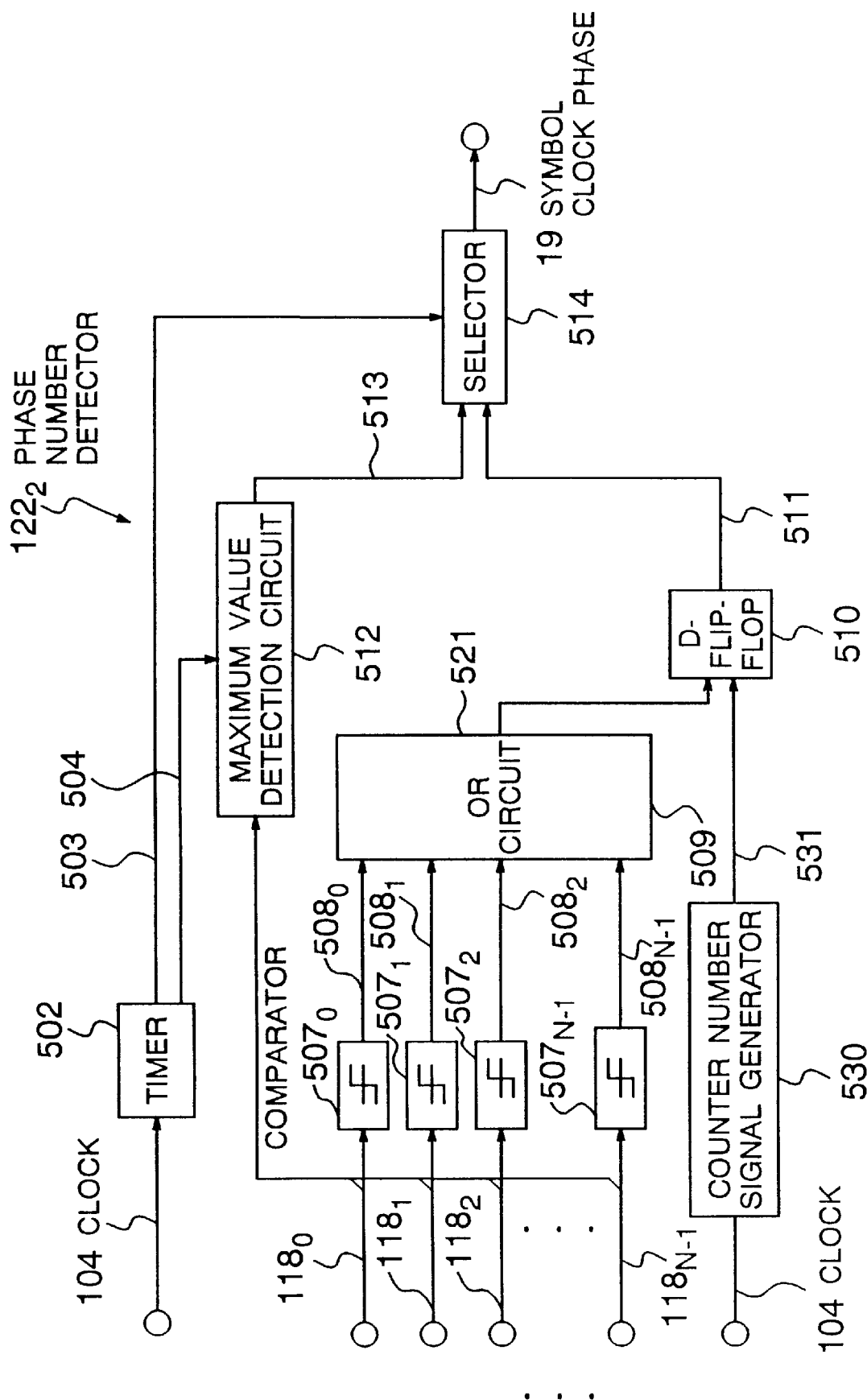
FIG. 7 is a block diagram of a phase number detector included in a synchronizing apparatus of a third embodiment of the present invention.

A phase number detector $122_2$ in the synchronizing apparatus of this embodiment has, as shown in FIG. 7, a maximum value detection circuit 512 for detecting the maximum one of the output signals $118_0$–$118_{N-1}$ from the N counters $114_0$–$114_{N-1}$ (see FIG. 3) and producing an output signal 513 indicative of the counter number (from 0 to N−1) of the counter associated with the detected maximum value, a timer 502 for measuring time on the basis of the clock 104 from the outside and generating a first control signal 504 for controlling the maximum value detection circuit 512 to start its operation and a second control signal 503 for controlling a selector 514 to switch, N comparators $507_0$–$507_{N-1}$ for comparing a certain threshold with the output signals $118_0$–$118_{N-1}$ from the N counters $114_0$–$114_{N-1}$, and producing output signals $508_0$–$508_{N-1}$ when the output signals $118_0$–$118_{N-1}$ respectively exceed the certain threshold, an OR circuit 509 for calculating the logical sum of the output signals $507_0$–$507_{N-1}$ from the N comparators $508_0$–$508_{N-1}$, a counter number signal generator 530 for generating a counter number signal 531 indicating the counter numbers (from 0 to N−1) of the N counters $114_0$–$114_{N-1}$ on the basis of the clock 104 from the outside, a D-flip-flop 510 for latching the counter number signal 531 from the counter number signal generator 530 in response to an output signal 521 from the OR circuit 509, and a selector 514 for selecting any one of the output signal 513 from the maximum value detection circuit 512 and an output signal 511 from the D-flip-flop 510 in response to the second control signal 503 from the timer 502.

The timer 502 of the phase number detector $122_2$ measures time on the basis of the clock 104, and generates the second control signal 503 for controlling the selector 514 to select the output signal 511 from the D-flip-flop 510 until the lapse of a certain detected time and to select the output signal 513 from the maximum value detection circuit 512 after the lapse of the certain detected time. Therefore, when any one of the output signals $118_0$–$118_{N-1}$ from the N counters $114_0$–$114_{N-1}$ exceeds the predetermined threshold within a constant detected time, the OR circuit 509 produces the output signal 521, thus controlling the D-flip-flop 510 to latch the associated counter number. Then, this counter number is supplied as the symbol clock phase 19 through the selector 514 to the outside. Thus, the synchronizing apparatus of this embodiment can detect the symbol clock phase 19 earlier in a high-precision receiving environment than that of the first embodiment.

When any one of the output signals $118_0$–$118_{N-1}$ from the N counters $114_0$–$114_{N-1}$ does not exceed the threshold within a constant detected time, the time, of the N detected time points, at which the histogram of the variable points of the code 103 is detected to be the maximum by the maximum value detection circuit 512 is supplied as the symbol clock phase 19 through the selector 514 to the outside. Thus, the synchronizing apparatus of this embodiment can establish the symbol synchronization even in a low-precision receiving environment after the lapse of a constant detected time.

(Fourth Embodiment)

The synchronizing apparatus of the fourth embodiment of the present invention is different from those in the first to third embodiments in that the symbol synchronization is corrected after its establishment in association with the time at which the histogram exceeds a certain threshold. In other words, in the synchronizing apparatus of this embodiment, after the establishment of symbol synchronization the zero-cross points of the received signal of IF band are detected at N times as high as the symbol rate, and the histogram of the detected zero-cross points (from 0 to N−1) is calculated. When the time at which the histogram exceeds a certain threshold is before a time k ($0 \leq k \leq N-1$) at which synchronization has been established, the symbol synchronization is corrected to be one clock ($1/(N \times fs)$) before. When the time at which the histogram exceeds a certain threshold is after the time k ($0 \leq k \leq N-1$) at which synchronization has been established, the symbol synchronization is corrected to be one clock($1/(N \times f_s)$) after. When the time at which the histogram exceeds a certain threshold is equal to the time k ($0 \leq k \leq N-1$) at which synchronization has been established, the symbol synchronization is not corrected.

Figure 8:
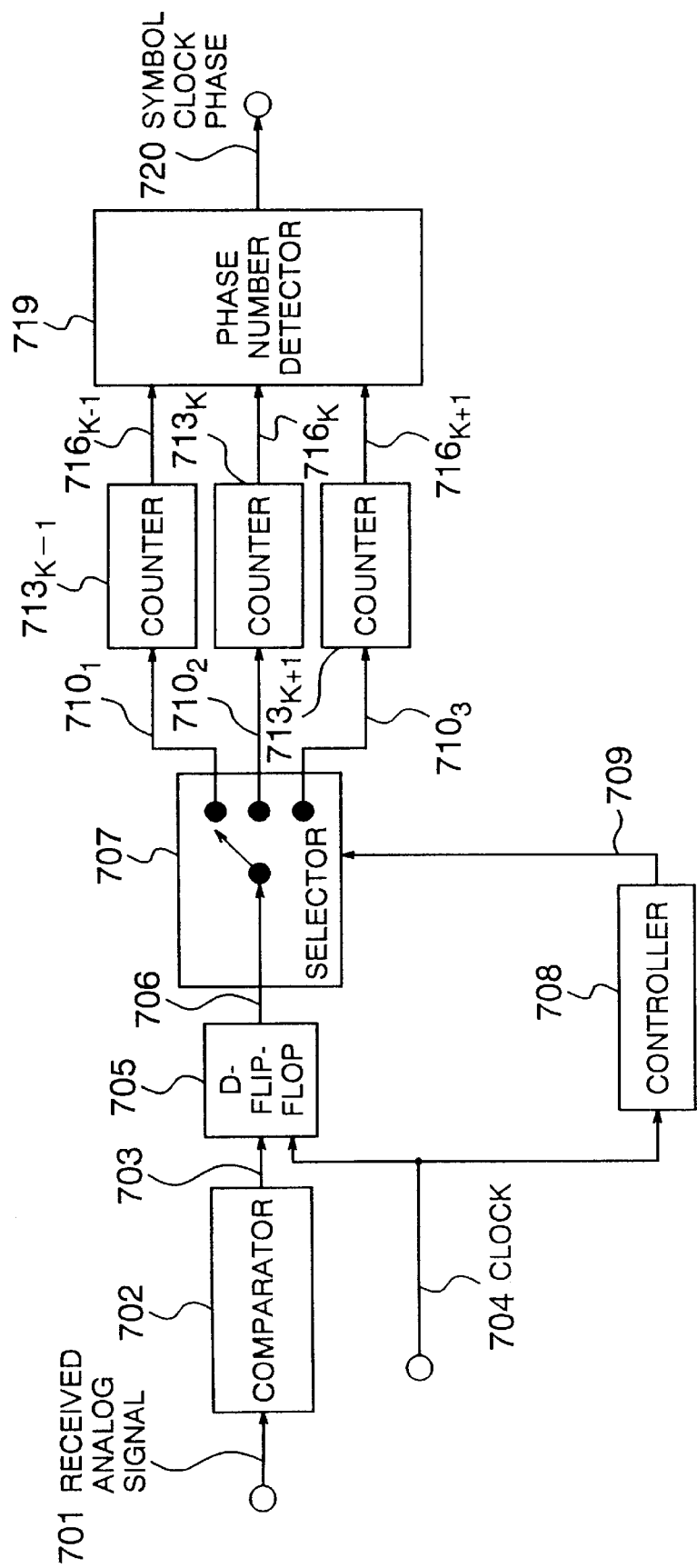
FIG. 8 is a block diagram of a synchronizing apparatus of a fourth embodiment of the present invention.

The operation of the synchronizing apparatus of this embodiment after the establishment of symbol synchronization will be described with reference to FIG. 8. After the symbol synchronization has been established, as in the synchronizing apparatus of the first to third embodiments, a comparator 702 detects a code 703 from a received analog signal 701 of IF band. When the detected code 703 is supplied from the compactor 702 to a D-flip-flop 705, the code 703 is hit by the leading edge of a clock 704. Thus, an output signal 706 from the D-flip-flop 705 has a waveform synchronized with the leading edge of the clock 704. In addition, a controller 708 generates a control signal 709 in response to the clock 704 and supplies it to a selector 707. Thus, the control signal 709 controls three counters $713_{k-1}$, $713_k$, $713_{k+1}$, corresponding to the time points k−1, k, k+1 of the zero-cross points of code 703 to be incremented in their counts through the selector 707. When any one of the time points of the zero-cross points of code 703 is the time k at which synchronization has been established, the three counters $713_{k-1}$, $713_k$, $713_{K+1}$ are all incremented.

A phase number detector 719 continuously produces a symbol clock phase 720 at which synchronization has been established. However, when the symbol clock phase after the establishment of synchronization detected as in one of the first to third embodiments is behind the symbol clock phase 720 at which synchronization has been established, this symbol clock phase 720 is delayed by one clock time of clock 704, and supplied to the outside as the new symbol clock phase 720. When the detected symbol clock phase after the detected establishment of synchronization is ahead of the symbol clock phase 720 at which synchronization has been established, this symbol clock phase 720 is advanced by one clock time of clock 704, and supplied to the outside as the new symbol clock phase 720. When the detected symbol clock phase after the detected establishment of synchronization is equal to the symbol clock phase 720 at which synchronization has been established, the symbol clock phase 720 at which synchronization has been established is supplied to the outside as it is. Here, since the symbol clock phase corresponds to time, when the detected time is before the time k at which synchronization has been established (namely, it is time k−1), the symbol synchronization is corrected to be one clock ($1/(N \times f_s)$) before. When the detected time is after the time k at which synchronization has been established (namely, it is time k+1), the symbol synchronization is corrected to be one clock ($1/(N \times f_s)$) after. When the detected time is equal to the time k at which synchronization has been established, the symbol synchronization is not corrected.

Accordingly, the synchronizing apparatus of this embodiment is able to establish correct symbol synchronization by+1 clock timing correction after the establishment of synchronization.

(Fifth Embodiment)

The synchronizing apparatus of the fifth embodiment of the present invention is different from that of the fourth embodiment in that timing correction is made after the establishment of synchronization in accordance with the burst length and clock precision.

Figure 9:
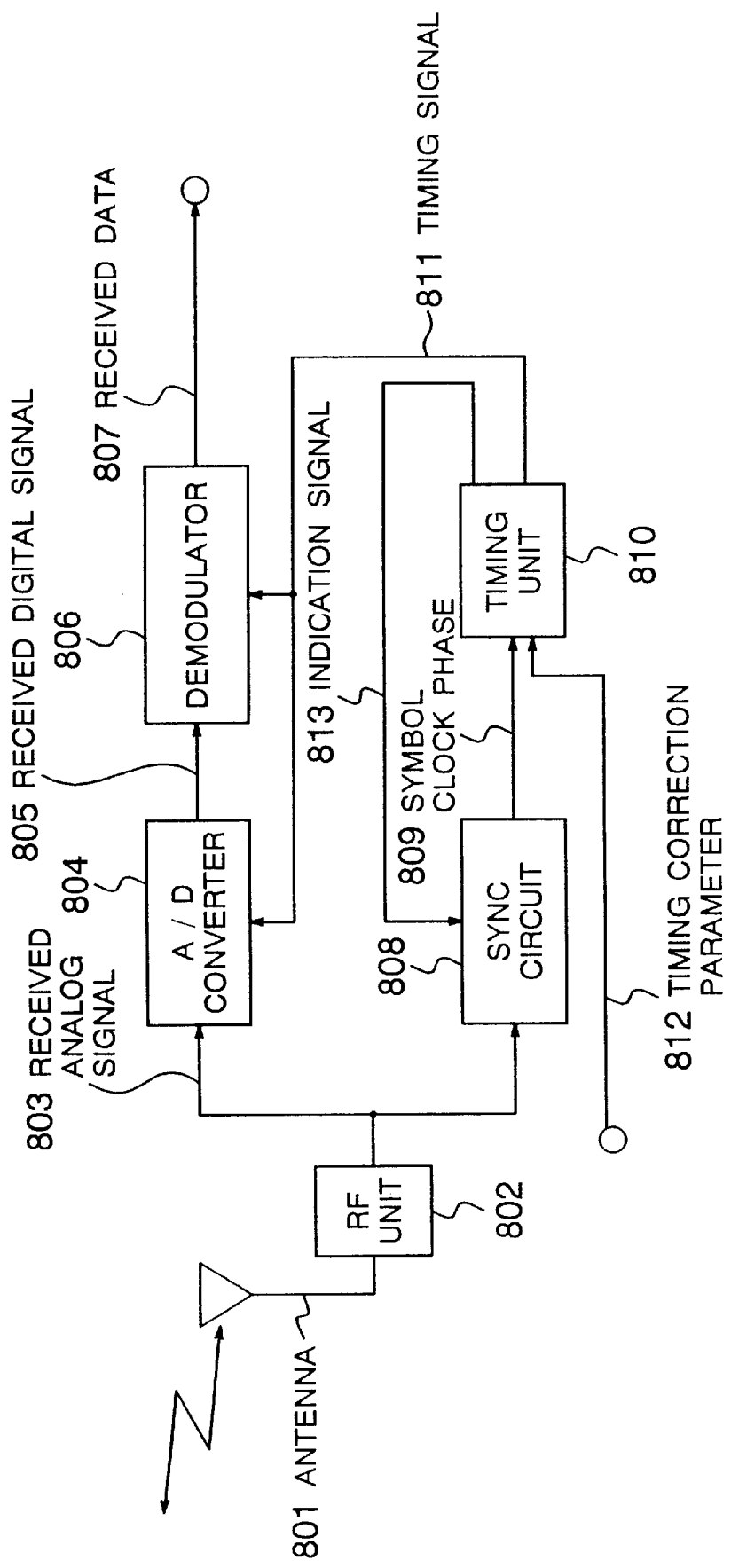
FIG. 9 is a block diagram of a receiver including a synchronizing apparatus of a fifth embodiment of the present invention.

The receiver including the synchronizing apparatus of this embodiment has, as shown in FIG. 9, an antenna 801, an RF unit 802, an analog-to-digital converter (A/D converter) 804 for converting a received analog signal 803 of IF band into a received digital signal 805, a demodulator 806 for demodulating the received digital signal 805 to thereby produce received data 807, a synchronizing circuit 808 for establishing symbol synchronization on the basis of the received analog signal 803, and a timing unit 810 for generating a timing signal 811 on the basis of a phase 809 of symbol clock from the synchronizing circuit 808, thereby controlling the sampling timing in the A/D converter 804, the demodulation timing in the demodulator 806 and the output timing of received data 807. From the above construction point of view, this receiver seems to be similar to that including the synchronizing apparatus of the fourth embodiment (see FIG. 2). However, it is different from the receiver including the synchronizing apparatus of the fourth embodiment in that a timing correction parameter 812 for setting the frequency of the timing correction implementation is supplied from the outside to the timing unit 810, an indication signal 813 for indicating the start of timing correction is supplied from the timing unit 810 to the synchronizing circuit 808, and the synchronizing circuit 808 makes timing correction on the basis of the indication signal 813.

In the receiver including the synchronizing apparatus of this embodiment, after the establishment of symbol synchronization the timing unit 810 generates the indication signal 813 indicative of the start of timing correction in accordance with the burst length and clock precision indicated by the timing correction parameter 812, and the synchronizing circuit 808 makes timing correction after the establishment of symbol synchronization in accordance with the generated indication signal 813. Thus, the timing correction implementation frequency can be controlled, and the consumption power can be reduced.

(Sixth Embodiment)

Figure 10:
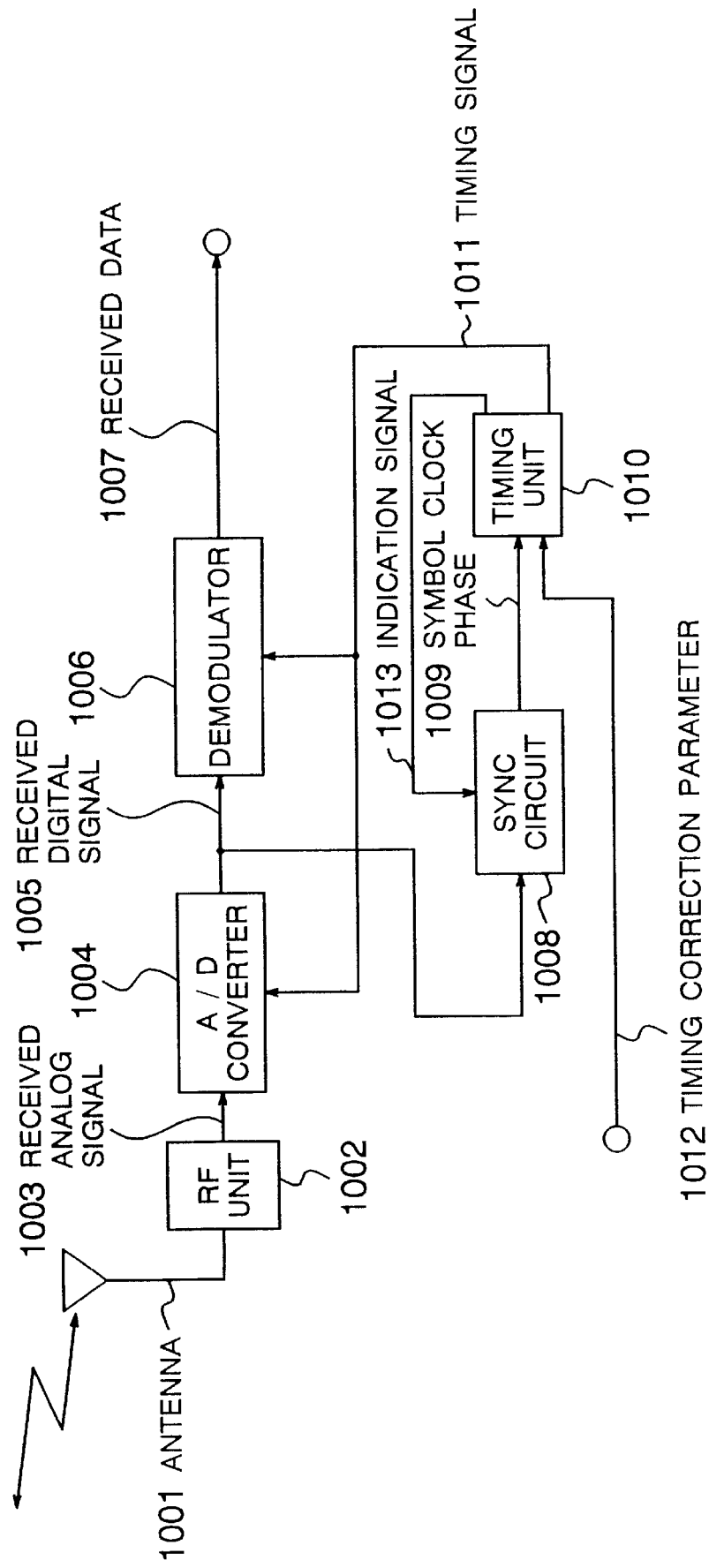
FIG. 10 is a block diagram of a receiver including a synchronizing apparatus of a sixth embodiment of the present invention.

The receiver including the synchronizing apparatus of the sixth embodiment of the present invention is different from that including the synchronizing apparatus of the fifth embodiment in that as shown in FIG. 10, a received digital signal 1005 from an analog-to-digital converter 1004 is supplied to a synchronizing circuit 1008 in place of a received analog signal 1003 from an RF unit 1002.

In other words, the receiver including the synchronizing apparatus of this embodiment has an antenna 1001, the RF unit 1002, the analog-to-digital converter (A/D converter) 1004 for converting the received analog signal 1003 of IF band into the received digital signal 1005, a demodulator 1006 for demodulating the received digital signal 1005 to thereby produce received data 1007, the synchronizing circuit 1008 for establishing symbol synchronization on the basis of the received digital signal 1005, and a timing unit 1010 for generating, in accordance with a symbol clock phase 1009 from the synchronizing circuit 1008, a timing signal 1011 for controlling the sampling timing in the A/D converter 1004, the demodulation timing in the demodulator 1006 and the output timing of received data 1007. A timing correction parameter 1012 for setting the timing correction execution frequency is supplied from the outside to the timing unit 1010, and an indication signal 1013 indicative of the start of timing correction is supplied from the timing unit 1010 to the synchronizing circuit 1008, causing the synchronizing circuit 1008 to make timing correction.

In the case where the received analog signal 1003 is used for synchronization, if there is a time difference between the time in which the received analog signal 1003 is transmitted from the RF unit 1002 to the A/D converter 1004 and the time in which the received analog signal 1003 is transmitted from the RF unit 1002 to the synchronizing circuit 1008, or if the A/D converter 1004 has a large conversion delay, the symbol synchronization established in the synchronizing circuit 1008 may be sometimes deviated away from the correct state, Particularly at a high symbol rate, this deviation greatly affects the quality of the received data 1007. However, in the receiver including the synchronizing apparatus of this embodiment, the synchronizing circuit 1008 is able to establish symbol synchronization by use of the received digital signal 1005 fed from the A/D converter 1004, and the received digital signal 1005 is supplied from the A/D converter 1004 to the demodulator 1006. Therefore, if the timing unit 1011 generates an optimum timing signal to the data sequence, the demodulator 1006 can maintain the most suitable timing.

(Seventh Embodiment)

Figure 11:
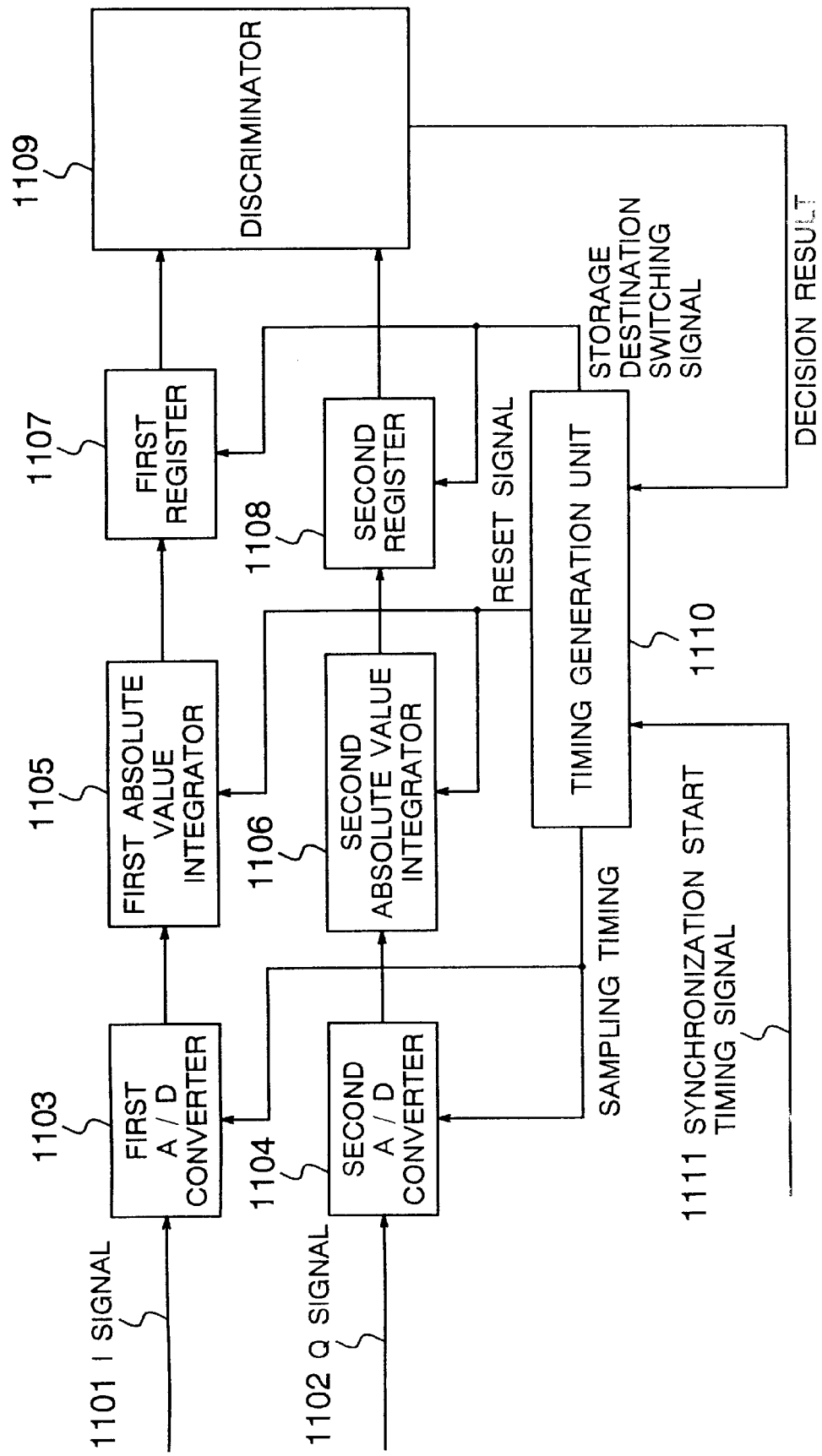
FIG. 11 is a block diagram of a phase detection circuit included in a synchronizing apparatus of a seventh embodiment of the present invention.

The receiver including the synchronizing apparatus of the present seventh embodiment of the present invention is different from that of the sixth embodiment in that a phase detection circuit shown in FIG. 11 is provided as part of the synchronizing circuit 1008 and timing unit 1010.

This phase detection circuit has a first analog-to-digital converter (A/D converter) 1103 for converting an analog in-phase signal (I signal) 1101 into a digital in-phase signal, a second analog-to-digital converter (A/D converter) 1104 for converting an analog quadrature signal (Q signal) 1102 into a digital quadrature signal, a first absolute value integrator 1105 for integrating the digital in-phase signal over a certain time, a second absolute value integrator 1106 for integrating the digital quadrature signal over a predetermined time, a first register 1107 in which the output signal from the first absolute value integrator 1105 is stored, a second register 1108 in which the output signal from the second absolute value integrator 1106 is stored, a discriminator 1109 for detecting synchronization by use of the output signal from the first register 1107 and the output signal from the second register 1108, and a timing generation unit 1110 for generating a sampling timing signal for the first and second A/D converters 1103, 1104, a reset signal for the first and second absolute value integrators 1105, 1106, and a storage destination switching signal for the first and second registers 1107, 1108. To the timing generation unit 1110 are supplied the decision result from the discriminator 1109 and a synchronization start timing signal 1111 from the outside.

This phase detection circuit operates at the synchronization pulling-in time as part of the synchronizing circuit 1008 and timing unit 1010 of the receiver including the synchronizing apparatus of the sixth embodiment. When the synchronization start timing signal 1111 is supplied from the outside to the timing generation unit 1110, the timing generation unit 1110 generates the sampling timing signal indicative of timing for each symbol having a given initial phase and supplies it to the first and second A/D converters 1103, 1104. Thus, the analog in-phase signal (I signal) 1101 and the analog quadrature signal (Q signal) 1102 are converted from analog to digital form. Then, the absolute values of the output digital signals from the first and second A/D converters are integrated by the first and second absolute value integrators 1105, 1106 over a predetermined time, respectively. The integrated values from the first and second integrators 1105, 1106 are stored in the first and second registers 1107, 1108, respectively. Thereafter, the timing generation unit 1110 supplies a sampling timing signal for each symbol having a different initial phase to the first and second A/D converters 1103, 1104, and the same operations are repeated. After the integrated values are obtained for some initial phases, all the integrated values stored in the first and second registers 1107, 1108 are supplied to the discriminator 1109, where the most probable integrated value is selected. The decision result indicative of the timing of the selected integrated value is supplied to the timing generation unit 1110.

In the synchronizing apparatus of this embodiment having such phase detection circuit, the optimum timing can be obtained without consideration of delay in the analog circuits.

(Eighth Embodiment)

Figure 12:
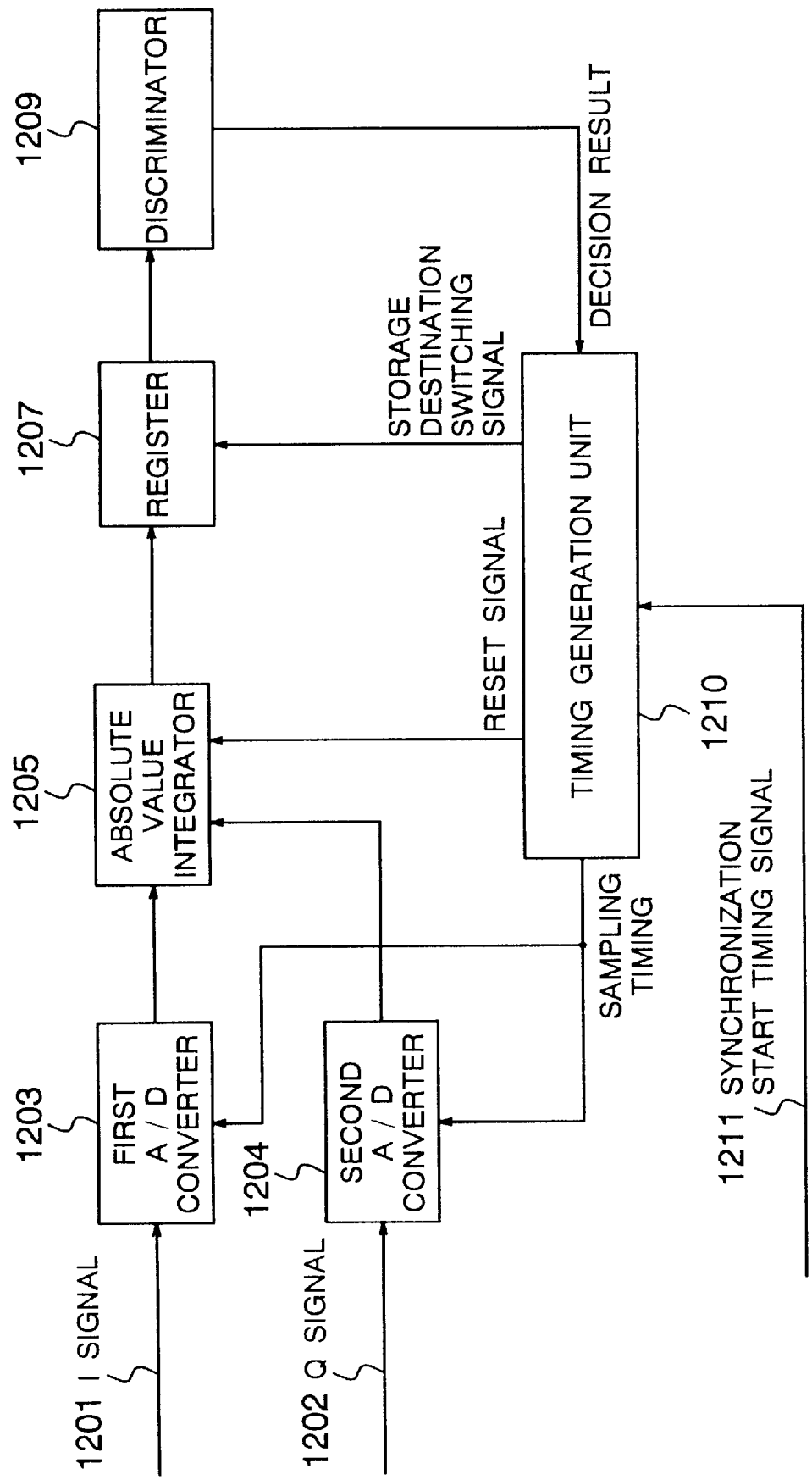
FIG. 12 is a block diagram of a phase detection circuit included in a synchronizing apparatus of an eighth embodiment of the present invention.

The receiver including the synchronizing apparatus of the eighth embodiment of the present invention is different from that of the sixth embodiment in that a phase detection circuit shown in FIG. 12 is provided as part of the synchronizing circuit 1008 and timing unit 1010.

This phase detection circuit has a first analog-to-digital converter (A/D converter) 1203 for converting an analog in-phase signal (I signal) 1201 into a digital in-phase signal, a second analog-to-digital converter (A/D converter) 1204 for converting an analog quadrature signal (Q signal) 1202 into a digital quadrature signal, an absolute value integrator 1205 for integrating the digital in-phase signal and the digital quadrature signal over a certain time, a register 1207 for storing the output signal from the absolute value integrator 1205, a discriminator 1209 for detecting synchronization by use of the output signal from the register 1207, and a timing generation unit 1210 for generating a sampling timing signal for the first and second A/D converters 1203, 1204, a reset signal for the absolute value integrator 1205, and a storage destination switching signal for the register 1207. To the timing generation unit 1210 are supplied a decision result from the discriminator 1209 and a synchronization start timing signal 1211 from the outside.

This phase detection circuit operates at the synchronization pulling-in time as part of the synchronizing circuit 1008 and timing unit 1010 of the receiver including the synchronizing apparatus of the sixth embodiment. When the synchronization start timing signal 1211 is supplied from the outside to the timing generation unit 1210, the timing generation unit 1210 generates the sampling timing signal indicative of timing for each symbol having a given initial phase and supplies it to the first and second A/D converters 1203, 1204. Thus, the analog in-phase signal (I signal) 1201 and the analog quadrature signal (Q signal) 1202 are converted from analog to digital form. Then, the absolute values of the output digital signals from the first and second A/D converters are integrated by the absolute value integrator 1205 over a predetermined time. The integrated values from the integrator 1205 are stored in the register 1207. Thereafter, the timing generation unit 1210 supplies a timing signal for each symbol having a different initial phase to the first and second A/D converters 1203, 1204, and the same operations are repeated. After the integrated values are obtained for some initial phases, all the integrated values stored in the register 1207 are supplied to the discriminator 1209, where the most probable integrated value is selected. The decision result indicative of the timing of the selected integrated value is supplied to the timing generation unit 1210.

In the synchronizing apparatus of this embodiment having such phase detection circuit, the optimum timing can be obtained without consideration of delay in the analog circuits. In addition, the synchronizing apparatus of this embodiment can be smaller-sized than that of the seventh embodiment.

(Ninth Embodiment)

Figure 13:
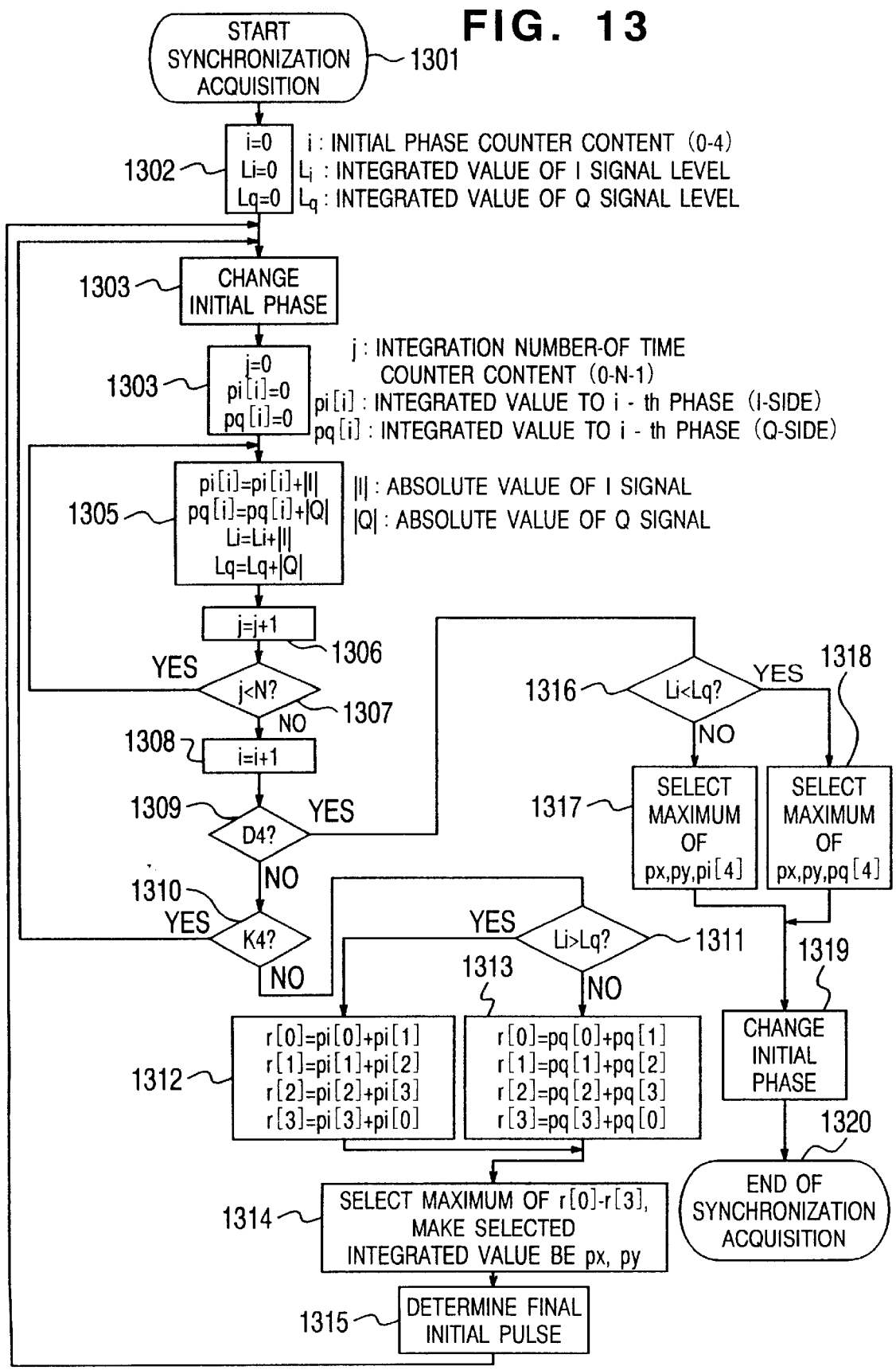
FIG. 13 is a flowchart for showing a phase detection procedure in a synchronizing apparatus of a ninth embodiment of the present invention.

The receiver including the synchronizing apparatus of the ninth embodiment of the present invention establishes symbol synchronization according to the phase detection procedure (synchronization acquisition procedure) shown in FIG. 13. The receiver including the synchronizing apparatus of this embodiment has the same construction as that of the seventh embodiment.

When the synchronization acquisition procedure is started at step 1301, the initial phase counter content i, the level integrated value $L_i$ of in-phase signal and the level integrated value $L_q$ of quadrature signal are all reset to 0 (at step 1302). Here, the initial phase counter content i can indicate five different initial phases (0–4) in order to divide the symbol time by four and finally to obtain one-eighth precision. The level integrated values $L_i$, $L_q$ are absolute value addition variables for the levels of in-phase signal side and quadrature signal side.

When the initial phase counter content i is zero, the initial phase is set at an arbitrary value, and the analog in-phase signal and analog quadrature signal are sampled (at step 1303). Then, the integration number-of-times counter content j, which is the contents of a counter for counting the number of times of integrating the absolute values, and $p_i[i]$, $p_q[i]$, which are variables for calculating the integration of the absolute values of the in-phase signal and quadrature signal, are all set to zero (at step 1304). At steps 1305 to 1307, the absolute value |I| of the in-phase signal is added to the variable $p_i[i]$, the absolute value |Q| of the quadrature signal is added to the variable $P_q[i]$, the absolute value |I| of the in-phase signal is added to the level integrated value $L_i$, and the absolute value |Q| of the quadrature signal is added to the level integrated value $L_q$. These operations are repeated N number of times of integration. Then, 1 is added to the initial phase counter content i (at step 1308), and if the initial phase counter content i after addition is less than 4 (at steps 1309, 1310), the initial phase is deviated ¼ by ¼ (at step 1303). Thereafter, the operations of steps 1304 to 1307 are repeated.

If the initial phase counter content i is larger than 4 at step 1310, the level integrated value $L_i$ and the level integrated value $L_q$ are compared with each other (at step 1311). Then, four variables r [0]–r [3] which are the addition of two successive sampling point levels are calculated depending on the results of comparison between the level integrated values $L_q$ and $L_i$ as follows (steps 1312, 1313).

(1) When the level integrated value $L_i$ is larger than the level integrated value $L_p$ (at step 1312), the variables r [0]14 r[4] are calculated by use of variables $p_i$ [i]:

$$r[0]=p_i[0]+p_i[1] \quad (3.1)$$

$$r[1]=p_i[1]+p_i[2] \quad (3.2)$$

$$r[2]=p_i[2]+p_i[3] \quad (3.3)$$

$$r[3]=p_i[3]+p_i[0] \quad (3.4)$$

(2) When the level integrated value $L_q$ is larger than the level integrated value $L_i$ (at step 1313), the variables r [0]–r [3] are calculated by use of variables $p_q$ [i]:

$$r[0]=p_q[0]+p_q[1] \quad (4.1)$$

$$r[1]=p_q[1]+p_q[2] \quad (4.2)$$

$$r[2]=p_q[2]+p_q[3] \quad (4.3)$$

$$r[3]=p_q[3]+p_q[0] \quad (4.4)$$

Thereafter, the maximum one of the calculated variables r [0]–r [3] is selected, and variables $p_x$, $p_y$ are found (at step 1314). If the variable r [1] of the variables r [0]–r [3] calculated at step 1312 is the maximum, the timing of variable $p_i$ [1] and variable $p_i$[2] can be decided to be most probable, and thus variable $p_x$=variable $p_i$ [1], and variable $p_y$=variable $p_i$ [2]. At step 1315, the final initial phase can be found by use of variables $p_x$, $p_y$. In the above example, since the most suitable point seems the timing of either variable $p_i$ [1], variable $p_i$ [2] or the intermediate point, the intermediate timing is found as the final initial phase. At step 1303, the initial phase is changed to the final initial phase found at step 1315, and the operations at the steps 1304 to 1309 are repeated. Then, at step 1316, the level integrated value $L_i$ and level integrated value $L_q$ are compared with each other.

If the level integrated value $L_i$ is larger than the level integrated value $L_q$, the largest one of the variables $p_x$, $p_y$, and $p_i$ [4] is selected (at step 1317). If the level integrated value $L_q$ is larger than the level integrated value $L_i$, the largest one of the variables $p_x$, $p_y$, and $p_q$ [4] is selected (at step 1318). Since the timing point at which the selected variable is sampled can be considered to be the most probable synchronization position, that timing is employed as the initial phase (at step 1319), and the synchronization acquisition operation ends (at step 1320).

(Tenth Embodiment)

Figure 14:
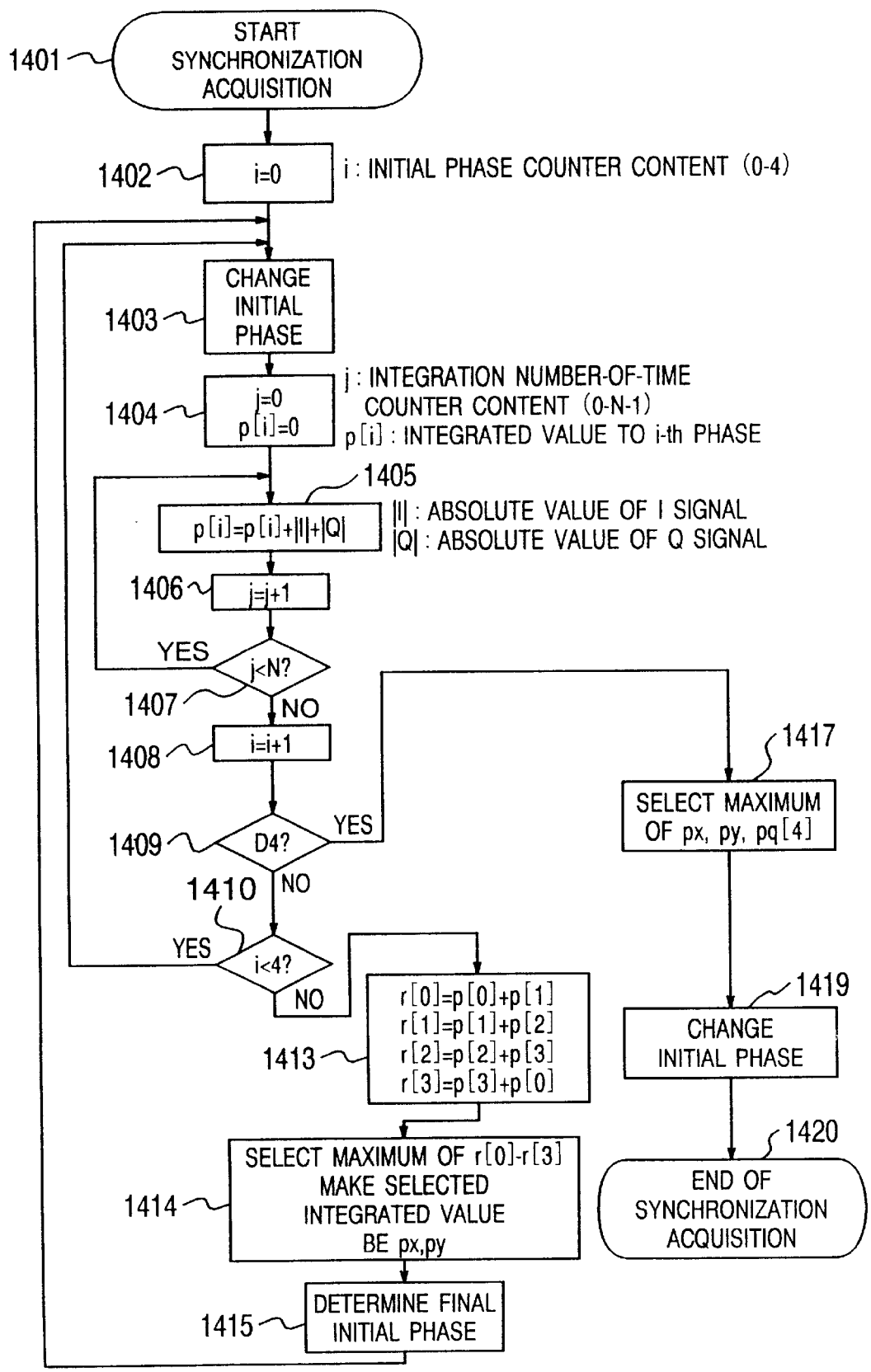
FIG. 14 is a flowchart for showing a phase detection procedure in a synchronizing apparatus of a tenth embodiment of the present invention.

The receiver including the synchronizing apparatus of the tenth embodiment of the present invention establishes symbol synchronization according to the phase detection procedure (synchronization acquisition procedure) shown in FIG. 14. The receiver including the synchronizing apparatus of this embodiment has the same construction as that of the eighth embodiment.

When the synchronization acquisition procedure is started at step 1401, the initial phase counter content i is set at 0 (at step 1402). Here, the initial phase counter content i can indicate five different initial phases (0–4) in order to divide the symbol time by four and finally to obtain one-eighth precision.

When the initial phase counter content i is zero, the initial phase is set at an arbitrary value, and the analog in-phase signal and analog quadrature signal are sampled (at step 1403). Then, the integration number-of-times counter content j which is the contents of a counter for counting the number of times of integrating the absolute values, and p [i], which is a variable for calculating the integration of the absolute values of the in-phase signal and quadrature signal, are all set to zero (at step 1404). At steps 1405 to 1407, the absolute value |I| of the in-phase signal and the absolute value |Q| of the quadrature signal are added to the variable p [i]. These operations are repeated N number of times of integration. Then, 1 is added to the initial phase counter content i (at step 1408), and if the initial phase counter content i after addition is less than 4 (at steps 1409, 1410), the initial phase is deviated ¼ by ¼ (at step 1403). Thereafter, the operations of steps 1404 to 1407 are repeated.

If the initial phase counter content i is larger than 4 at step 1410, four variables r [0]–r [3] which are the addition of two successive sampling point levels are calculated by use of variables p [i] as follows (at step 1413):

$$r[0]=p[0]+p[1] \qquad (5.1)$$

$$r[1]=p[1]+p[2] \qquad (5.2)$$

$$r[2]=p[2]+p[3] \qquad (5.3)$$

$$r[3]=p[3]+p[0] \qquad (5.4)$$

Thereafter, the maximum one of the calculated variables r [0]–r [3] is selected, and variables $p_x$, $p_y$ are found (at step 1414). If the variable r [1] of the variables r [0]–r [3] calculated at step 1413 is the maximum, the timing of variable p [1] and variable p [2] can be decided to be most probable, and thus variable $p_x$=variable p [1], and variable $p_y$=variable p [2]. At step 1415, the final initial phase can be found by use of variables $p_x$, $p_y$. In the above example, since the most suitable point seems the timing of either variable p [1], variable p [2] or the intermediate point, the intermediate timing is found as the final initial phase. At step 1403, the initial phase is changed to the final initial phase found at step 1415, and the operations at the steps 1404 to 1410 are repeated.

If the initial phase counter content i after addition is larger than 4 at step 1409, the largest one of the variables $p_x$, $p_y$, and p [4] is selected (at step 1417). Since the timing point at which the selected variable is sampled can be considered to be the most probable synchronization position, that timing is employed as the initial phase (at step 1419), and the synchronization acquisition operation ends (at step 1420).

(Eleventh Embodiment)

Figure 15:
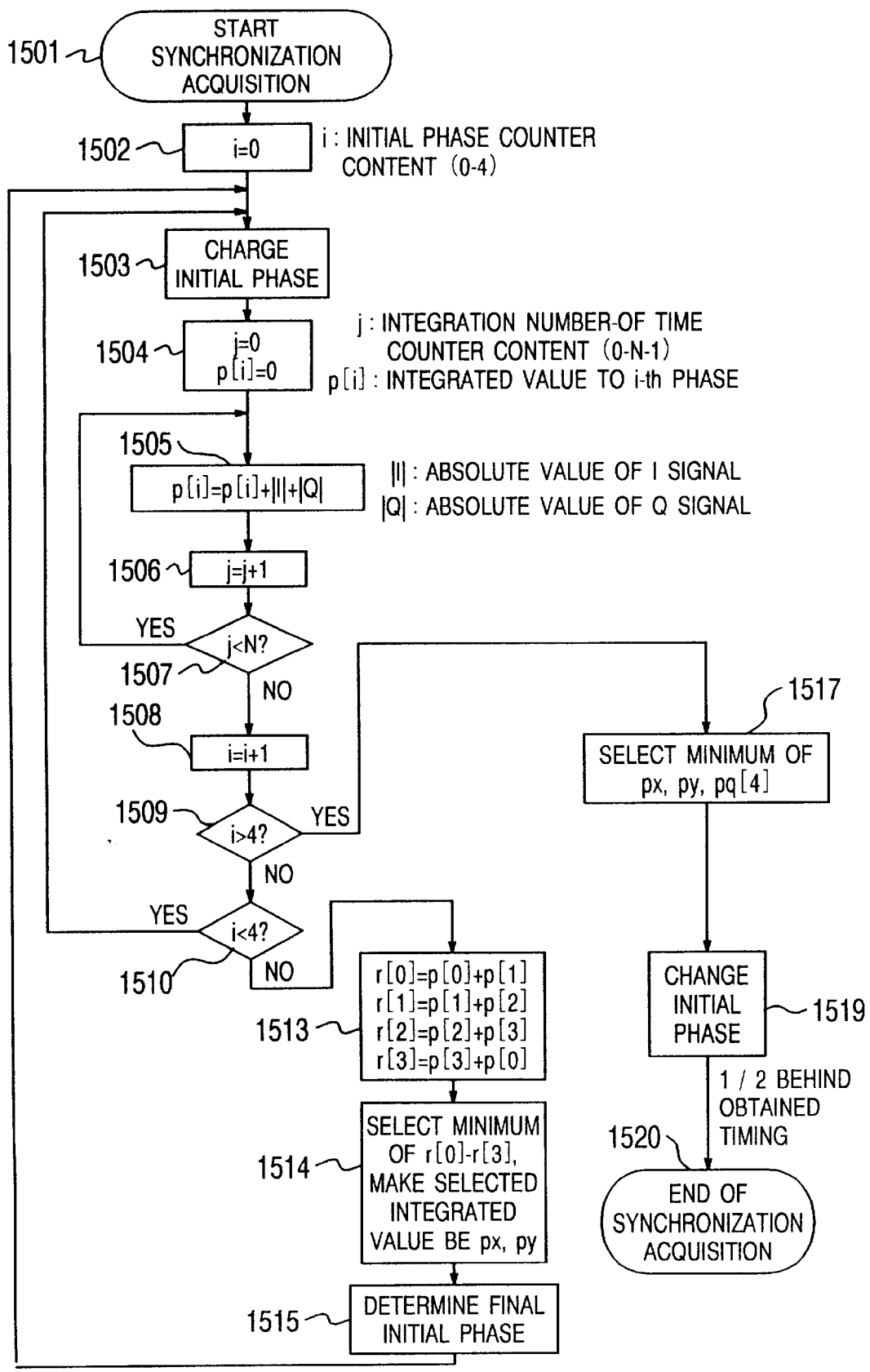
FIG. 15 is a flowchart for showing a phase detection procedure in a synchronizing apparatus of an eleventh embodiment of the present invention.

The receiver including the synchronizing apparatus of the eleventh embodiment of the present invention establishes symbol synchronization according to the phase detection procedure (synchronization acquisition procedure) shown in FIG. 15. The receiver including the synchronizing apparatus of this embodiment is an improvement in the performance of the phase detection procedure in the receiver including the synchronizing apparatus of the tenth embodiment.

When the synchronization acquisition procedure is started at step 1501, the initial phase counter content i is set at 0 (at step 1502). Here, the initial phase counter content i can indicate five different initial phases (0–4) in order to divide the symbol time by four and finally to obtain one-eighth precision.

When the initial phase counter content i is zero, the initial phase is set at an arbitrary value, and the analog in-phase signal and analog quadrature signal are sampled (at step 1503). Then, the integration number-of-times counter content j, which is the contents of a counter for counting the number of times of integrating the absolute values, and p [i], which is a variable for calculating the integration of the absolute values of the in-phase signal and quadrature signal, are all set to zero (at step 1504). At steps 1505 to 1507, the absolute value |I| of the in-phase signal and the absolute value |Q| of the quadrature signal are added to the variable p [i]. These operations are repeated N number of times of integration. Then, 1 is added to the initial phase counter content i (at step 1508), and if the initial phase counter content i after addition is less than 4 (at steps 1509, 1510), the initial phase is deviated ¼ by ¼ (at step 1503). Thereafter, the operations of steps 1504 to 1507 are repeated.

If the initial phase counter content i is larger than 4 at step 1510, four variables r [0]–r [3] which are the addition of two successive sampling point levels are calculated by use of variables p [i] as follows (at step 1513):

$$r[0]=p[0]+p[1] \qquad (6.1)$$

$$r[1]=p[1]+p[2] \qquad (6.2)$$

$$r[2]=p[2]+p[3] \qquad (6.3)$$

$$r[3]=p[3]+p[0] \qquad (6.4)$$

Thereafter, the minimum one of the calculated variables r [0]–r [3] is selected, and variables $p_x$, $p_y$ are found (at step 1514). If the variable r [1] of the variables r [0]–r [3] calculated at step 1513 is the minimum, the timing of variable p [1] and variable p [2] can be decided to be most probable, and thus variable $p_x$=variable p [1], and variable $p_y$=variable p [2]. At step 1515, the final initial phase can be found by use of variables $p_x$, $p_y$. In the above example, since the most suitable point seems the timing of either variable p [1], variable p [2] or the intermediate point, the intermediate timing is found as the final initial phase. At step 1503, the initial phase is changed to the final initial phase found at step 1515, and the operations at the steps 1504 to 1510 are repeated.

If the initial phase counter content i after addition is larger than 4 at step 1509, the smallest one of the variables $p_x$, $p_y$, and p [4] is selected (at step 1517). Since the timing point at which the selected variable is sampled can be considered to be the most probable synchronization position, ½ symbol behind that timing is employed as the initial phase (at step 1519), and the synchronization acquisition operation ends (at step 1520).

Although the synchronizing apparatus of the tenth embodiment selected the largest one of the variables $p_x$, $p_y$ and p [4] at step 1417, the smallest one thereof changes more quickly, and thus the synchronizing apparatus of this embodiment has higher detection precision. Since the minimum value, or detection position is located ½ symbol away from the symbol discriminated point, the timing is finally shifted that amount.

The phase detection procedure in the synchronizing apparatus of this embodiment can be applied to the synchronizing apparatus of the ninth embodiment.

(Twelfth Embodiment)

Figure 16:
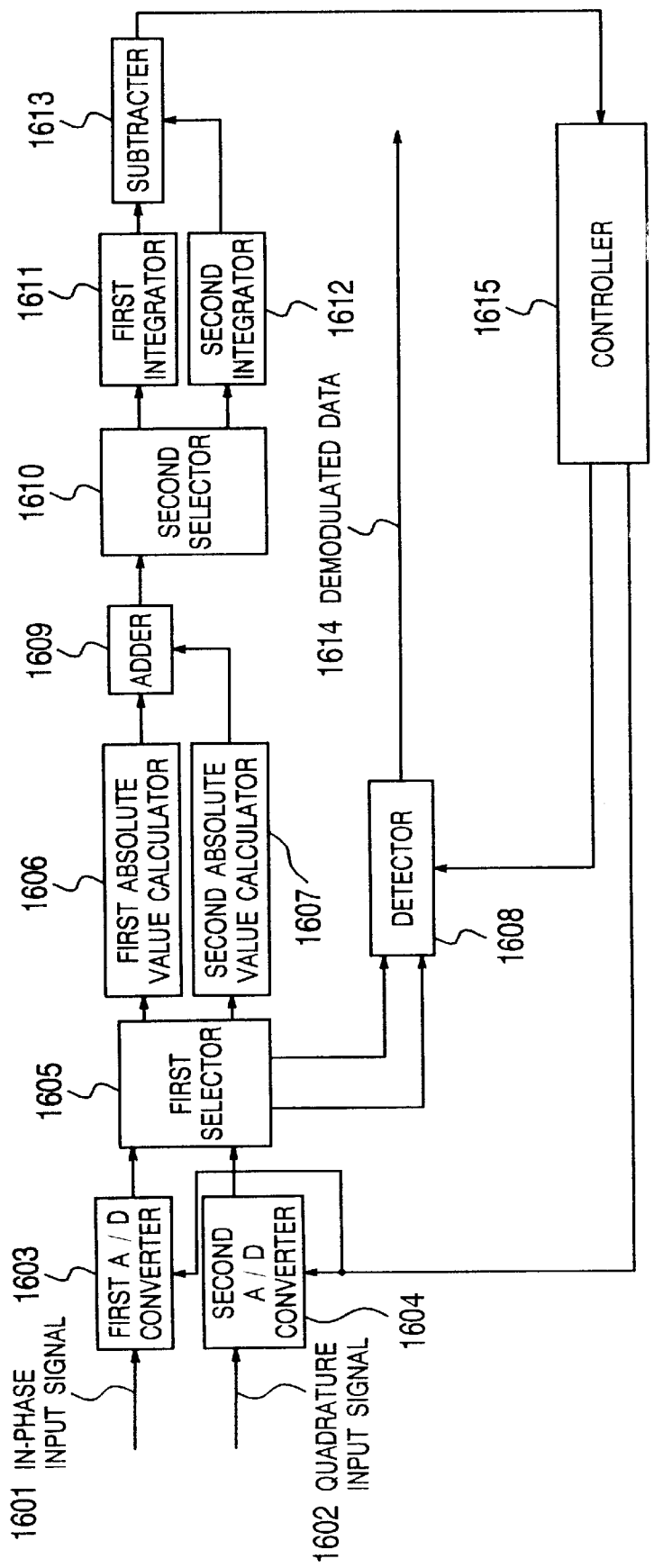
FIG. 16 is a block diagram of a receiver including a synchronizing apparatus of a twelfth embodiment of the present invention.

The receiver of a digital mobile communication system including the synchronizing apparatus of the twelfth embodiment of the present invention has, as shown in FIG. 16, a first analog-to-digital converter (A/D converter) 1603 for converting an analog in-phase input signal 1601 into a digital in-phase signal by sampling, a second analog-to-digital converter (A/D converter) 1604 for converting an analog quadrature input signal 1602 into a digital quadrature input signal by sampling, a first selector 1605 to which the output signals from the first and second A/D converters 1603, 1604 are applied, first and second absolute value calculators 1606, 1607 to which the two output signals from the first selector 1605 are applied, respectively, a detector 1608 to which the two output signals from the first selector 1605 are applied, an adder 1609 by which the output signals from the first and second absolute value calculators 1606, 1607 are added, a second selector 1610 to which the output signal from the adder 1609 is applied, first and second integrators 1611, 1612 to which the two output signals from the second selector 1610 are applied, respectively, a subtracter 1613 for subtracting between the output signals from the first and second integrators 1611, 1612, and a controller 1615 to which the output signal from the subtracter 1613 is applied.

The operation of this receiver will be described in which the sampling interval is T/4 (T is the interval between symbols) and synchronization is acquired at a precision of T/8.

The first and second A/D converters 1603, 1604 sample the analog in-phase input signal 1601 and analog quadrature input signal 1602 at sampling intervals of T/4 in response to a timing signal from the controller 1615. In this case, when the synchronization acquisition operation is started, the timing signal from the controller 1615 may be an arbitrary one. Since sampling is made at intervals of T/4, sampling is made four times during one symbol interval T.

The first selector 1605 receives the in-phase input signal and quadrature input signal that have been passed through the first and second A/D converters 1603, 1604 by which they have been sampled four times during each symbol interval T, and it supplies the odd-numbered samples to the first and second absolute value calculators 1606, 1607 and the fourth samples to the detector 1608. The first and second absolute value calculators 1606, 1607 calculate the absolute values of the in-phase input signal and quadrature input signal. The adder 1609 adds the calculated absolute values of the in-phase input signal and quadrature input signal. The output signal from the adder 1609 is distributed at each sampling interval to the first and second integrators 1611, 1612 by the second selector 1610. The output signals from the adder 1609 through the second selector 1610, after being distributed at each sampling interval, are integrated by the first and second integrators 1611, 1612, respectively. The two integrated results are subtracted from each other by the subtracter 1613, and the subtracted result is supplied to the controller 1615, where decision is made of what direction the synchronization position is shifted according to the positive or negative sign of the subtracted result. The synchronization position is shifted T/8 by T/8. There-after, the contents of the first and second integrators 1611, 1612 are cleared.

The above operations are repeated so that the synchronization position is deviated. Thus, the in-phase signal and quadrature input signal fed to the detector 1608 are converged at a position farthest from their zero-cross points (namely, the optimum discrimination point), and thus demodulated data 1614 from the detector 1608 can be improved in its quality.

By changing the interval at which the integrated results in the first and second integrators 1611, 1612 are compared with each other, it is possible to control the synchronization pulling-in speed and the jitter after pulling-in.

Although in the above construction the output signals from the first and second absolute value calculators 1606, 1607 are added by the adder 1609, the larger one may be selected. In this case, if a preamble of, for example, such a particular pattern as to surely cross a zero point in each symbol (such that the synchronizing signal has a sine wave in which the phase is changed 180 degrees at each symbol point) is added to the head of data, the synchronization pull-in speed and synchronization pull-in precision can be raised.

In addition, if the synchronization position is shifted only when the result from the subtracter 1613 exceeds a predetermined threshold, the synchronization can be stabilized.

The receiver including the synchronizing apparatus of this embodiment, unlike the system in which synchronization is started to be sequentially established from its start timing, is sure to operate if the synchronization start timing is shifted, and thus synchronization can be acquired even if it is started from any state.

(Thirteenth Embodiment)

Figure 17:
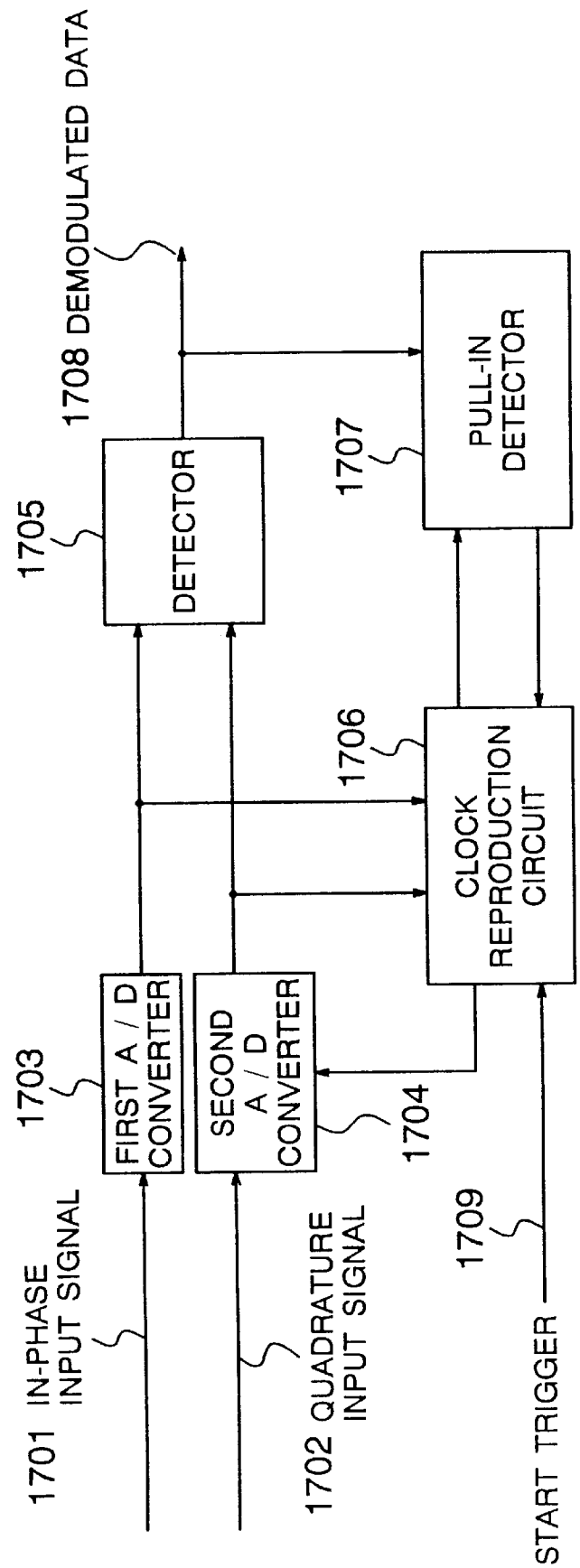
FIG. 17 is a block diagram of a receiver including a synchronizing apparatus of a thirteenth embodiment of the present invention.

The receiver of a digital mobile communication system including the synchronizing apparatus of the thirteenth embodiment of the present invention has, as shown in FIG. 17, a first analog-to-digital converter (A/D converter) 1703 for converting an analog in-phase input signal 1701 into a digital in-phase input signal by sampling, a second analog-to-digital converter (A/D converter) 1704 for converting an analog quadrature input signal 1702 into a digital quadrature input signal by sampling, a detector 1705 to which the output signals from the first and second A/D converters 1703, 1704 are applied, a clock reproduction circuit 1706 that receives a start trigger 1709 from the outside, the output signals from the first and second A/D converters 1703, 1704 and an output signal from a pull-in detector 1707, and the pull-in detector 1707 to which the output signals from the detector 1705 and clock reproduction circuit 1706 are applied.

When the start trigger 1709 is supplied to the clock reproduction circuit 1706, clock reproduction operation is started in the same way as in the synchronizing apparatus of the first to twelfth embodiments. Particularly, as in the synchronizing apparatus of the sixth to twelfth embodiments, the in-phase input signal 1701 and quadrature input signal 1702 are sampled by the first and second A/D converters 1703, 1704, and used so that the optimum timing can be acquired without considering the delay in the analog circuits.

The detector 1705 detects the in-phase input signal 1701 and quadrature input signal 1702 from the first and second A/D converters in response to the most suitable timing signal from the clock reproduction circuit 1706, thereby generating demodulated data 1708. Thus, the demodulated data 1708 has high quality.

The pull-in detector 1707 receives the demodulated data 1708 from the detector 1705 and the output signal from the clock reproduction circuit 1706 and decides whether or not synchronization has been acquired by observing the demodulated data 1708 and the internal state of the clock reproduction circuit 1706. If synchronization is decided to have been acquired, the clock reproduction circuit 1706 is made to hold synchronization by the output signal from the pull-in detector 1707. Thus, jitter in data interval can be suppressed, and the error rate characteristic can be improved. Moreover, if a preamble of a sequence of particular pattern (particularly, such that a synchronizing signal is of a sine wave in which its phase is changed 180 degrees at each symbol) is provided at the head of the transmission signal, synchronization pull-in operation can be performed on the preamble-particularized pull-in logic, and thus synchronization pull-in operation can be realized at high speed and high precision. As a result, there is no need to make such complicated control operations as to change the position for start trigger and synchronization holding timing on the basis of the distance between the transmitter and the receiver.

In the receiver including the synchronizing apparatus of this embodiment, since synchronization pulling-in is automatically detected, jitter in the data interval can be suppressed, and the error rate characteristic can be improved. In addition, since synchronization pulling-in is automatically detected, there is no need to control the timing for holding synchronization, and thus the control is simplified. Moreover, when a particular synchronizing pattern is added to the head of data, data portion is stopped from clock reproduction, and hence synchronization pulling-in can be performed by a particular pattern particularized method and on the high-speed, high-precision synchronization pull-in logic so that high-speed and high-precision pulling-in can be realized.

(Fourteenth Embodiment)

Figure 18:
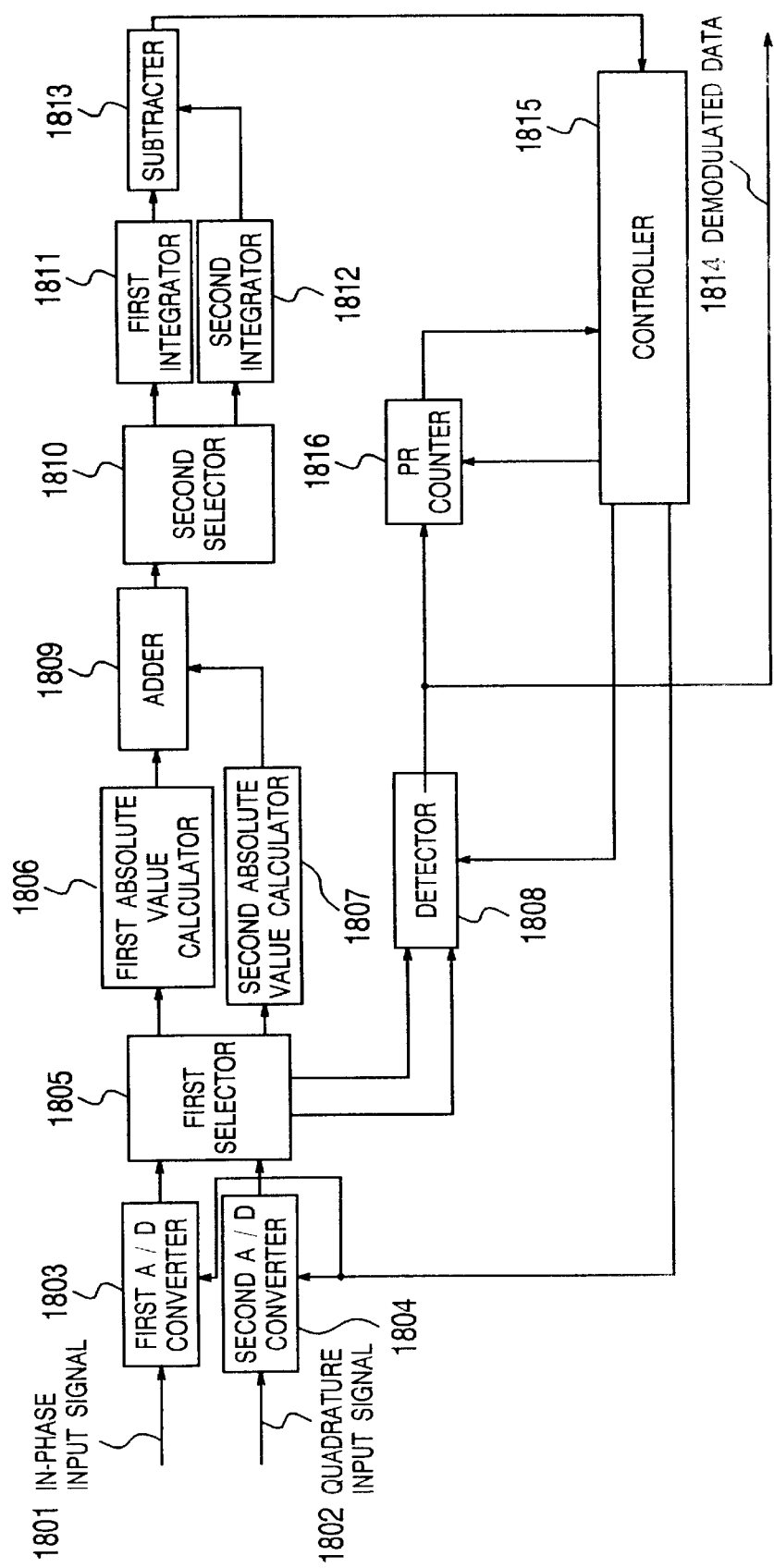
FIG. 18 is a block diagram of a receiver including a synchronizing apparatus of a fourteenth embodiment of the present invention.

The receiver of a digital mobile communication system including the synchronizing apparatus of the fourteenth embodiment of the present invention has, as shown in FIG. 18, a first analog-to-digital converter (A/D converter) 1803 for converting an analog in-phase input signal 1801 into a digital in-phase input signal by sampling, a second analog-to-digital converter (A/D converter) 1804 for converting an analog quadrature signal 1802 into a digital quadrature input signal by sampling, a first selector 1805 to which the output signals from the first and second A/D converters 1803, 1804 are supplied, first and second absolute value calculators 1806, 1807 to which two output signals from the first selector 1805 are respectively applied, a detector 1808 to which two output signals from the first selector 1805 are applied, an adder 1809 for adding the output signals from the first and second absolute value calculators 1806, 1807, a second selector 1810 to which the output signal from the adder 1809 is applied, first and second integrators 1811, 1812 to which two output signals from the second selector 1810 are applied respectively, a subtracter 1813 for subtracting between the output signals from the first and second integrators 1811, 1812, a controller 1815 to which the output signals from the subtracter 1813 is applied, and a PR counter 1816 to which the output signal (demodulated data 1814) from the detector 1808 is applied. The output signals from the controller 1815 are supplied to the first and second A/D converters 1803, 1804 and detector 1808, respectively, and the output signal from the PR counter 1816 is supplied to the controller 1815.

A description will be made of the operation of this receiver in which a preamble of "1"s is added to the head of data over several tens of symbols, and T/8-precision synchronization is acquired at a sampling interval of T/4(T is the symbol interval).

The first and second A/D converters 1803, 1804 sample the analog in-phase input signal 1801, and analog quadrature input signal 1802 at sampling intervals of T/4 in response to the timing signal from the controller 1815, respectively. At the start of synchronization acquisition operation, the timing signal from the controller 1815 may be an arbitrary timing signal. Since the sampling is made at sampling intervals of T/4, sampling is performed four times during each symbol interval T.

The first selector 1805 distributes the in-phase input signal and quadrature input signal after they are sampled four times during each symbol interval T by the first and second converters 1803, 1804 so that the odd-numbered samples can be fed to the first and second absolute value calculators 1806, 1807, and that the fourth samples can be fed to the detector 1808. The fist and second absolute value calculators 1806, 1807 calculate the absolute values of the in-phase input signal and quadrature input signal, respectively. The adder 1809 adds the calculated absolute values of the in-phase and quadrature input signals. The output signal from the adder 1809 is distributed through the second selector 1810 to the first and second integrators 1811, 1812 at each sampling interval. The output signal from the adder 1809 which has been distributed at sampling intervals is integrated by the first and second integrators 1811, 1812. The two integrated results are subtracted from each other by the subtracter 1813. The subtracted result is fed to the controller 1815 where decision is made of what direction the synchronization position is shifted depending on the positive or negative sign of the subtracted result. In this case, the synchronization position is shifted T/8 by T/8. Then, the contents of the first and second integrators 1811, 1812 are cleared.

When the above operations are repeated so that the synchronization position is shifted, the in-phase and quadrature input signals supplied to the detector 1808 are converged at the farthest position (namely, optimum discrimination point) from their zero-cross point. Thus, the demodulated data 1814 produced as the detected result can be improved in its quality.

The PR counter 1816 counts the number of "1"s successively demodulated while observing the demodulated data 1814 from the detector 1808. When this number of times exceeds a predetermined threshold, it decides that synchronization pulling-in has been finished, and supplies an output signal indicating the start of holding synchronization to the controller 1815.

By changing the interval at which the integrated results from the first and second integrators 1811, 1812 are compared, it is possible to control synchronization pull-in speed and jitter after pulling-in.

While the output signals from the first and second absolute value calculators 1806, 1807 are added by the adder 1809 in the above construction, a larger value may be selected. In addition, only when the subtracted result from the subtracter 1813 exceeds a predetermined threshold, the synchronization position may be deviated, thereby more stabilizing the synchronization.

According to the receiver including the synchronizing apparatus of this embodiment, since the operation can be assured even if the synchronization start time is shifted unlike the system in which synchronization is started sequentially from the synchronization start timing, synchronization can be acquired even by starting from any state. In addition, since the synchronization holding start timing is automatically detected, the control is simple. More-over, since synchronization is held during data period, a standard of how many successive symbols of the demodulated result is decided to be correct is employed when a preamble such as a succession of a particular pattern (particularly, the synchronizing signal is of a sine wave in which the phase is changed 180 degrees at each symbol) is provided at the head of the transmission signal, thereby increasing the detection accuracy in the synchronization acquisition.

According to the receiver including the synchronizing apparatus of this embodiment, since synchronization pulling-in is automatically detected, jitter during data period can be suppressed, and thus the error rate characteristic can be improved. Moreover, by the automatic synchronization pulling-in detection, it is possible to omit the synchronization holding timing control, and thus the control can be simplified. In addition, when a particular pattern is added to the head of data, data portion is stopped from being reproduced at clocks, and thus synchronization pulling-in can be performed by a particular pattern particularized method and on the high-speed, high-precision synchronization pull-in logic so that high-speed and high-precision pulling-in can be realized.

(Fifteenth Embodiment)

Figure 19:
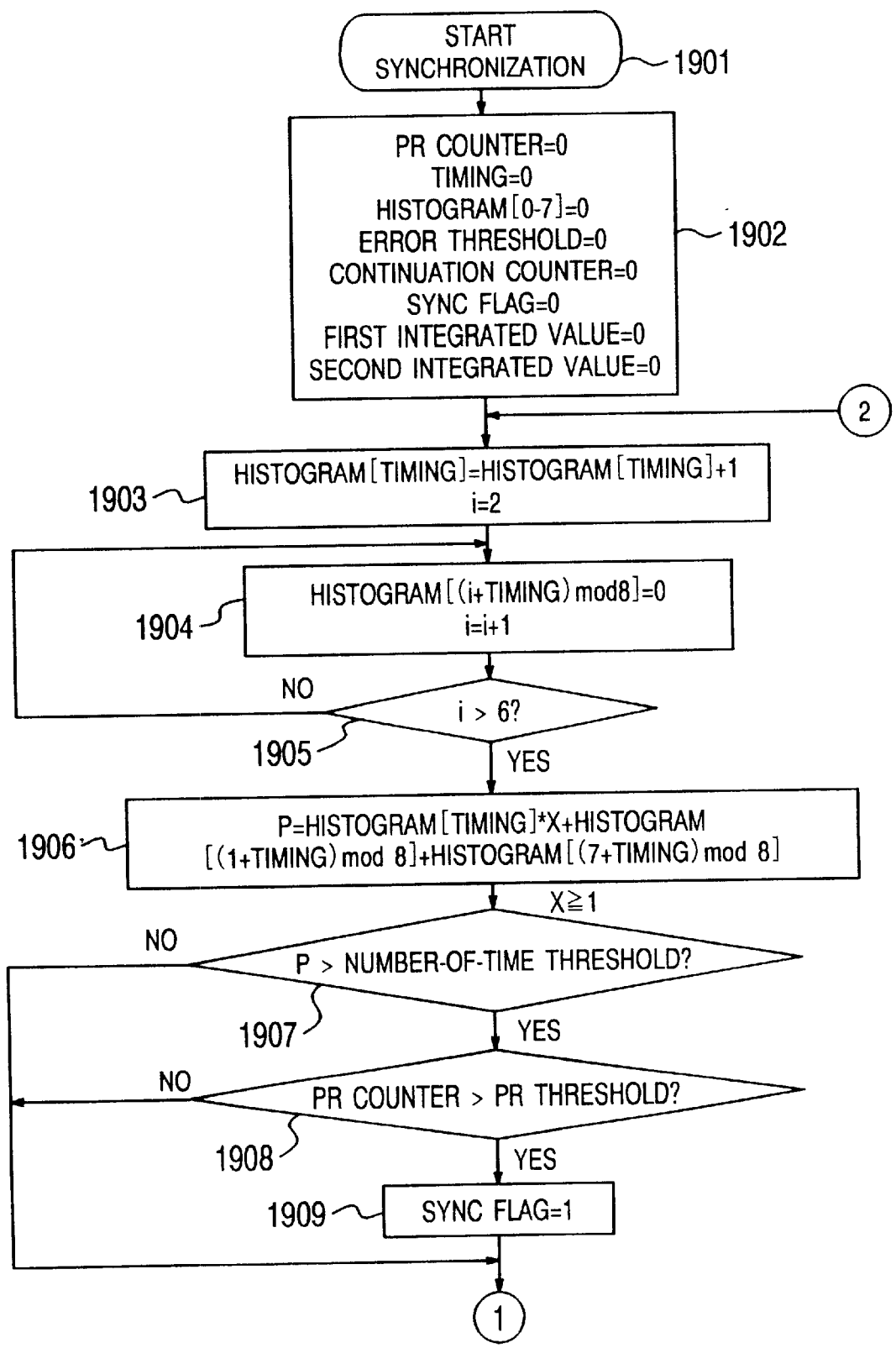
FIGS. 19 and 20 are flowcharts for showing a phase detection procedure in a synchronizing apparatus of a fifteenth embodiment of the present invention.
Figure 20:
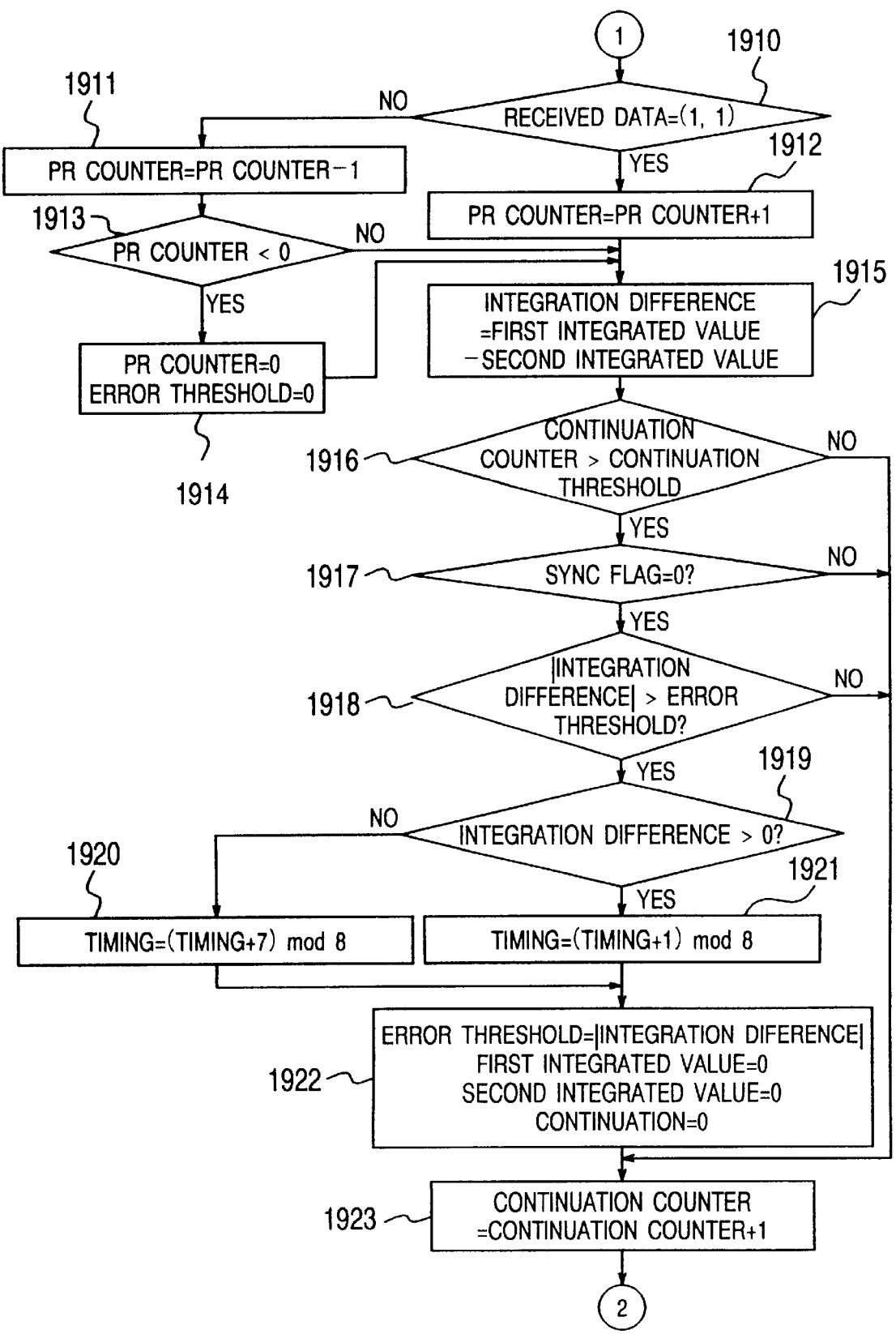

The receiver including the synchronizing apparatus of the fifteenth embodiment of the present invention establishes symbol synchronization according to the phase detection procedure (synchronization acquisition procedure) shown in FIGS. 19, 20. The receiver including the synchronizing apparatus of this embodiment has the same construction as that of the fourteenth embodiment.

When the synchronization acquisition procedure is started at step 1901, the following values are initialized to be zero: the contents of the PR counter for counting the number of symbols over which the "1"s added as preambles are successively demodulated, the initial position of timing, all the initial values of the histogram at 8 different timing positions, the error threshold, the continuation counter contents, the synchronization flag of which "0" indicates that synchronization is being pulled in, and of which "1" indicates that synchronization is in the hold state, and the first and second integrated values (step 1902).

Then, "1" is added to the histogram to the present timing, and the variable (counter) i is changed to "2" (at step 1903). Thereafter, the histogram to the timing that is separated by variable i from the present timing is changed to zero, and "1" is added to the variable i. This operation is repeated until the variable i reaches "6" (at step 1904). The histogram values to the timing, separated 2 or more from the present timing, are all changed to zero. Then, the histogram value to the present timing and the histogram values for both adjacent timings are added to produce the sum, P (at step 1906). At this time, a weight X that is larger than 1 is added to the histogram value to the present timing, thereby increasing the detection precision. If the weight X is a power of 2, this weighting can be realized by only shifting data in a shift register, and thus no multiplier is necessary. The sum P is compared with a certain number-of-time threshold (at step 1907). If the sum P is larger than the certain number-of-time threshold, the count of the PR counter is compared with a predetermined PR threshold (at step 1908). If the count of the PR counter is larger than the predetermined PR threshold, the synchronization flag is turned "1", so that the synchronization holding state is brought about (at step 1909).

The operations from step 1907 to step 1909 can detect that the histogram values to the present timing and around its neighborhood are large (that is, synchronization stays at around the present timing position), and bring the synchronization holding state only when data after demodulation seems to be certainly a preamble pattern.

When the sum P is smaller than the certain number-of-time threshold at step 1907, or when the count of the PR counter is smaller than the predetermined PR threshold at step 1908, it is examined if received data is "1" (at step 1910 in FIG. 20). Here, under the assumption that one symbol is transmitted in two bits like QPSK, it is examined if two bits of received data are both "1". If the received data is "1", the content of the PR counter is incremented by "1" (at step 1912). If the received data is not "1", the content of the PR counter is decremented by "1" (at step 1911). Then, it is examined if the changed content of the PR counter is negative (at step 1913). If the content of the PR counter is negative, the content of the PR counter and the error threshold are made "0" (at step 1914).

Then, the integration difference is found by subtracting the first integrated value from the second integrated value (at step 1915). Here, the first and second integrated values are produced from the first and second integrators 1811, 1812 shown in FIG. 18, and the absolute values of the in-phase input signal and quadrature input signal at different sampling time points (separated by T/2, in this example) are previously automatically added.

Thereafter, at steps 1916 to 1918, the following decisions are made of whether:
(1) the continuation counter value is larger than a continuation threshold (namely, whether or not the number of times that synchronization stays at the same timing position has exceeded a certain number-of-times threshold),
(2) the synchronization flag is "0" or not (that is, whether or not synchronization is in the middle of acquisition), and
(3) the absolute value of the integration difference is larger than the error threshold (that is, synchronization is not shifted unless there is a more strict condition than the previous condition at which synchronization was shifted, so that synchronization can be stabilized).

If the above three conditions are all "YES", the sign of the integration difference is detected (at step 1919). If the integration difference is positive, timing is advanced by "1" (at step 1921). If the integration difference is negative, timing is drawn back by "1" (at step 1922). Here, it shows the remainder after the division by mod 8. When synchronization is acquired at a precision of T/8 as in this example, there are only eight different timings, and thus such arithmetic operation is performed. Thereafter, at step 1922, the absolute value of the integration difference is made equal to the error threshold, and thus synchronization is not shifted unless the integration difference is gradually increased, thereby stabilizing the synchronization. Therefore, since synchronization position is changed, both the first and second integrated values are cleared, and the content of the continuation counter for counting the number of times that synchronization stays at the same timing position is also cleared.

If any one of the three decisions is "NO" or when the operation at step 1922 is completed, the content of the continuation counter is incremented by "1" (at step 1923), and then the processing goes back to step 1903 shown in FIG. 19. Thereafter, the same operations are repeated until the next synchronization start signal comes.

According to the receiver including the synchronizing apparatus of this embodiment mentioned above, the automatic detection of synchronization pulling-in can suppress jitter in the data interval, and thus improve the error rate characteristic. In addition, the automatic detection of synchronization pulling-in can make it unnecessary to control the timing of synchronization holding, thus simplifying the control. Moreover, when a particular synchronization pattern is added to the head of data, the data portion is stopped from clock reproduction, and thus synchronization pulling-in can be performed by a particular pattern particularized method and on the high-speed, high-precision synchronization pull-in logic. Further-more, since the synchronization pulling-in detection is estimated from two factors of the demodulated result and synchronized state, it can be made at high precision. Making the synchronization pulling-in condition gradually strict increases synchronization stability, and adjusting of parameters (PR threshold, continuation threshold and number-of-times threshold) enables synchronization performance (pull-in speed, holding characteristic) to be adjusted.

(Sixteenth Embodiment)

Figure 21:
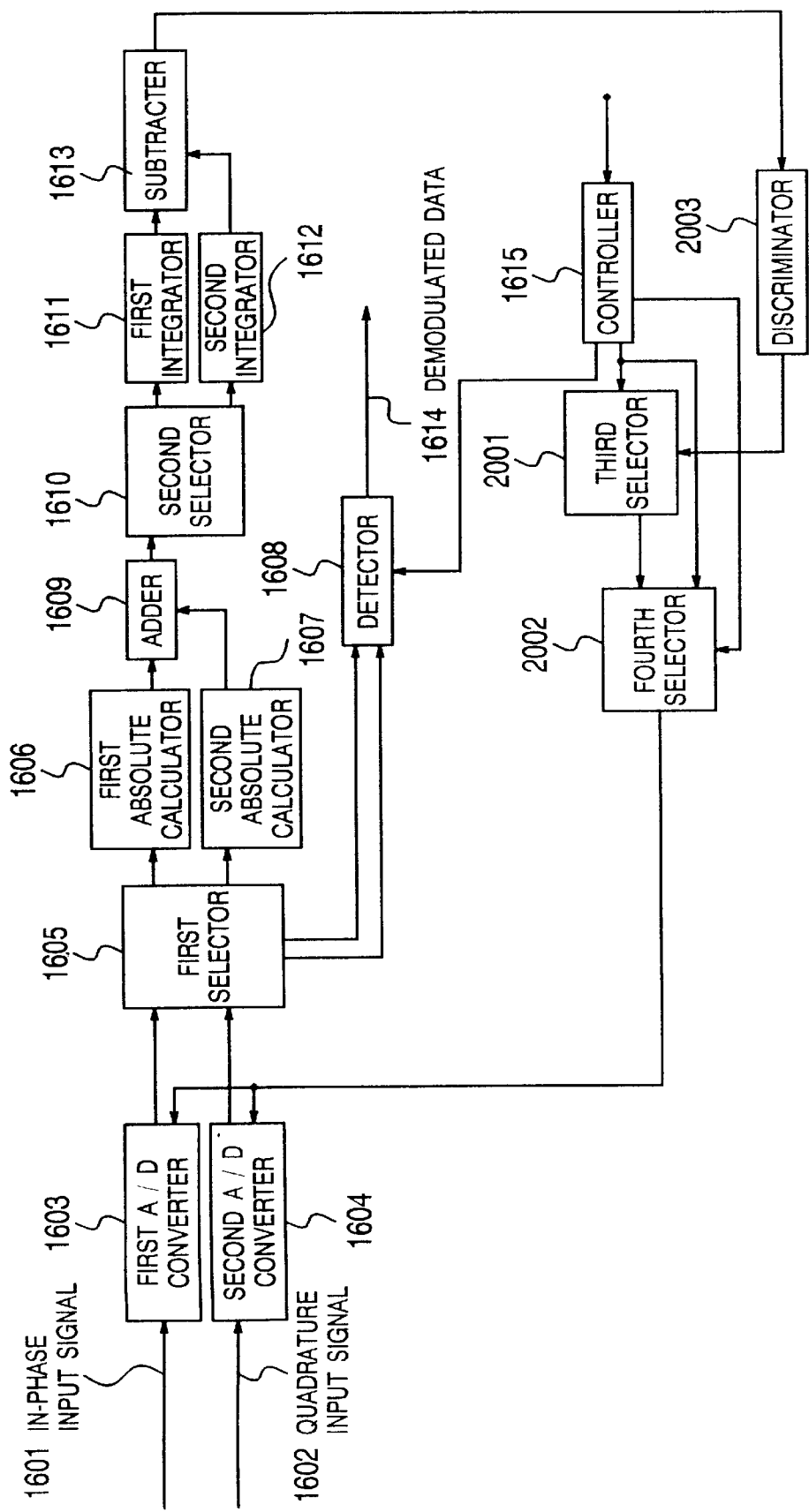
FIG. 21 is a block diagram of a receiver including a synchronizing apparatus of a sixteenth embodiment of the present invention.

The receiver including the synchronizing apparatus of the sixteenth embodiment of the present invention is different from that of the twelfth embodiment shown in FIG. 16 in that it has, as shown in FIG. 21, third and fourth selectors 2001, 2002 provided between the controller 1615 and the first and second A/D converters 1603, 1604, and a discriminator 2003 provided between the subtracter 1613 and the third selector 2001. In other words, this receiver, after being brought to the synchronization holding condition, reduces the sampling frequency in the first and second A/D converters 1603, 1604 to the same frequency as the symbol rate of the in-phase input signal 1601 and quadrature input signal 1602.

A description will be made of the operation of this receiver in which a preamble of "1"s is added to the head of data over several tens of symbols, and the sampling frequency of the first and second A/D converters 1603, 1604 is selected twice the symbol rate.

The operations up to where the reproduction clock is produced from the controller 1615 are the same as in the receiver including the synchronizing apparatus of the twelfth embodiment. The reproduction clock (the frequency is 2×symbol rate) produced from the controller 1615 is supplied to the third selector 2001. The integration difference from the subtracter 1613 is decided by the discriminator 2003, and the result from the discriminator 2003 controls the third selector 2001. Here, the first and second A/D converters 1603, 1604 sample twice during each symbol period since their sampling frequency is twice the symbol rate. The third selector 2001 is responsive to the control signal from the discriminator 2003 to select a signal indicative of odd-numbered samples (namely, the reproduction clock from the controller 1615, of which the frequency is reduced to the same frequency as the symbol rate) or a signal indicative of even-numbered samples (that is, the reproduction clock from the controller 1615, of which the frequency is reduced to the same frequency as the symbol rate, and which is delayed by (symbol period)/2).

The reproduction clock from the controller 1615 and the signal indicative of the odd-numbered samples or even-numbered samples selected by the third selector 2001 are supplied to the fourth selector 2002. The fourth selector 2002 is controlled by the a control signal indicative of a synchronization pull-in state or a synchronization holding state supplied from the controller 1615. That is, when the control signal from the controller 1615 indicates the synchronization pull-in state, the fourth selector 2002 selects the reproduction clock from the controller 1615 (namely, a signal of which the frequency is twice the symbol rate). When the control signal from the controller 1615 indicates the synchronization holding state, the fourth selector 2002 selects the signal indicative of the odd-numbered samples or even-numbered samples (namely, a signal of which the frequency is reduced to the same frequency as the symbol rate) that has been selected by the third selector 2001.

Thus, according to the receiver including the synchronizing apparatus of this embodiment, the first and second A/D converters 1603, 1604 sample the input signals in response to the signal of which the frequency was reduced to the same frequency as the symbol rate after the synchronization holding state has been brought about, and consequently the consumption power can be reduced.

(Seventeenth Embodiment)

Figure 22:
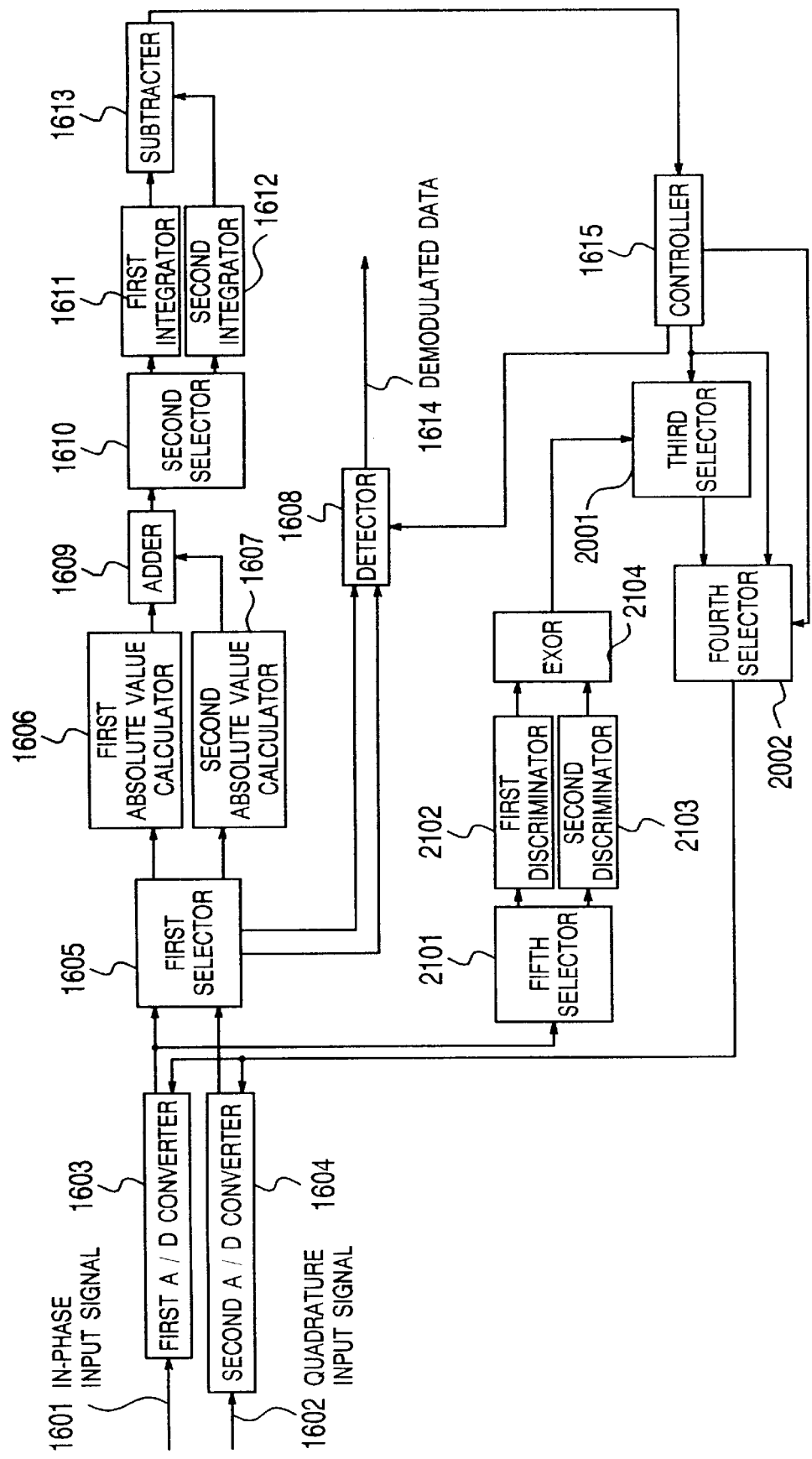
FIG. 22 is a block diagram of a receiver including a synchronizing apparatus of a seventeenth embodiment of the present invention.

The receiver including the synchronizing apparatus of the seventeenth embodiment of the present invention is different from that of the twelfth embodiment shown in FIG. 16 in that as shown in FIG. 22, it has the third and fourth selectors 2001, 2002 provided between the controller 1615 and the first and second A/D converters 1603, 1604, and a fifth selector 2101, first discriminator 2102, second discriminator 2103 and exclusive OR circuit (EXOR) 2104 provided between the third selector 2001 and the first and second A/D converters 1603, 1604.

In other words, this receiver can prevent erroneous synchronization from occurring due to the change of the optimum discrimination point by (symbol period)/2 depending on whether the in-phase input signal or quadrature input signal after being converted from analog to digital form is in phase with or has an opposite phase to that after one sampling period (that is, it can prevent that the point deviated by (symbol period)/2 from the optimum discrimination point is considered as the optimum discrimination point). To achieve this purpose, after the synchronization holding state the sampling frequency of the first and second A/D converters 1603, 1604 is reduced to the same frequency as the symbol rate of the in-phase input signal 1601 and quadrature input signal 1602 by use of information of whether the in-phase input signal after analog/digital conversion is in phase with or has an opposite phase to the in-phase input signal after one sampling period ((symbol period)/2) or information of whether the quadrature input signal after analog/digital conversion is in phase with or has an opposite phase to the quadrature input signal after one sampling period ((symbol period)/2).

The operation of this receiver will be described below. In this case, a preamble of "1"s is added to the head of data over several tens of symbols, and the sampling frequency of the first and second A/D converters 1603, 1604 is selected to be twice the symbol rate. In addition, the sampling frequency of the first and second A/D converters 1603, 1604 is reduced by the information of whether the in-phase input signal after A/D conversion is in phase with or has an opposite phase to that after one sampling period ((symbol period)/2).

The operations up to where the reproduction clock is produced from the fourth selector 2002 are the same as in the receiver including the synchronizing apparatus of the sixteenth embodiment. In the later operations, the fifth selector 2101 supplies the signal (of which the frequency is the same as the symbol rate) indicative of the odd-numbered samples of the output signal from the first A/D converter 1603 to the first discriminator 2102, and the signal (of which the frequency is the same as the symbol rate) indicative of the even-numbered samples of the output signal from the first A/D converter 1603 to the second discriminator 2103. The first and second discriminators 2102, 2103 decide the signs of the input signals. The output signals from the first and second discriminators 2102, 2103 are supplied to the exclusive OR circuit 2104, where decision is made of whether the input signals are in phase with each other or have opposite phases. The output signal from the exclusive OR circuit 2104 functions as a control signal to the third selector 2001.

Thus, according to the receiver including the synchronizing apparatus of this embodiment, since the sampling frequency of the first and second A/D converters 1603, 1604 is reduced by use of information of whether the in-phase input signal after analog/digital conversion is in phase with or has an opposite phase to the in-phase input signal after one sampling period or information of whether the quadrature input signal after analog/digital conversion is in phase with or has an opposite phase to the quadrature input signal after one sampling period, the erroneous synchronization can be prevented from occurring immediately after the synchronization holding state is brought about.

(Eighteenth Embodiment)

Figure 23:
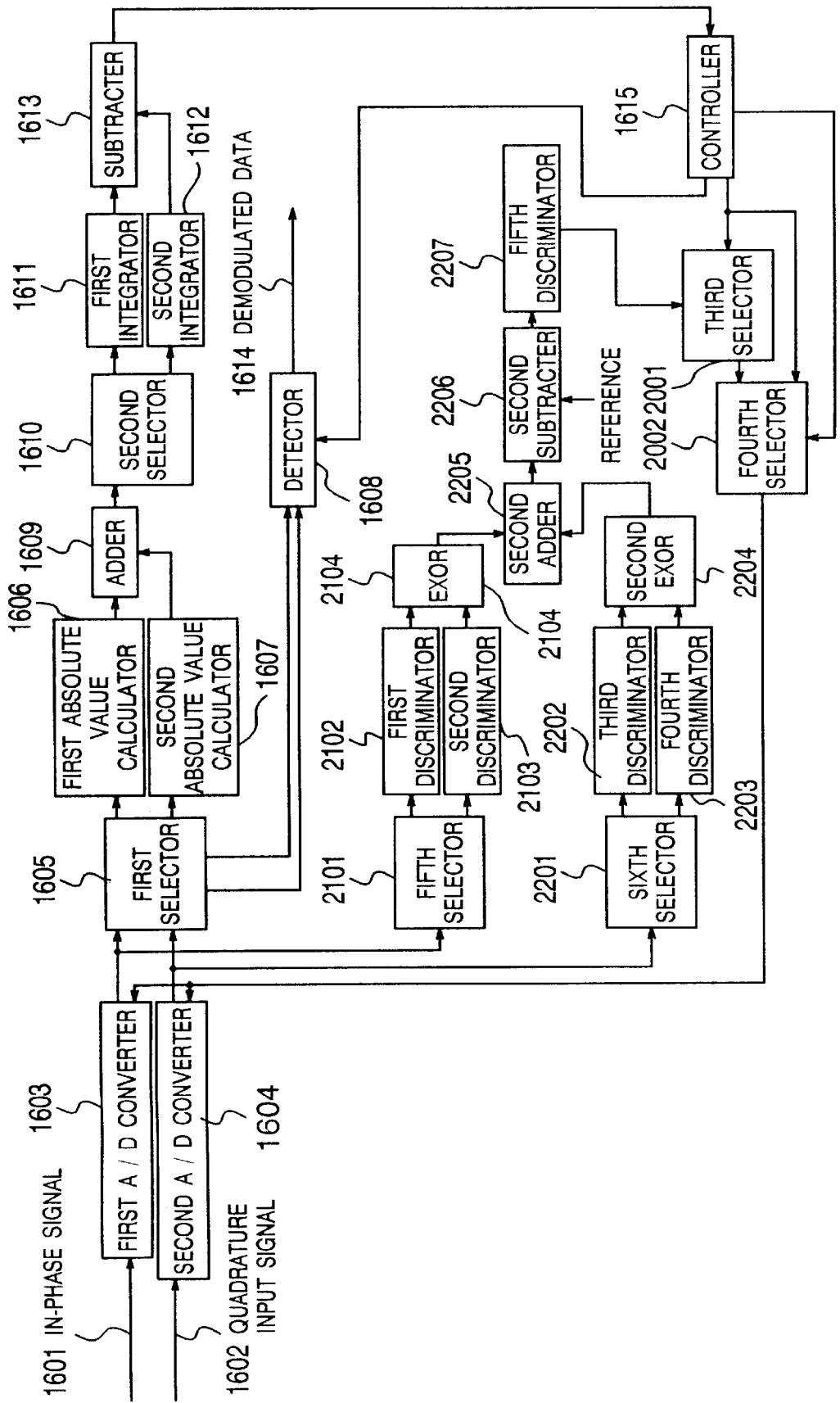
FIG. 23 is a block diagram of a receiver including a synchronizing apparatus of an eighteenth embodiment of the present invention.

The receiver including the synchronizing apparatus of the eighteenth embodiment of the present invention is different from that of the seventeenth embodiment in that as shown in FIG. 23, the sampling frequency of the first and second A/D converters 1603, 1604 is reduced to the same frequency as the symbol rate of the in-phase input signal 1601 and quadrature input signal 1602 by use of both information of whether the in-phase input signal after analog/digital conversion is in phase with or has an opposite phase to the in-phase input signal after one sampling period ((symbol period)/2) and information of whether the quadrature input signal after analog/digital conversion is in phase with or has an opposite phase to the quadrature input signal after one sampling period ((symbol period)/2), thereby achieving synchronization acquisition with much higher precision.

Therefore, this receiver is different from that of the seventeenth embodiment shown in FIG. 22 in that it has, provided between the third selector 2001 and the fist and second A/D converters 1603, 1604, a sixth selector 2201, third discriminator 2202, fourth discriminator 2203, second exclusive OR circuit (EXOR) 2204, second adder 2205, second subtracter 2206 and fifth discriminator 2207.

The operation of this receiver will be described. In this case, a preamble of "1" s is added to the head of data over several tens of symbols, and the sampling frequency of the first and second A/D converters 1603, 1604 is selected to be twice the symbol rate. In addition, the sampling frequency of the first and second A/D converters 1603, 1604 is reduced by use of information of whether the in-phase input signal after analog/digital conversion is in phase with or has an opposite phase to the in-phase signal after one sampling period ((symbol period)/2).

The operations from when the reproduction clock is produced from the fourth selector 2002 to when the output signal is produced from the exclusive OR circuit 2104 are the same as in the receiver including the synchronizing apparatus of the seventeenth embodiment. After those operations, the sixth selector 2201 supplies the odd-numbered samples (of which the frequency is equal to the symbol rate) of the output signal from the second A/D converter 1604 to the third discriminator 2202, and the even-numbered samples (of which the frequency is the same as the symbol rate) of the output signal from the second A/D converter 1604 to the fourth discriminator 2203. The third and fourth discriminators 2202, 2203 decide the signs of the input signals. The output signals from the third and fourth discriminators 2202, 2203 are supplied to the second exclusive OR circuit 2204, where decision is made whether they are in phase with each other or have opposite phases. The output signal from the exclusive OR circuit 2104 and the output signal from the second exclusive OR circuit 2204 are added to each other by the second adder 2205. The output signal from the second adder 2205 is fed to-the second subtracter 2206, where a certain reference value is subtracted from it. The output signal from the subtracter 2206 is supplied to the fifth discriminator 2207, where decision is made whether it is in phase or has an opposite phase. The output signal from the fifth discriminator 2207 functions as a control signal t o the third selector 2001.

(Nineteenth Embodiment)

Figure 24:
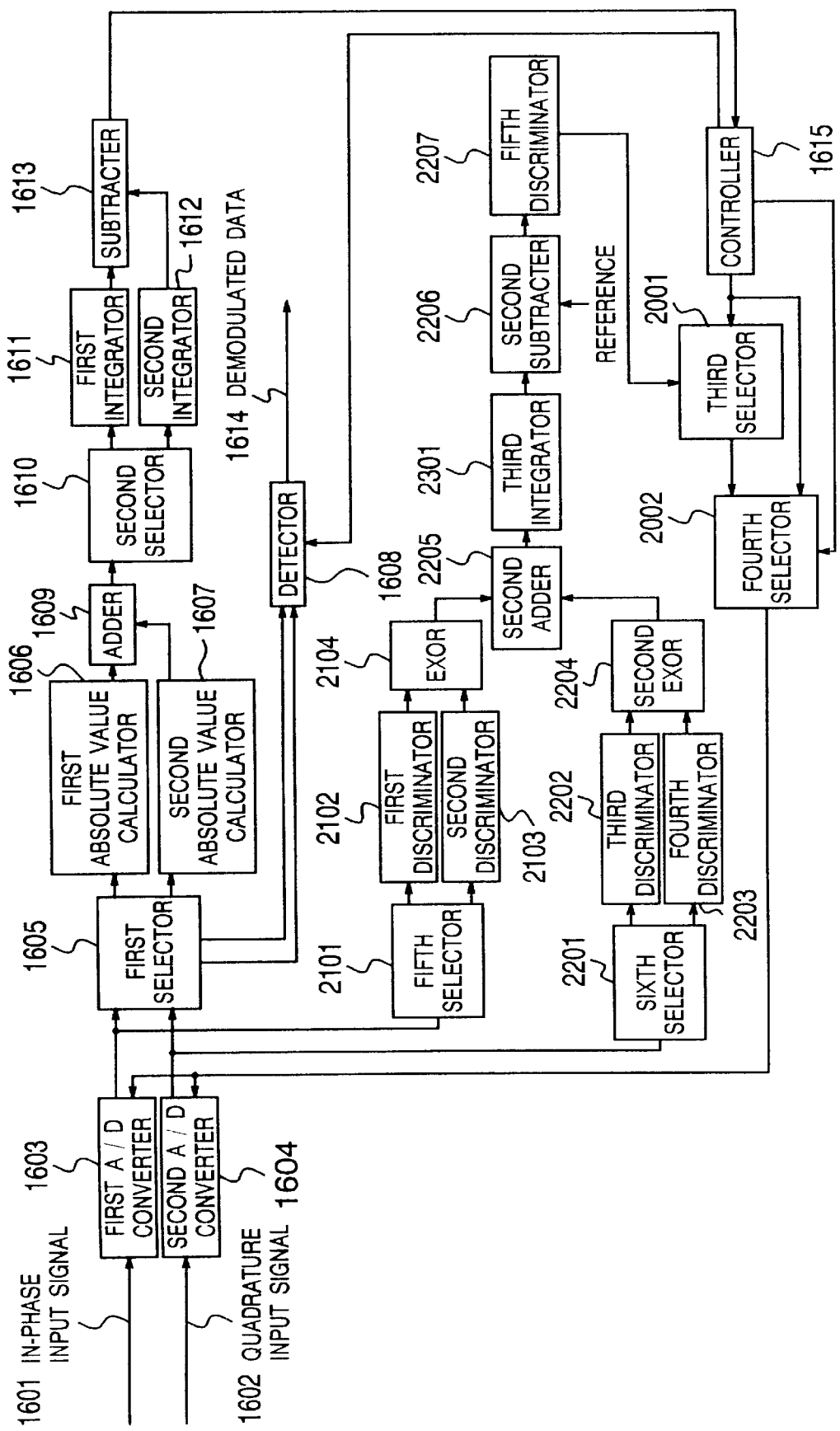
FIG. 24 is a block diagram of a receiver including a synchronizing apparatus of a nineteenth embodiment of the present invention.

The receiver including the synchronizing apparatus of the nineteenth embodiment of the present invention is different from that of the seventeenth embodiment in that as shown in FIG. 24, a third integrator 2301 is provided between the second adder 2205 an d the second subtracter 2206 so that the sampling frequency of the first and second A/D converters 1603, 1604 is reduced to the same frequency as the symbol rate of the in-phase input signal 1601 and quadrature input signal 1602 after the synchronization holding state is brought about by use of the integrated values of both information of whether the in-phase input signal after analog/digital conversion is in phase with or has an opposite phase to the in-phase input signal after one sampling period ((symbol period)/2) and information of whether the quadrature input signal after analog/digital conversion is in phase with or has an opposite phase to the quadrature input signal after one sampling period ((symbol period)/2), thereby achieving much higher precision synchronization acquisition.

It is also possible to use the integrated value of either one of the information of whether the in-phase input signal after analog/digital conversion is in phase with or has an opposite phase to the in-phase input signal after one sampling period and information of whether the quadrature input signal after analog/ digital conversion is in phase with or has an opposite phase to the quadrature input signal after one sampling period.

(Twentieth Embodiment)

Figure 25:
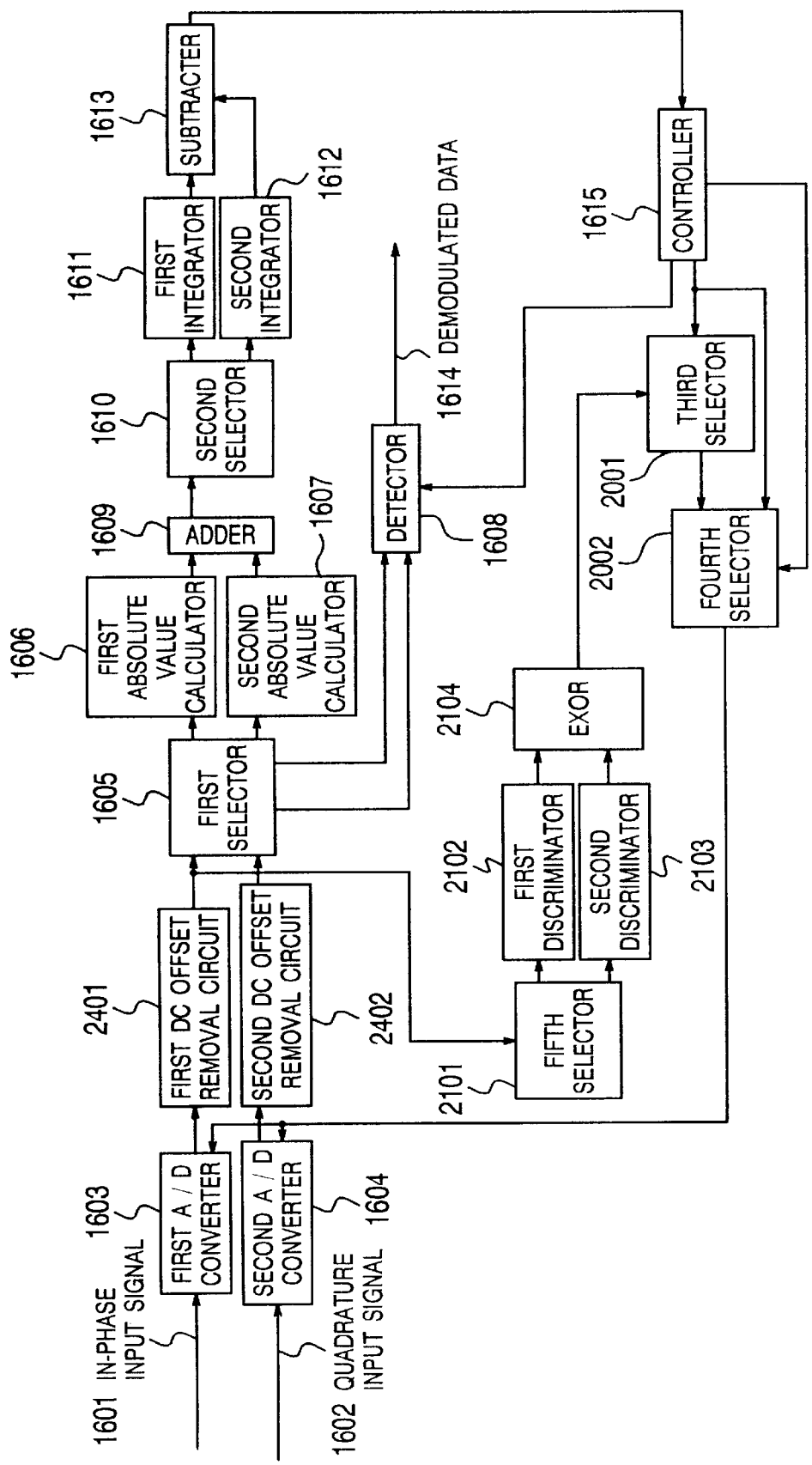
FIG. 25 is a block diagram of a receiver including a synchronizing apparatus of a twentieth embodiment of the present invention.

The receiver including the synchronizing apparatus of the twentieth embodiment of the present invention is different from that of the seventeenth embodiment shown in FIG. 22 in that as illustrated in FIG. 25, first and second DC offset eliminating circuits 2401, 2402 for removing the DC offset of the in-phase input signal and quadrature input signal are provided between the first selector 1605 and the first and second A/D converters 1603, 1604, thereby achieving much higher precision synchronization acquisition.

Figure 26:
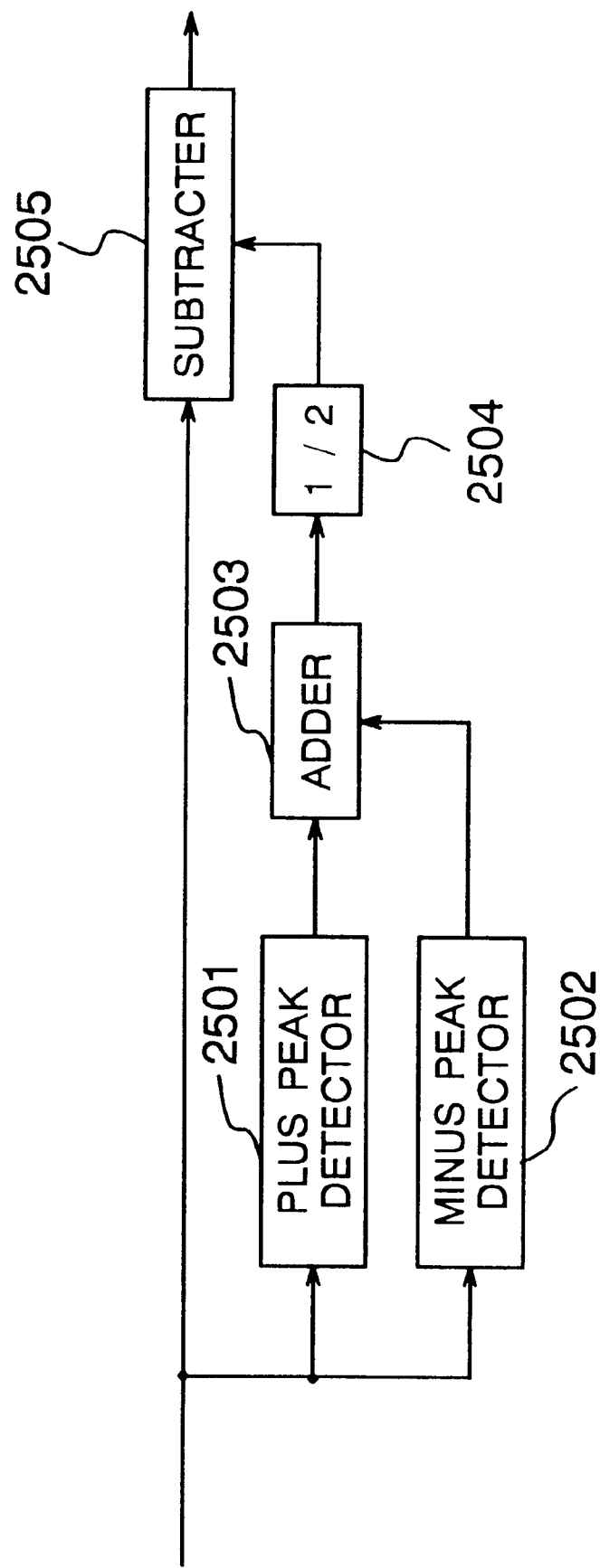
FIG. 26 is a block diagram of a DC offset eliminating circuit shown in FIG. 25.

The first DC offset eliminating circuit 2401 has, as shown in FIG. 26, a plus peak detector 2501 for detecting the positive peak of the input signal, a minus peak detector 2502 for detecting the negative peak of the input signal, an adder 2503 for adding the output signal from the plus peak detector 2501 and the output signal from the minus peak detector 2502, a multiplier 2504 for multiplying the output signal from the adder 2503 by ½ and detecting the DC offset of the input signal, and a subtracter 2505 for subtracting the output signal of the multiplier 2504 from the input signal to thereby remove the DC offset from the input signal. The second DC offset eliminating circuit 2402 has the same construction as the first DC offset eliminating circuit 2401.

The receivers including the synchronizing apparatus of the sixteenth, eighteenth and nineteenth embodiments may be provided with the first and second DC offset eliminating circuits 2401, 2402, and in this case the same effect can be obtained.

(Twenty-first Embodiment)

Figure 27:
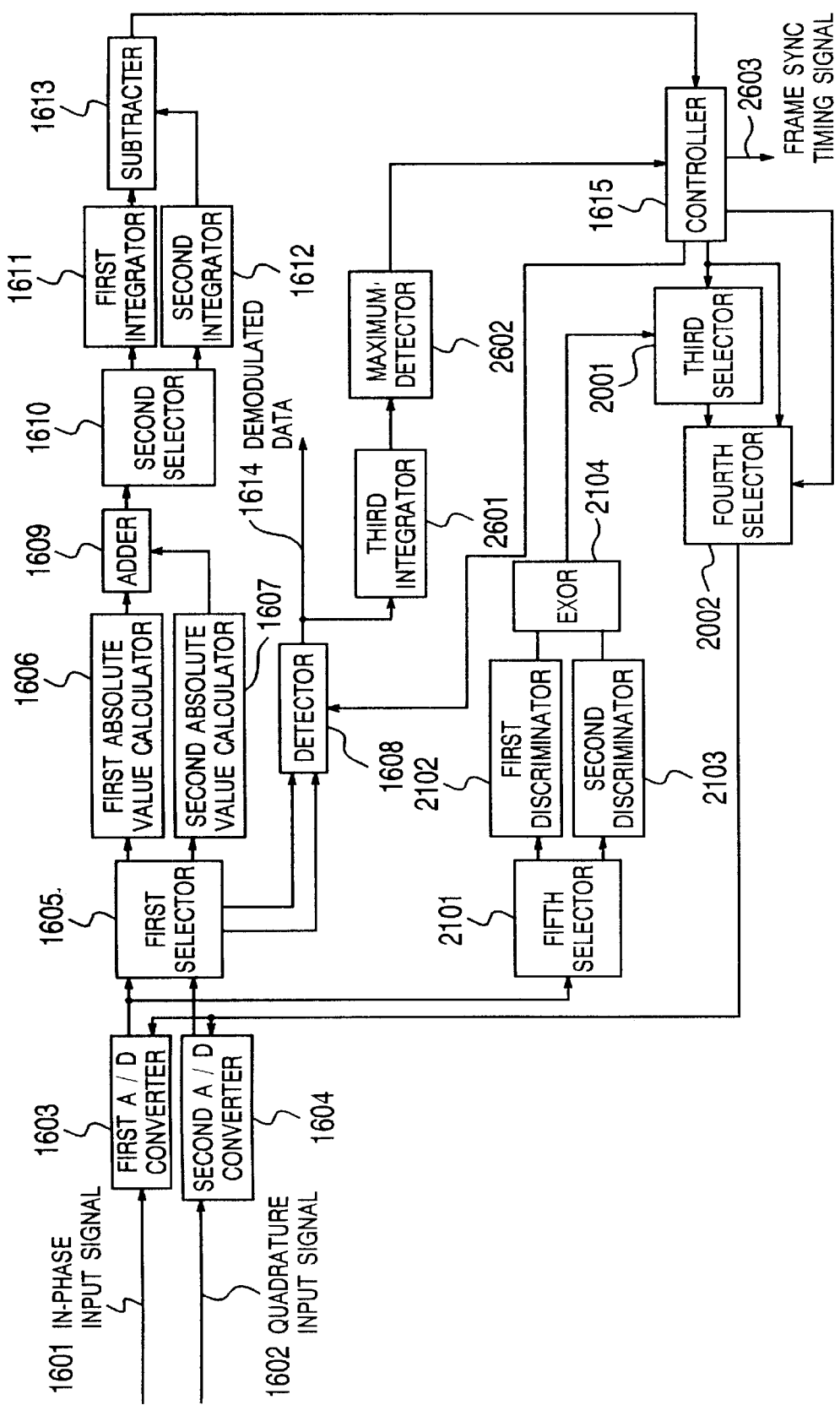
FIG. 27 is a block diagram of a receiver including a synchronizing apparatus of a twenty-first embodiment of the present invention.

The receiver including the synchronizing apparatus of the twenty-first embodiment of the present invention is different from that of the seventeenth embodiment shown in FIG. 22 in that as shown in FIG. 27, a third integrator 2601 and a maximum value detector 2602 are provided between the detector 1608 and the controller 1615 so that a frame synchronization timing signal 2603 can be produced. The third integrator 2601 integrates the demodulated data 1614 over the range corresponding to the number of data of preamble. The maximum value detector 2602 detects the maximum value of the integrated value from the third integrator 2601 to find the time at which this integrated value is the maximum. The frame synchronization timing signal 2603 is produced from the controller 1615 on the basis of the time found by the maximum value detector 2602.

The third integrator 2601 and the maximum value detector 2602 may be provided in the receiver including the synchronizing apparatus of the sixteenth embodiment and the eighteenth to twentieth embodiments, and in this case the same effect can be obtained.

(Twenty-second Embodiment)

Figure 28:
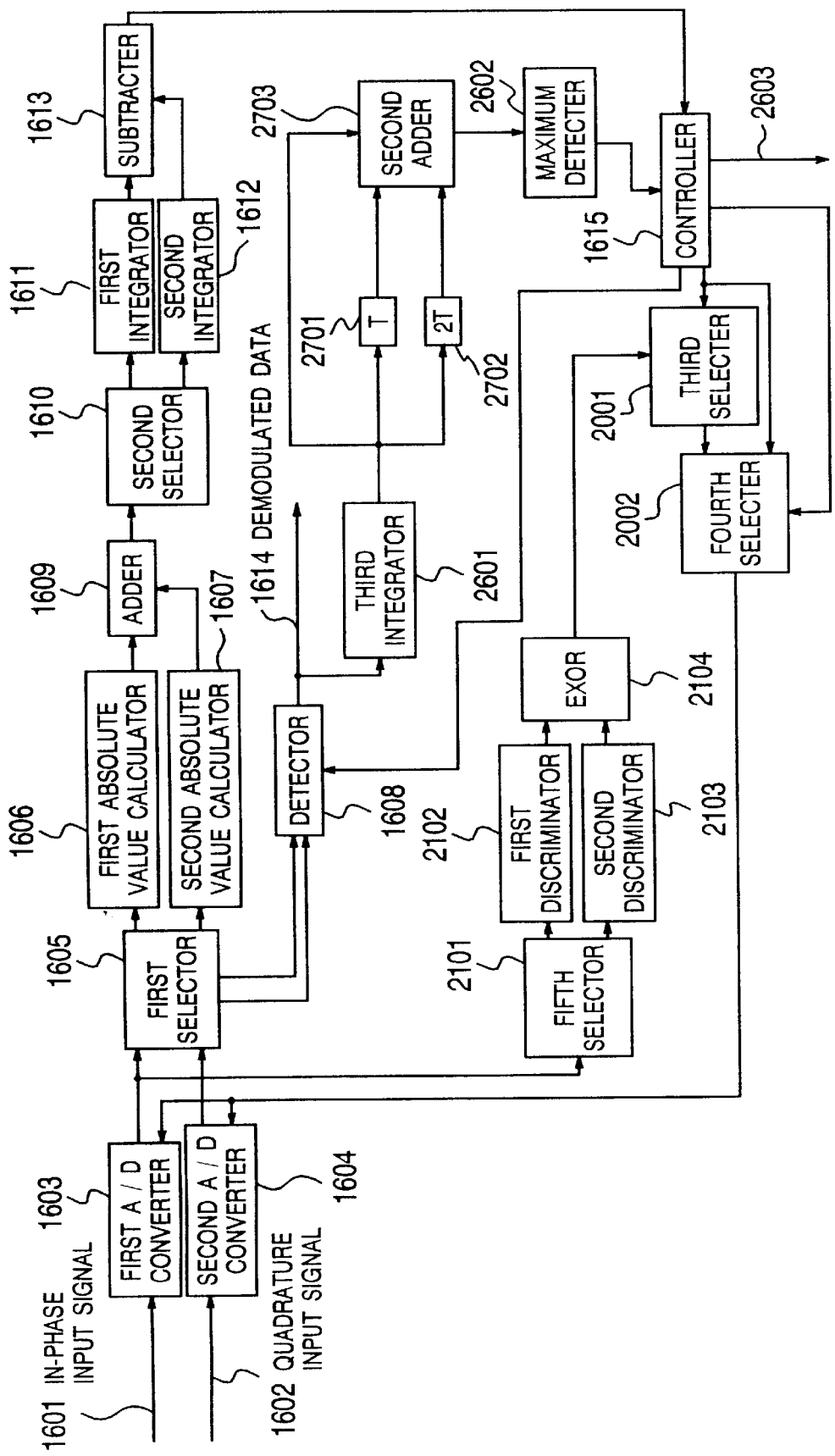
FIG. 28 is a block diagram of a receiver including a synchronizing apparatus of a twenty-second embodiment of the present invention.

The receiver including the synchronizing apparatus of the twenty-second embodiment of the present invention is different from that of the twenty-first embodiment shown in FIG. 27 in that as shown in FIG. 28, a first delay device 2701, a second delay device 2702 and a second adder 2703 are provided between the third integrator 2601 and the maximum value detector 2602 so as to add the current value and both-side adjacent values of the integrated value signal resulting from integrating the demodulated data 1614 over the range corresponding to the number of data of preamble, and to detect the time at which the sum is the maximum, thereby causing the frame synchronization timing signal 2603 to be generated.

In this receiver, the integrated value signal from the third integrator 2601 to which the demodulated data 1614 has been fed is delayed by symbol period T in the first delay device 2701 and delayed by twice the symbol time T in the second delay device 2702. The output signal from the third integrator 2601 and the output signals from the first and second delay devices 2702, 2703 are added by the second adder 2703, and the output from the adder is supplied to the maximum value detector 2602. Then, the frame synchronization timing signal 2603 is produced from the controller 1615 in the same way as in the receiver including the synchronizing apparatus of the twenty-first embodiment.

(Twenty-third Embodiment)

Figure 29:
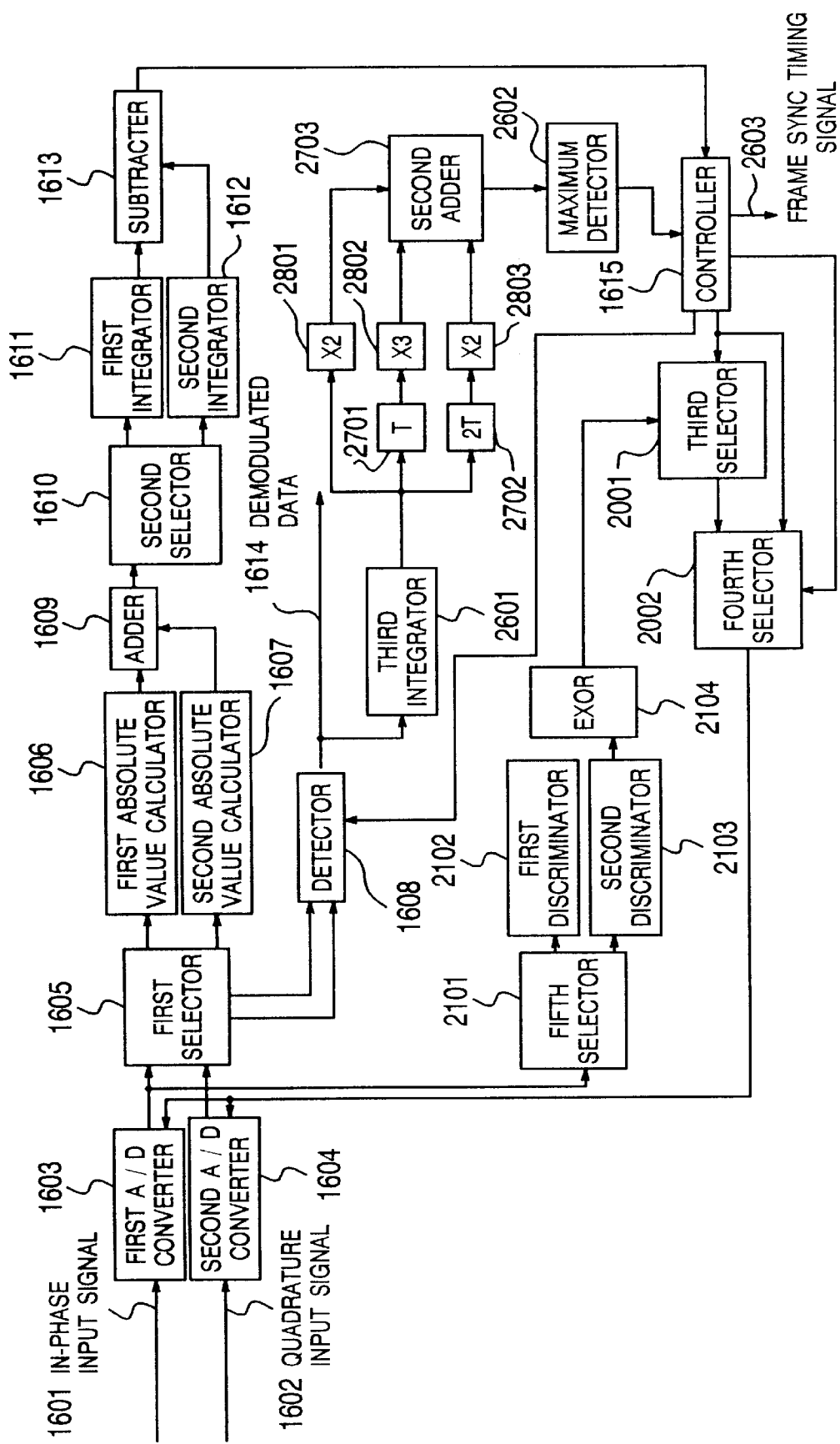
FIG. 29 is a block diagram of a receiver including a synchronizing apparatus of a twenty-third embodiment of the present invention.

The receiver including the synchronizing apparatus of the twenty-third embodiment of the present invention is different from the twenty-second embodiment shown in FIG. 28 in that it has, as shown in FIG. 29, a first multiplier 2801 provided between the third integrator 2601 and the second adder 2703, a second multiplier 2802 provided between the first delay device 2701 and the second adder 2703, and a third multiplier 2803 provided between the second delay device 2702 and the second adder 2703 so that the current and both-side adjacent values of the integrated value signal of the demodulated data 1614 are weighted by the multipliers and then added, thereby achieving much higher precision frame synchronization.

In this receiver, the current value of the integrated value signal of the demodulated data 1614 is multiplied by three, or weighted by the second multiplier 2802, and both-side adjacent values of the integrated value signal are multiplied by two, or weighted by the first and third multipliers 2801, 2803.

(Twenty-fourth Embodiment)

Figure 30:
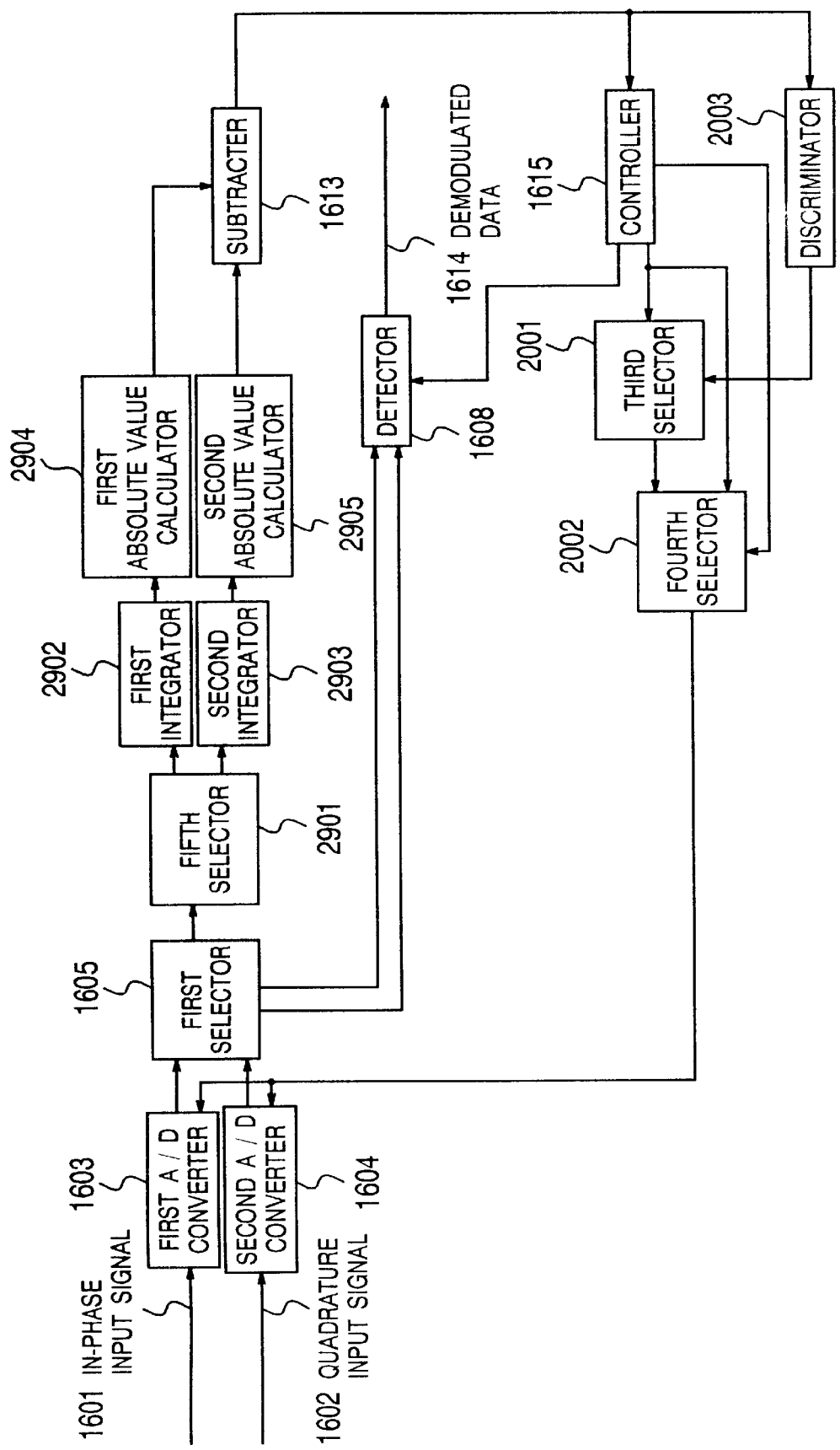
FIG. 30 is a block diagram of a receiver including a synchronizing apparatus of a twenty-fourth embodiment of the present invention.

The receiver including the synchronizing apparatus of the twenty-fourth embodiment of the present invention is different from that of the sixteenth embodiment shown in FIG. 21 in that it has, as shown in FIG. 30, a fifth selector 2901, first and second integrators 2902, 2903 and first and second absolute value calculators 2904, 2905 provided between the first selector 1605 and the subtracter 1613 so that the in-phase input signal and quadrature input signal after being converted into digital signals are integrated and fed to the absolute value calculators which then produce the absolute values of the integrated value signals of different sampling timings, which are compared, thereby achieving synchronization acquisition.

The operation of this receiver will be described. In this case, a preamble of "1" s is added to the head of data over several tens of symbols, and the sampling frequency of the first and second A/D converters 1603, 1604 are selected to be twice the symbol rate.

The operations up to when the sampled signals are produced from the first selector 1605 are the same as those in the receiver including the synchronizing apparatus of the sixteenth embodiment. The in-phase input signal or quadrature input signal from the first selector 1605 is fed to the fifth selector 2901 by-which the odd-numbered and even-numbered signals are distributed to the first and second integrators 2902, 2903, respectively. The odd-numbered in-phase or quadrature signals are integrated by the first integrator 2902, and the odd-numbered one by the second integrator 2903. Generally, the transmitter performs differential encoding for the in-phase input signal and quadrature input signal, and thus when the preamble has successive "1"s over several tens of symbols, the preamble after differential encoding turns "1" and "1" alternately. Therefore, the first and second integrators 2902, 2903 invert the polarities of the in-phase input signal and quadrature input signal at each data before the addition. For example, before data of 8 symbols is integrated, one-symbol preceding data, three-symbols preceding data, five-symbols preceding data and seven-symbols preceding data relative to the present time are inverted in their polarities.

The output signals from the first and second integrators 2902, 2903 are supplied to the first and second absolute value calculators 2904, 2905 which produce the absolute value of the added odd-numbered in-phase input signal or quadrature input signal and the absolute value of the added even-numbered in-phase input signal or quadrature input signal. The output signals from the first and second absolute value calculators 2904, 2905 are fed to the subtracter 1613 which then produces a difference signal between the absolute value of the added odd-numbered in-phase input signal or quadrature input signal and the absolute value of the added even-numbered in-phase input signal or quadrature input signal. The following operations are the same as in the receiver including the synchronizing apparatus of the sixteenth embodiment.

Thus, in this receiver, since the thermal noise considered as random signal can be reduced by addition, the thermal noise components in the in-phase input signal and quadrature input signal can be reduced, so that synchronization acquisition can be performed with higher precision.

(Twenty-fifth Embodiment)

Figure 31:
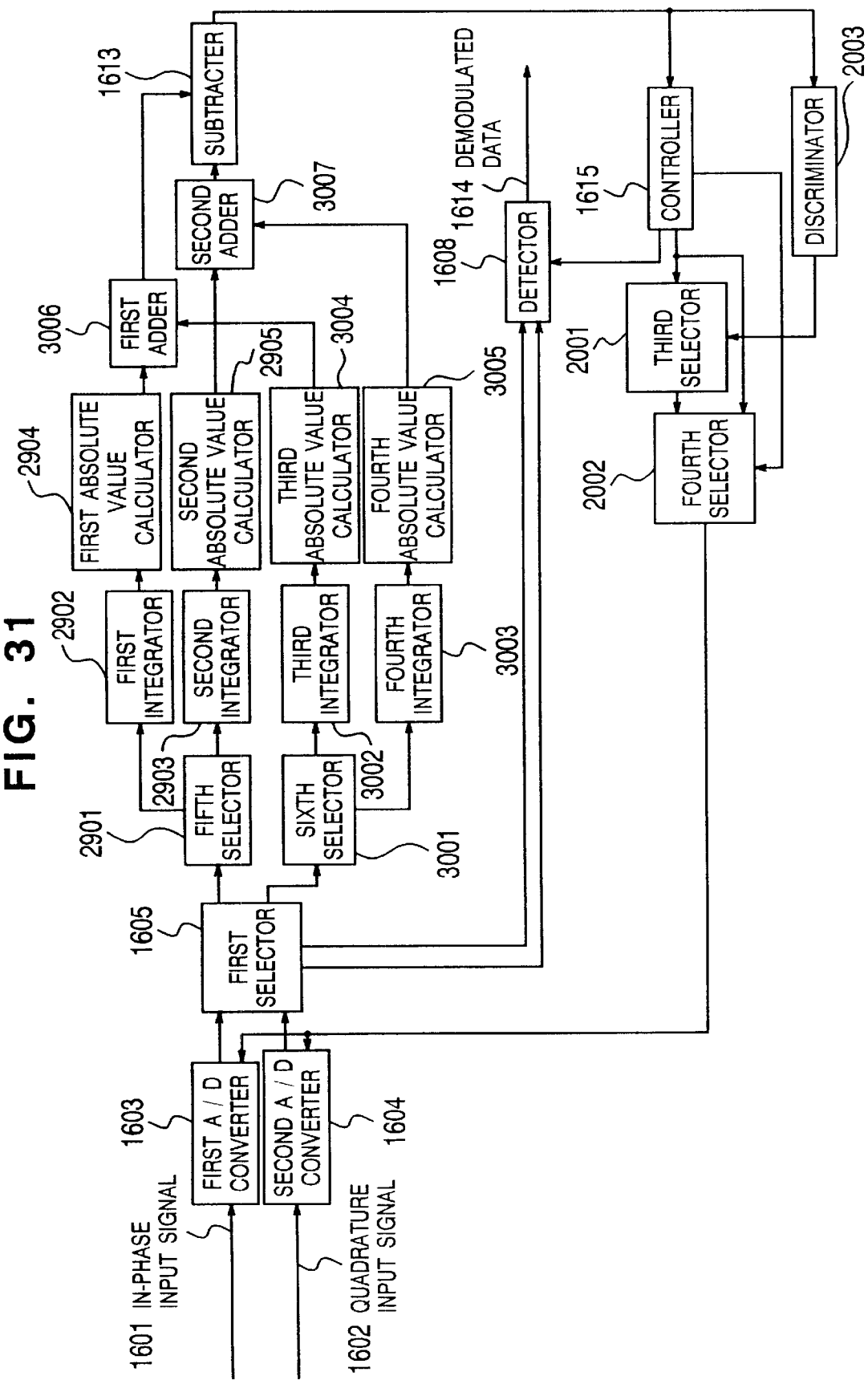
FIG. 31 is a block diagram of a receiver including a synchronizing apparatus of a twenty-fifth embodiment of the present invention.

The receiver including the synchronizing apparatus of the twenty-fifth embodiment of the present invention is different from that of the twenty-fourth embodiment in that as shown in FIG. 31, both in-phase input signal 1601 and quadrature input signal 1602 after analog-to-digital conversion are integrated, and fed to absolute value calculators and to adders from which the absolute values to different timings are compared, thereby making synchronization acquisition with higher precision.

In this receiver, the output ends of the first selector 1605 are connected to the input end of the fifth selector 2901 and the input end of a sixth selector 3001. The output ends of the fifth selector 2901 are connected to the input ends of the first and second integrators 2902, 2903. The output ends of the sixth selector 3001 are connected to the input ends of third and fourth integrators 3002, 3003. The output ends of the first to fourth integrators 2902, 2903, 3002, 3003 are connected to the input ends of the first to fourth absolute value calculators 2904, 2905, 3004, 3005, respectively. The output signals from the first and third absolute value calculators 2904, 3004 are added by a first adder 3006, and the output signals from the second and fourth absolute value calculators 2905, 3005 are added by a second adder 3007. The output signal from the first adder 3006 and the output signal from the second adder 3007 are subtracted from each other by the subtracter 1613.

(Twenty-sixth Embodiment)

Figure 32:
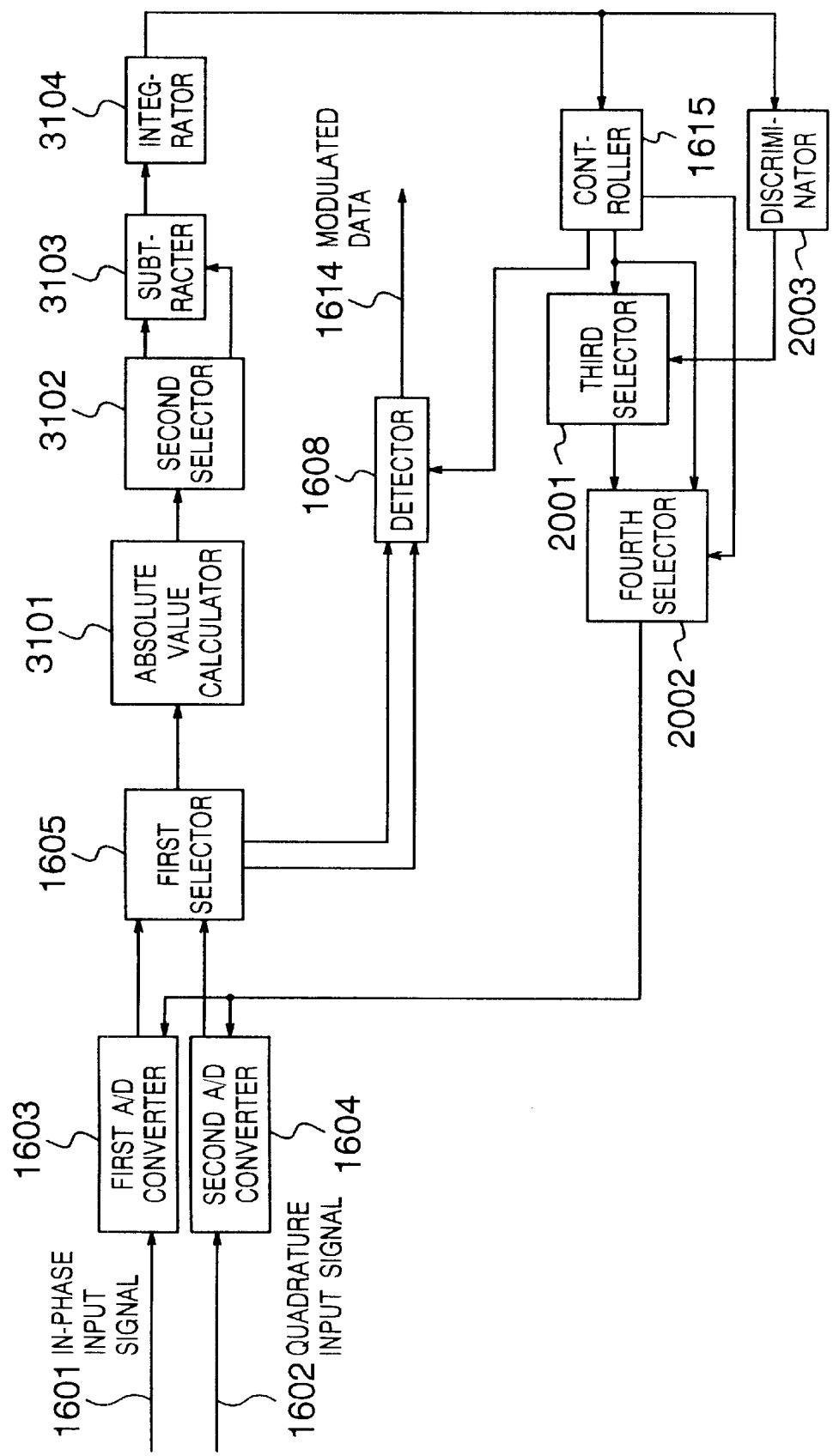
FIG. 32 is a block diagram of a receiver including a synchronizing apparatus of a twenty-sixth embodiment of the present invention.

The receiver including the synchronizing apparatus of the twenty-sixth embodiment of the present invention is different from that of the sixteenth embodiment shown in FIG. 21 in that it has, as shown in FIG. 32, an absolute value calculator 3101, second selector 3102, subtracter 3103 and integrator 3104 provided between the first selector 1605 and the controller 1615. In other words, according to the receiver including the synchronizing apparatus of this embodiment, since it has a single large-scale integrator, the absolute value of the digital in-phase input signal 1601 or quadrature input signal 1602 is produced, the absolute values to different sampling timings are compared, and the compared result is integrated, thereby achieving synchronization acquisition.

The operation of this receiver will be described. In this case, a preamble of "1" is added to the head of data over several tens of symbols, and the sampling frequency of the first and second A/D converters 1603, 1604 is selected to be twice the symbol rate.

The operations up to when the sampled signal is produced from the first selector 1605 are the same as in the receiver including the synchronizing apparatus of the sixteenth embodiment. The in-phase input signal from the first selector 1605 is supplied to the absolute value calculator 3101 where its absolute value is calculated. The output signal from the absolute value calculator 3101 is supplied to the second selector 3102 which divides it into the absolute value of the odd-numbered sampled in-phase signal and the absolute value of the even-numbered sampled in-phase input signal. These absolute values are supplied to the subtracter 3103. The subtracter 3103 makes subtraction between the absolute value of the odd-numbered sampled in-phase signal and the absolute value of the even-numbered sampled in-phase input signal. The subtraction result is integrated by the integrator 3104. The output signal from the integrator 3104 is fed to the controller 1615 and discriminator 2003. The following operations up to when the demodulated data 1614 is produced are the same as in the receiver including the synchronizing apparatus of the sixteenth embodiment. The first selector 1605 may select the quadrature input signal.

Thus, since this receiver can decrease the number of integrators that determines the circuit scale of the synchronizing apparatus to one, the circuit scale of the synchronizing apparatus can be reduced.

(Twenty-seventh Embodiment)

Figure 33:
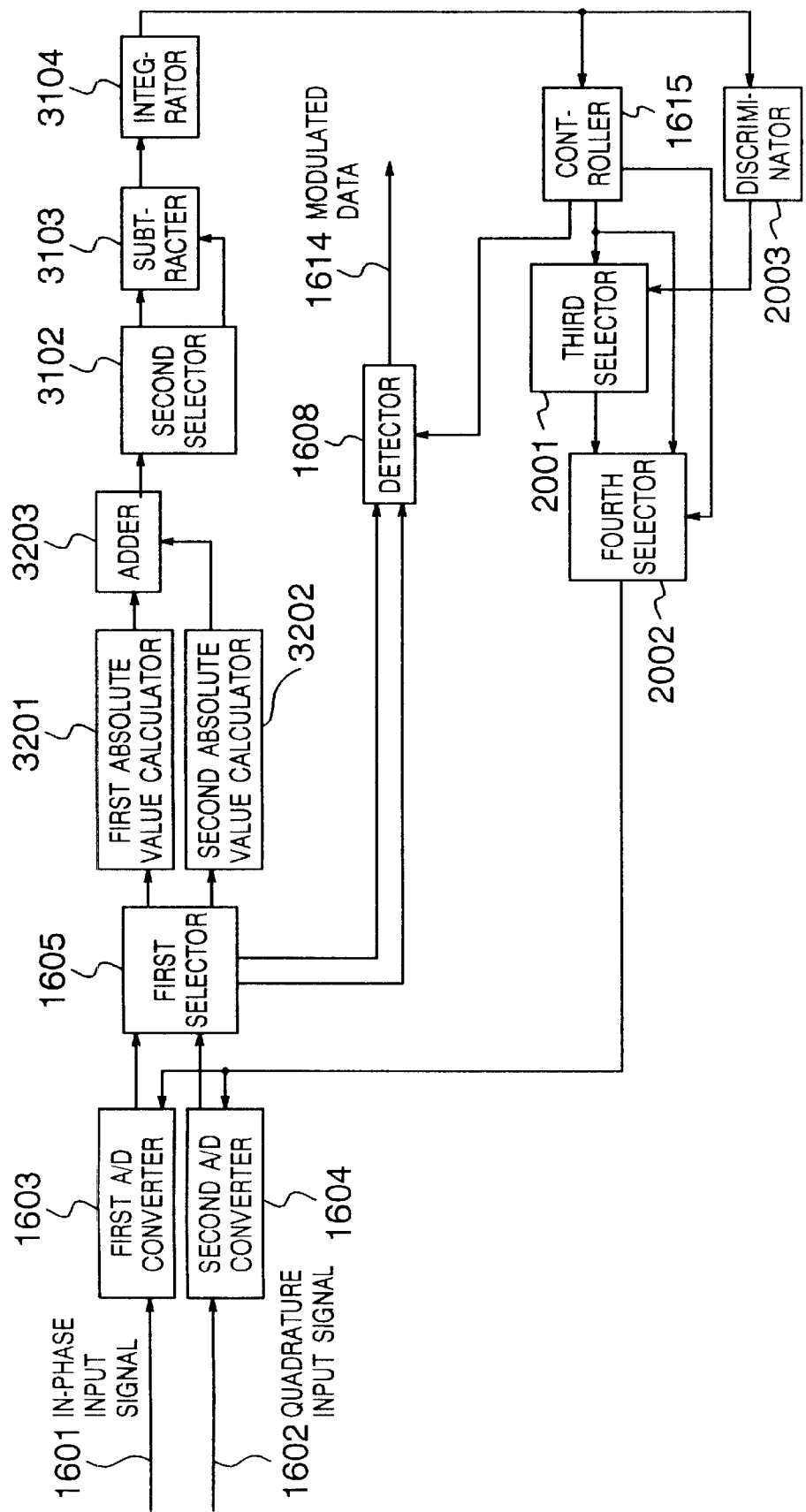
FIG. 33 is a block diagram of a receiver including a synchronizing apparatus of a twenty-seventh embodiment of the present invention.

The receiver including the synchronizing apparatus of the twenty-seventh of the present invention is different from that of the twenty-sixth embodiment shown in FIG. 32 in that as shown in FIG. 33, first and second absolute value calculators 3201, 3202 and an adder 3203 are provided between the first and second selectors 1605, 3102.

In other words, the receiver including the synchronizing apparatus of this embodiment adds the absolute values of the analog-to-digital converted in-phase input signal 1601 and quadrature input signal 1602, compares the absolute values to different timings after addition, and integrates the compared result, thereby achieving higher-precision synchronization acquisition.

(Twenty-eighth Embodiment)

Figure 34:
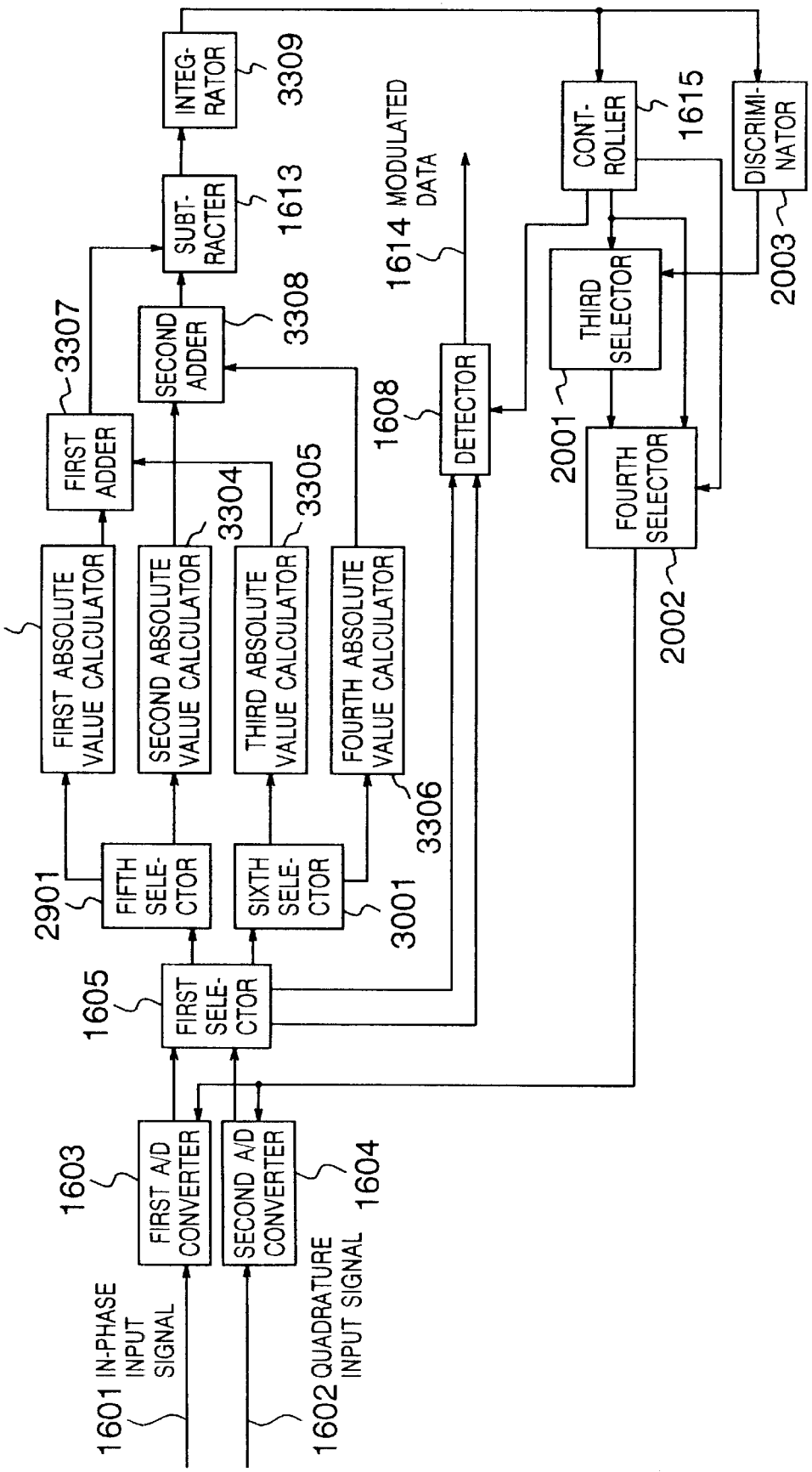
FIG. 34 is a block diagram of a receiver including a synchronizing apparatus of a twenty-eighth embodiment of the present invention.

The receiver including the synchronizing apparatus of the twenty-eighth embodiment of the present invention is different from that of the twenty-fifth embodiment illustrated in FIG. 31 in that as shown in FIG. 34 since a single integrator is provided, the output ends of the fifth selector 2901 is connected to the input ends of the first and second absolute value calculators 3303, 3304, the output ends of the sixth selector 3001 is connected to the input ends of the third and fourth absolute value calculators 3305, 3306, and the integrator 3309 is provided between the subtracter 1613 and the controller 1615. Therefore, in the receiver including the synchronizing apparatus of this embodiment, the first to fourth absolute value calculators 3303–3306, and the first and second adders 3307, 3308 are all operated at a sampling frequency corresponding to the signal transmission speed.

The operation of this receiver will be described. In this case, a preamble of "1" s is added to the head of data over several tens of symbols, and the sampling frequency of the first and second A/D converters 1603, 1604 is selected to be twice the symbol rate.

The operations up to when the sampled signals are produced from the first selector 1605 are the same as in the receiver including the synchronizing apparatus of the sixteenth embodiment. The in-phase input signal produced from the first selector 1605 is fed to the fifth selector 2901, which distributes the odd-numbered samples of the in-phase input signal to the first absolute value calculator 3303 and the even-numbered samples of the in-phase input signal to the second absolute value calculator 3304. The quadrature input signal from the first selector 1605 is fed to the sixth selector 3001, which distributes the odd-numbered samples of the quadrature input signal to the third absolute value calculator 3305 and the even-numbered samples of the quadrature input signal to the fourth absolute value calculator 3306. The first absolute value calculator 3303 calculates the absolute values of the odd-numbered samples of the in-phase input signal, the second absolute value calculator 3304 calculates the absolute values of the even-numbered samples of the in-phase input signal, the third absolute value calculator 3305 calculates the absolute values of the odd-numbered samples of the quadrature input signal, and the fourth absolute value calculator 3306 calculates the absolute value of the even-numbered samples of the quadrature input signal. The output signals from the first and third absolute value calculators 3303, 3305 are added by the first adder 3307, and the output signals from the second and fourth absolute value calculators 3304, 3306 are added by the second adder 3308. The output signals from the first and second adders 3307, 3308 are subtracted from each other by the subtracter 1613, and the subtracted result is integrated by the integrator 3309. The output signal from the integrator 3309 is fed to the controller 1615 and discriminator 2003. The following operations until the demodulated data 1614 is produced are the same as those of the receiver including the synchronizing apparatus of the sixteenth embodiment.

Thus, in this receiver, since the first to fourth absolute value calculators 3303–3306 and the first and second adders 3307, 3308 can be operated at a sampling frequency corresponding to the signal transmission speed, the consumption power can be reduced more than in the receiver including the synchronizing apparatus of the twenty-seventh embodiment.

In addition, the synchronizing apparatus of this embodiment can be applied to those of the twelfth to sixteenth embodiments, eighteenth embodiment, twentieth to twenty-third embodiments and twenty-fifth embodiment.

(Twenty-ninth Embodiment)

Figure 35:
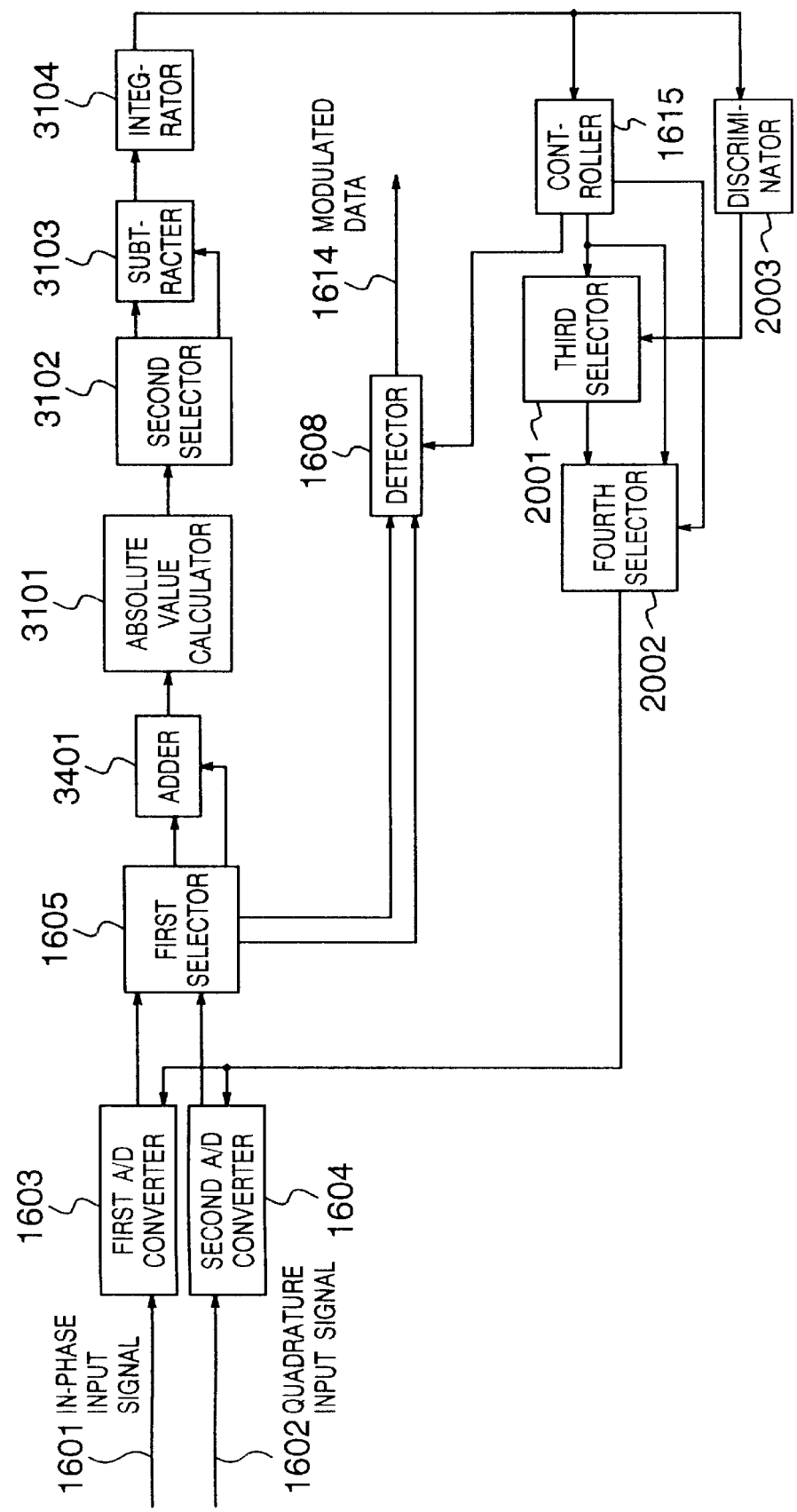
FIG. 35 is a block diagram of a receiver including a synchronizing apparatus of a twenty-ninth embodiment of the present invention.

The receiver including the synchronizing apparatus of the twenty-ninth embodiment of the present invention is different from that of the twenty-sixth embodiment shown in FIG. 32 in that as shown in FIG. 35 an adder 3401 for adding the analog-to-digital converted in-phase and quadrature input signals 1601, 1602 is provided between the first selector 1605 and the absolute value calculator 3101.

The operation of this receiver will be described. In this case, a preamble of "1"s is added to the head of data over several tens of symbols, and the sampling frequency of the first and second A/D converters 1603, 1604 is selected to be twice the symbol rate.

The operations up to when the sampled signals are produced from the first selector 1605 are the same as those of the receiver including the synchronizing apparatus of the twenty-sixth embodiment. The in-phase and quadrature input signals from the first selector 1605 are added by the adder 3401. The absolute value of this sum is calculated by the absolute value calculator 3101. The output signal from the absolute value calculator 3101 is supplied to the second selector 3102, which divides the input signal into the absolute value signal of the odd-numbered samples of the in-phase input signal and the absolute value signal of the even-numbered samples of the in-phase input signal. These signals are fed to the subtracter 3103. The subtracter 3103 makes subtraction between the absolute values of the odd-numbered sample and even-numbered sample of the in-phase input signal, and the subtracted result is integrated by the integrator 3104. The output signal from the integrator 3104 is supplied to the controller 1615 and discriminator 2003. The following operations until the demodulated data 1614 is produced are the same as those of the receiver including the synchronizing apparatus of the sixteenth embodiment.

Thus, since the thermal noise considered as a random signal in this receiver can be decreased by addition, the receiver can reduce the thermal noise components of the in-phase and quadrature input signals, thereby achieving higher-precision synchronization acquisition.

(Thirtieth Embodiment)

Figure 36:
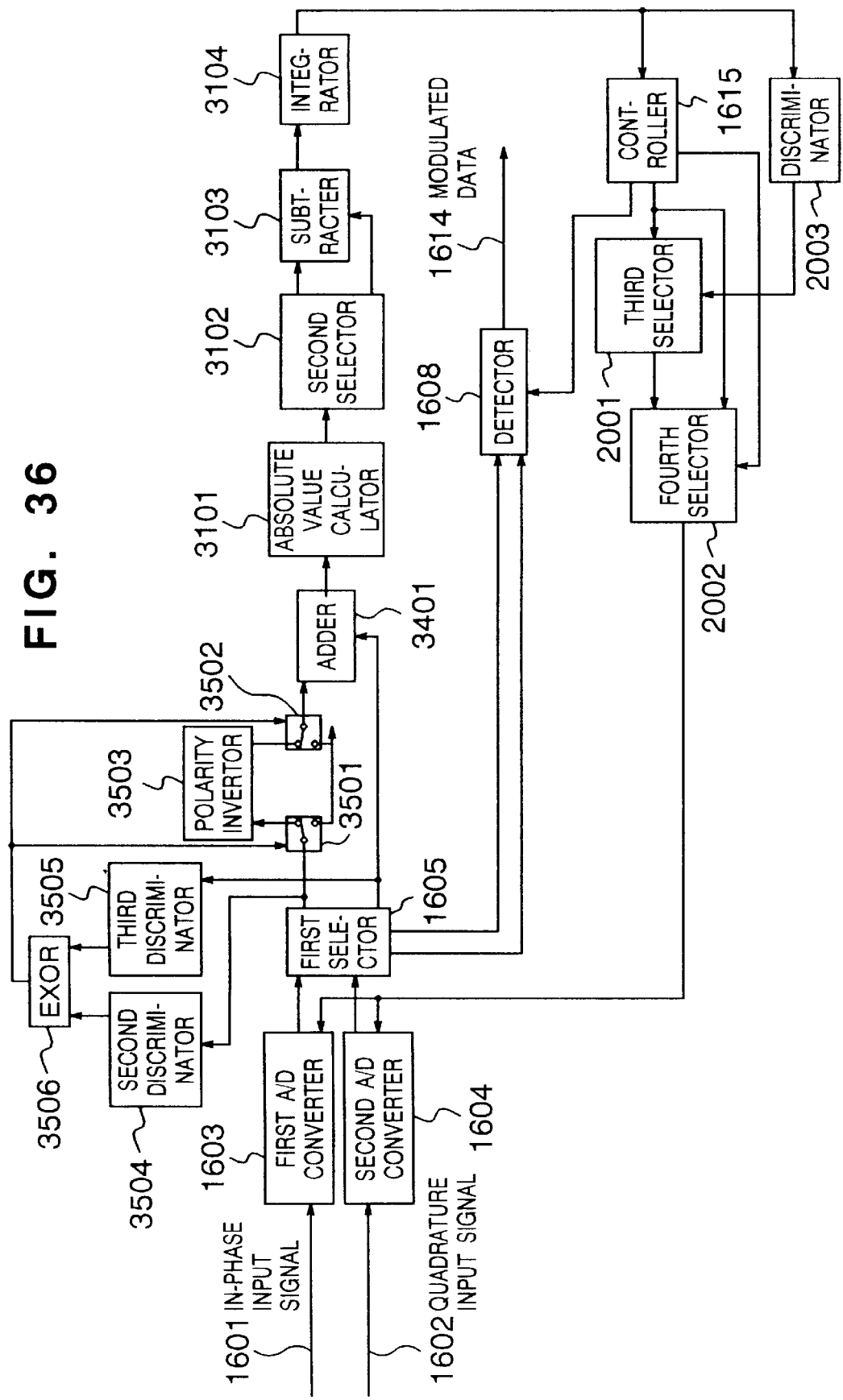
FIG. 36 is a block diagram of a receiver including a synchronizing apparatus of a thirtieth embodiment of the present invention.

The receiver including the synchronizing apparatus of the thirtieth embodiment of the present invention is different from that of the twenty-ninth embodiment in that as shown in FIG. 36, first and second switches 3501, 3502, a polarity invertor 3503, second and third discriminators 3504, 3505 and an exclusive OR circuit 3506 are provided between the first selector 1605 and the adder 3401, so that the polarities of the analog-to-digital converted in-phase and quadrature input signals 1601, 1602 are always kept equal and supplied to the adder 3401.

The operations of this receiver until the sampled signals are produced from the first selector 1605 are the same as those of the twenty-ninth embodiment. The in-phase and quadrature input signals from the first selector 1605 are supplied to the second and third discriminators 3504, 3505, respectively, where their polarities (positive and negative polarities) are decided. The output signals from the second and third discriminators 3504, 3505 are fed to the exclusive OR circuit 3506, which makes exclusive logical sum operation, deciding whether the polarities of the in-phase and quadrature input signals are the same or not. If the polarities of the in-phase and quadrature input signals are the same, the output signal from the exclusive OR circuit 3506 controls the first and second switches 3501, 3502 to switch, permitting the in-phase input signal from the first selector 1605 to be fed to the adder 3401. If the polarities of the in-phase and quadrature input signals are different, the output signal from the exclusive OR circuit 3506 controls the first and second switches 3501, 3502 to switch, permitting the in-phase input signal from the first selector 1605 to be fed through the polarity invertor 3503 to the adder 3401. The polarity invertor 3503 inverts the polarity of the in-phase input signal. Thus, the adder 3401 adds the in-phase input signal and quadrature input signal of which the polarities are kept the same. The following operations are the same as those of the synchronizing apparatus of the twenty-ninth embodiment.

Therefore, this receiver is able to prevent the synchronization acquisition precision from being reduced by the lowering of signal levels due to the different polarities of the in-phase and quadrature input signals.

(Thirty-first Embodiment)

Figure 37:
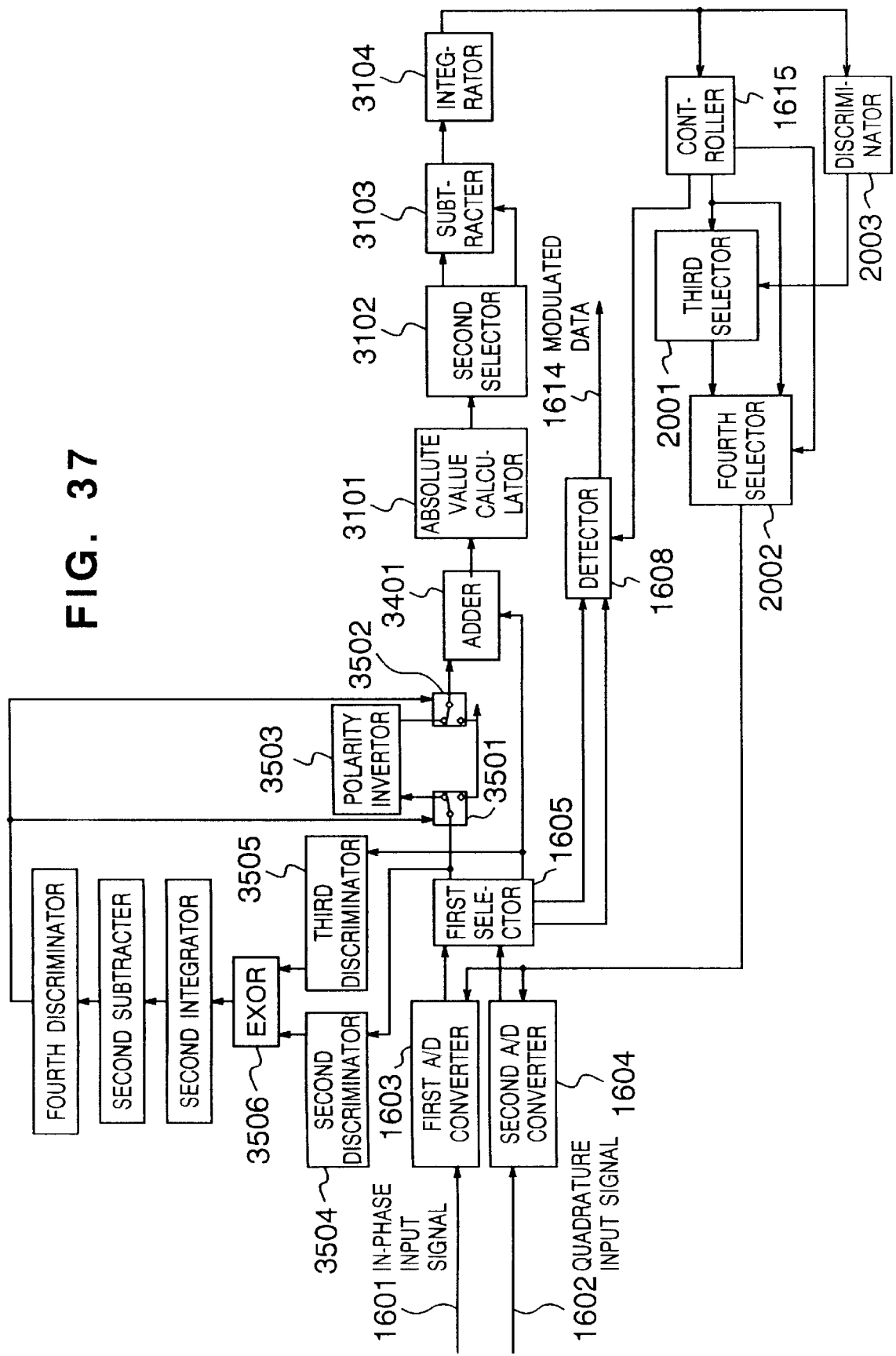
FIG. 37 is a block diagram of a receiver including a thirty-first embodiment of the present invention.

The receiver including the synchronizing apparatus of the thirty-first embodiment of the present invention is different from that of the thirtieth embodiment in that as shown in FIG. 37, it has, provided between the exclusive OR circuit 3506 and the first and second switches 3501, 3502, a second integrator 3601 for integrating the output signal from the exclusive OR circuit 3506 for indicating whether the polarities of the analog-to-digital converted in-phase and quadrature input signals 1601, 1602 are the same or not, a second subtracter 3602 for subtracting a certain threshold from the output signal from the second integrator 3601, and a fourth discriminator 3603 for deciding the polarity of the output signal from the second subtracter 3602, so that the output signal from the fourth discriminator 3603 controls the first and second switches 3501, 3502 to switch.

Therefore, this receiver integrates the information indicating whether the polarities of the analog-to-digital converted in-phase and quadrature input signals 1601, 1602 are the same or not, and finally decides whether the polarities of the analog-to-digital converted in-phase and quadrature input signals 1601, 1602 are the same or not according to the polarity of this integrated result, thus making it possible to achieve higher-precision synchronization acquisition.

(Thirty-second Embodiment)

Figure 38:
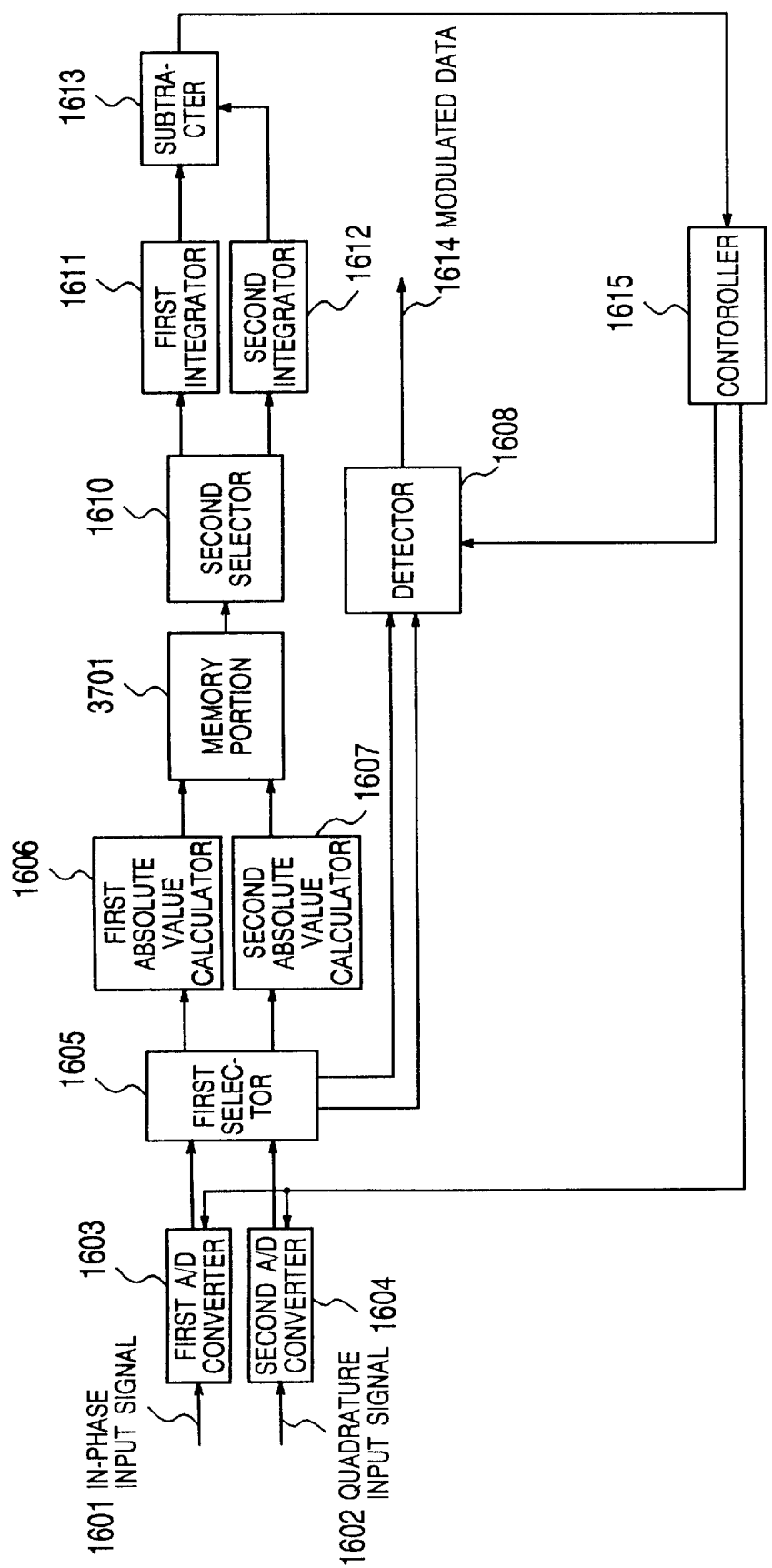
FIG. 38 is a block diagram of a receiver including a synchronizing apparatus of a thirty-second embodiment of the present invention.

The receiver of a digital mobile communication system including the synchronizing apparatus of the thirty-second embodiment of the present invention is different from that of the twelfth embodiment shown in FIG. 16 in that in place of the adder 1609 a memory portion 3701 is provided as the envelope generator as shown in FIG. 38. In other words, the synchronizing apparatus of this embodiment generates the envelope signal by use of the absolute values of the digital in-phase and quadrature signals 1601, 1602 after A/D conversion, and acquires synchronization by use of this envelope signal, thereby preventing the synchronization acquisition characteristic from being deteriorated by frequency offset.

The operation of the receiver including the synchronizing apparatus of this embodiment will be described with reference to FIGS. 39A–39J. The signal A shown in FIG. 39A indicates the sampling clock to the first and second A/D converters 1603, 1604, the signal B in FIG. 39B the clock of which the period has twice that of the sampling clock, the signal C in FIG. 39C the absolute value of the in-phase input signal 1601, the signal D in FIG. 39D the absolute value of the quadrature input signal 1602, the signal E in FIG. 39E the envelope signal, the signal F in FIG. 39F the odd-numbered samples of the envelope signal, the signal G in FIG. 39G the even-numbered samples of the envelope signal, the signal H in FIG. 39H the integrated result of the odd-numbered samples of the envelope signal, the signal I in FIG. 39I the integrated result of the even-numbered samples of the envelope signal, and the signal J in FIG. 39J the result of subtraction from the signal I from the signal H.

In the following description, it is assumed that a preamble of "1"s is added to the head of data over several tens of symbols, and that the frequency of the sampling clock (see FIG. 39A) to the first and second A/D converters 1603, 1604 is selected to be twice the symbol rate.

The operations up to where the absolute values of the in-phase and quadrature input signals 1601, 1602 are obtained are the same as those in the receiver including the synchronizing apparatus of the twelfth embodiment. The absolute values of the in-phase and quadrature input signals 1601, 1602 are stored in the memory portion 3701. The memory portion 3701 includes a multiplier and a memory having envelope information already stored. The envelope information is read out of the memory in accordance with the absolute values of the in-phase and quadrature input signals 1601, 1602, thereby generating the envelope signal. The operations up to when the demodulated data 1614 is produced after the second selector 1610 are the same as in the receiver including the synchronizing apparatus of the twelfth embodiment.

When a preamble of "1"s is used, the preamble undergoes a DPQSK mapping process, and after the frequency band limitation, it becomes a sine wave as expressed by the following equation.

$$\text{In-phase input signal, } I = A \cdot \cos(2\pi f n T) \tag{7.1}$$

$$\text{Quadrature input signal, } Q = B \cdot \cos(2\pi f n T) \tag{7.2}$$

where

A, B: constant f: frequency

T: sampling period n: 0, 1, 2, . . .

Thus, the envelope signal can be expressed by the following equation.

$$\text{The envelope signal} = \sqrt{(I^2 + Q^2)} |\cos(2\pi f n T)| \tag{7.3}$$

When there is a frequency offset, the preamble is expressed by the following equations.

$$\text{The in-phase input signal } I = A \cdot \cos(2\pi f n T) \cdot \cos(2\pi \Delta f n T) - B \cdot \cos(2\pi f n T) \cdot \sin(2\pi \Delta f n T) \tag{7.4}$$

$$\text{The quadrature input signal } Q = B \cdot \cos(2\pi f n T) \cdot \cos(2\pi \Delta f n T) + A \cdot \cos(2\pi f n T) \cdot \sin(2\pi \Delta f n T) \tag{7.5}$$

Thus, the envelope signal in this case is expressed by the following equation.

$$\text{The envelope signal} = \sqrt{(I^2 + Q^2)} |\cos(2\pi f n T)| \tag{7.6}$$

From the above equations (7.3) and (7.5), it will be understood that since the envelope signal is not changed even under the presence of frequency offset, synchronization acquisition using the envelope signal can prevent the synchronization acquisition characteristic from being deteriorated by the presence of frequency offset.

(Thirty-third Embodiment)

Figure 40:
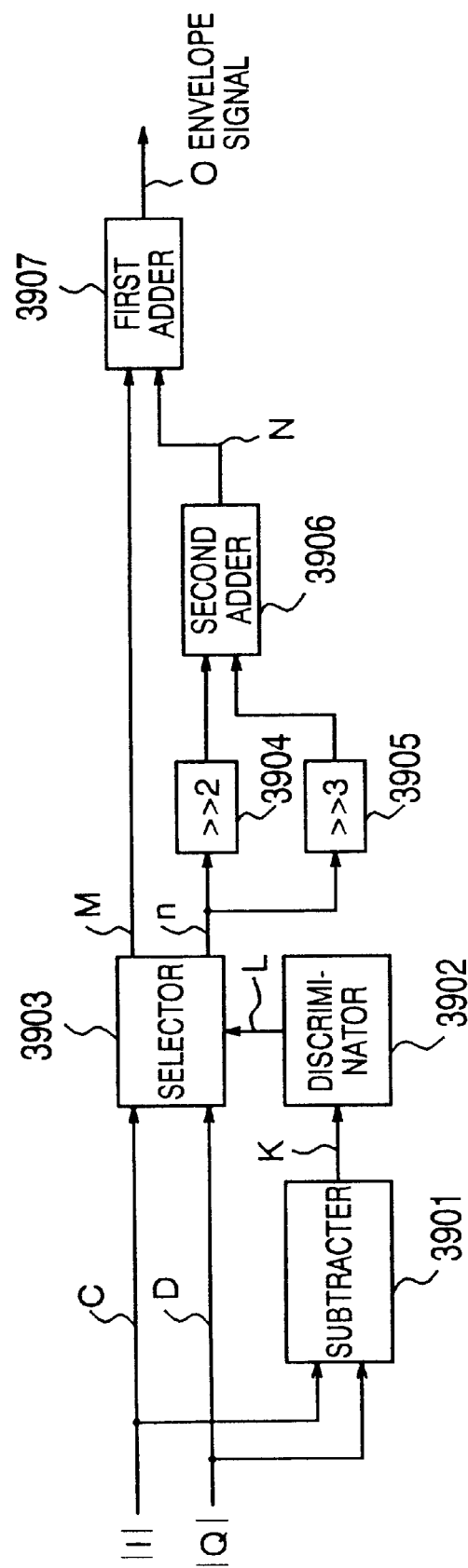
FIG. 40 is a block diagram of an envelope generator included in a synchronizing apparatus of a thirty-third embodiment of the present invention.

The receiver of a digital mobile communication system including the synchronizing apparatus of the thirty-third embodiment of the present invention is different from that including the synchronizing apparatus of the thirty-second embodiment in that the envelope generator shown in FIG. 40 is provided in place of the memory portion 3701 shown in FIG. 38. Therefore, the synchronizing apparatus of this embodiment does not need the multiplier and memory that constitute the memory portion 3701, and thus is able to achieve high-speed input signals, and the reduction of the circuit scale and power consumption.

The envelope generator of the synchronizing apparatus of this embodiment has a subtracter 3901, a discriminator 3902, a selector 3903, a first bit-shifting device 3904 for performing the calculation of ¼ the input signal, a second bit-shifting device 3905 for performing the calculation of ⅛ the input signal, a first adder 3906, and a second adder 3907.

Figure 41A:
FIGS. 41A–41I are timing charts useful for explaining the operation of the receiver including the synchronizing apparatus of the thirty-third embodiment of the present invention.
Figure 41B:
Figure 41C:
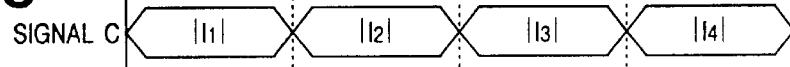
Figure 41D:
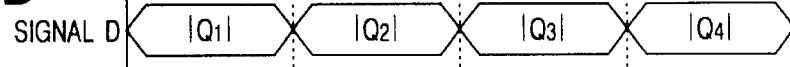
Figure 41E:
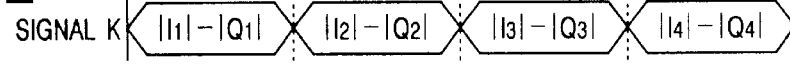
Figure 41F:
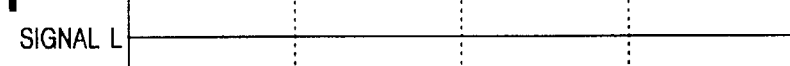
Figure 41G:
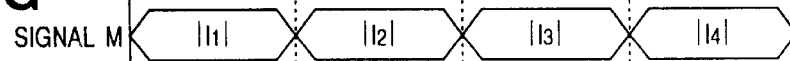
Figure 41H:
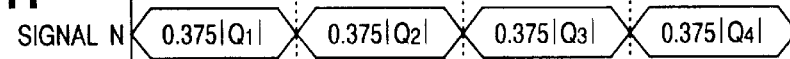
Figure 41I:
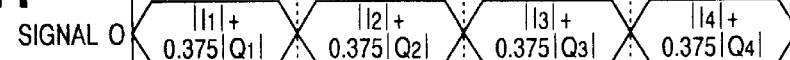

The operation of the receiver including the synchronizing apparatus of this embodiment will be described with reference to FIGS. 41A–41I. The signals A, B, C and D shown in FIGS. 41A, 41B, 41C and 41D are the same as those shown in FIGS. 39A, 39B, 39C and 39D. The signal K shown in FIG. 41E is the difference between signals C and D, the signal L in FIG. 41F is a control signal for the selector 3903, the signal M in FIG. 41G is a larger-amplitude one of the signals C and D, the signal N in FIG. 41H is the lower-amplitude one multiplied by 0.375, and the signal O in FIG. 41I is the envelope signal.

The envelope information Z can be approximately expressed by the following equations using the in-phase signal I and quadrature signal Q.

$$\text{When } |I| > |Q|, \; Z = |I| + 0.375 \cdot |Q| \tag{8.1}$$

$$\text{When } |I| < |Q|, \; Z = |Q| + 0.375 \cdot |I| \tag{8.2}$$

where the terms of 0.375 (=0.25+0.125) can be calculated by the first and second bit-shifting devices 3904, 3905 and the second adder 3906.

Figure 42:
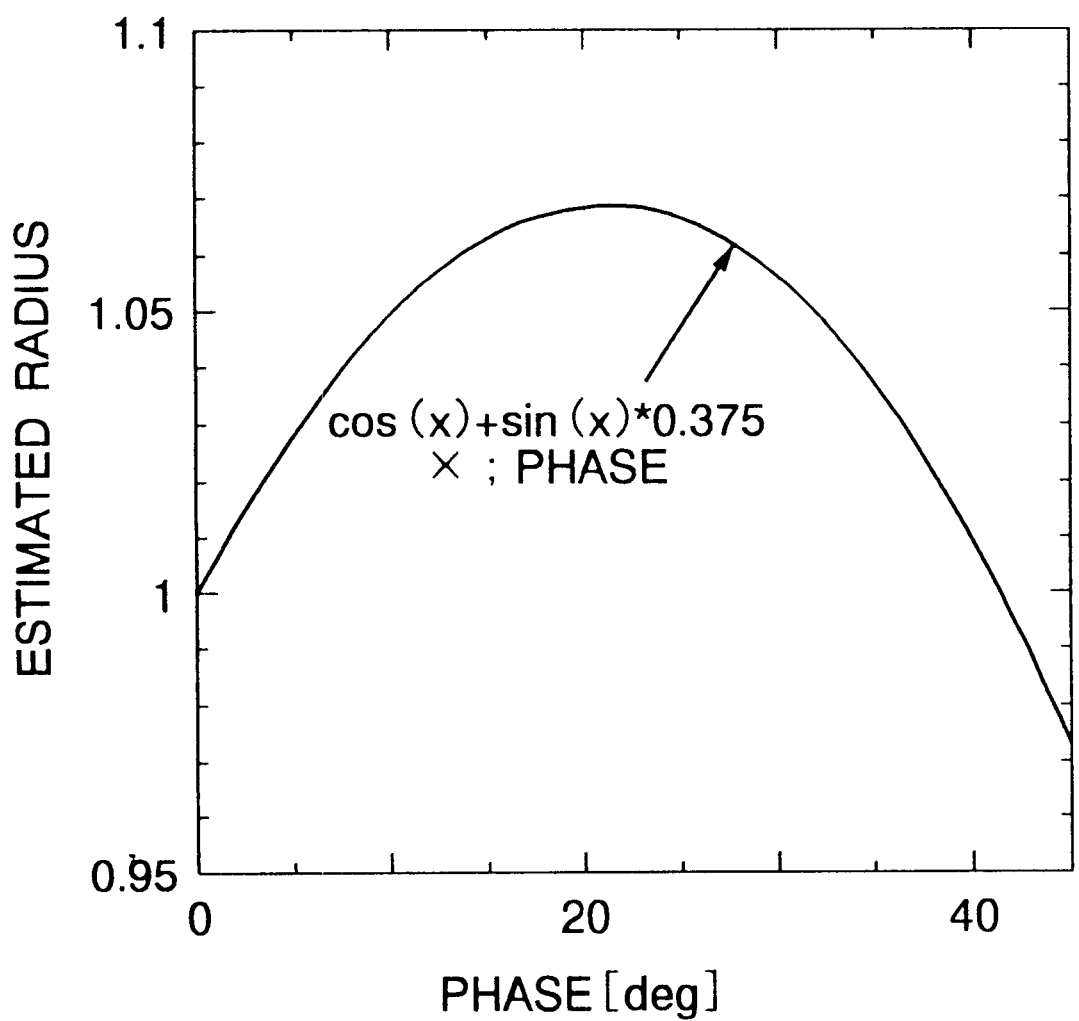
FIG. 42 is a graph showing the theoretically calculated results of the relation between the envelope information and the phases of in-phase signal and quadrature signal.

FIG. 42 shows the results of the theoretical calculation of the relation between the envelope information Z and the phases of the in-phase input signal I and quadrature input signal Q. The envelope information Z can be generated within error of 7% from the equations (8.1) and (8.2).

The subtracter 3901 makes subtraction between the absolute values of the I and Q signals, thereby producing the signal K. The discriminator 3902 decides the sign of the signal K, thus producing the control signal L for the selector 3903. In other words, when the sign of the signal K is positive, the absolute value (signal C) of the in-phase input signal I is supplied as the signal M from the selector 3903 to the first adder 3907. In addition, the absolute value (signal D) of the quadrature input signal Q is supplied as the signal n from the selector 3903 to the first and second bit-shifting devices 3904, 3905. When the sign of the signal K is negative, the absolute value (signal D) of the quadrature input signal Q is supplied as the signal M from the selector 3903 to the first adder 3907. Also, the absolute value (signal C) of the in-phase input signal I is supplied as the signal n from the selector 3903 to the first and second bit-shifting devices 3904, 3905. After the signal n is multiplied by 0.125 and 0.25 in the first and second bit-shifting devices 3904, 3905, the output signals from the devices 3904, 3905 are added by the second adder 3906, which then produces the signal N. The signals M and N are further added by the first adder 3907, which then produces the envelope signal O.

Figure 43:
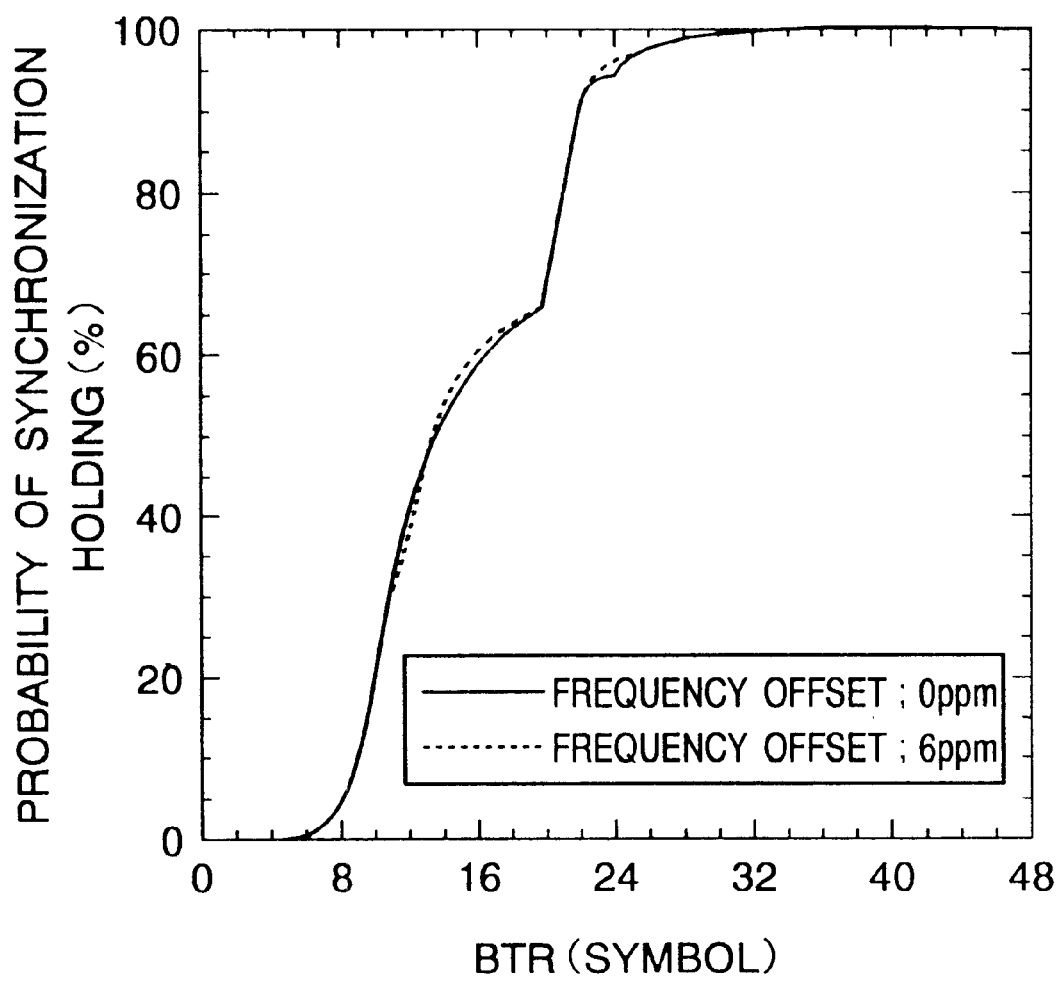
FIG. 43 is a graph showing the simulated results of the synchronization pull-in characteristic in the synchronizing apparatus of the thirty-third embodiment of the present invention.
Figure 44:
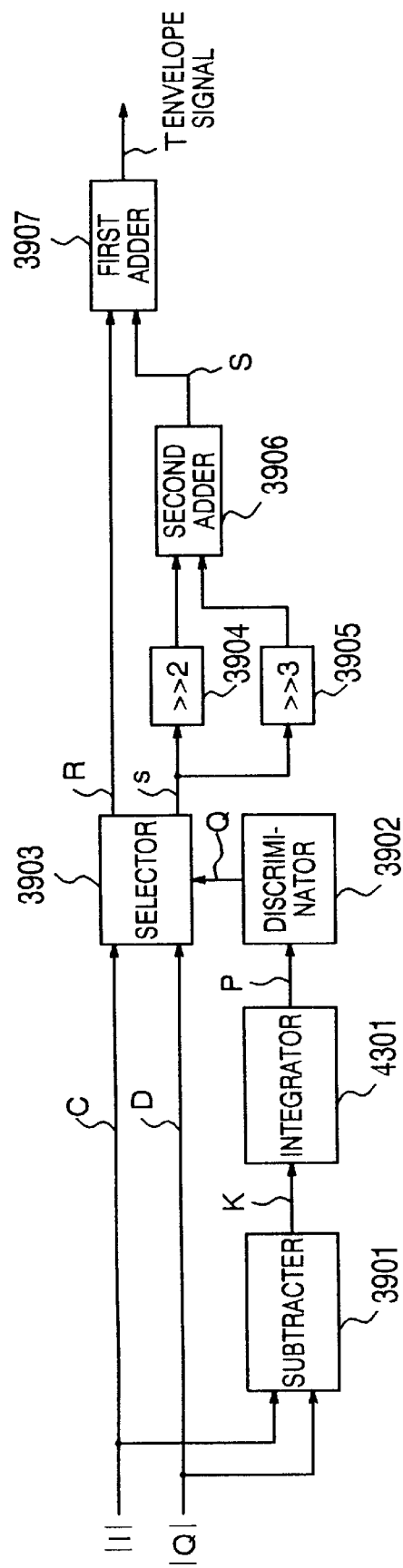
FIG. 44 is a block diagram of an envelope generator included in a synchronizing apparatus of a thirty-fourth embodiment of the present invention.

FIG. 43 shows the simulated results of the synchronization pull-in characteristic of the synchronizing apparatus of this embodiment. The frequency offset added in this simulation is only 6 ppm of the received frequency (since the standard value is 3 ppm, the frequency offset is 6 ppm, maximum in transmission and reception). From the results, it will be seen that the synchronization pull-in characteristic is almost not dependent on the presence of frequency offset. In addition, a slight characteristic difference due to the approximation in the envelope information generation is negligibly small.

(Thirty-fourth Embodiment)

The receiver of a digital mobile communication system including the synchronizing apparatus of the thirty-fourth embodiment of the present invention is different from that of the thirty-third embodiment in that an integrator 4301 is provided between the subtracter 3901 and discriminator 3902 of the envelope generator. In other words, according to the synchronizing apparatus of this embodiment, the envelope generator compares the absolute values of the in-phase and quadrature input signals I, Q by use of a signal of the integration of the difference between the absolute values of the I, Q signals, thereby increasing the envelope generation precision.

Figure 45A:
FIGS. 45A–45J are timing charts to which reference are made in explaining the operation of the synchronizing apparatus of the thirty-fourth embodiment of the present invention.
Figure 45B:
Figure 45C:
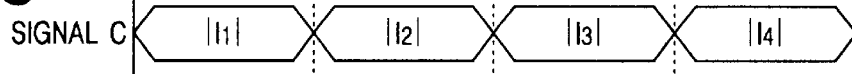
Figure 45D:
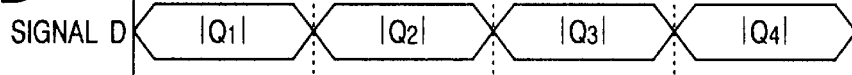
Figure 45E:
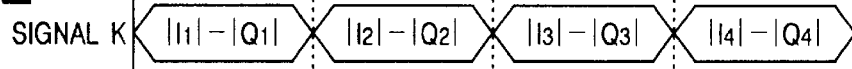
Figure 45F:
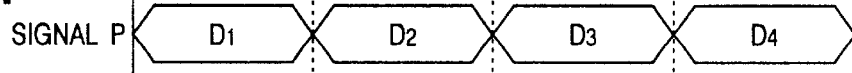
Figure 45G:
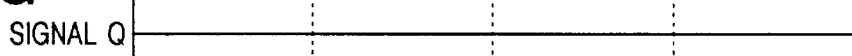
Figure 45H:
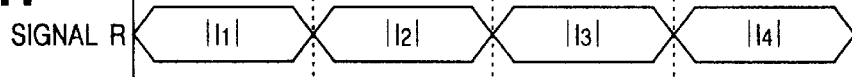
Figure 45I:
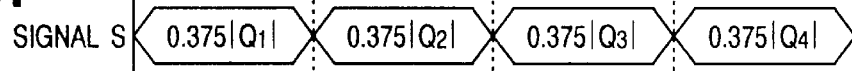
Figure 45J:
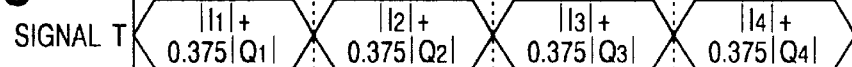

The operation of the receiver including the synchronizing apparatus of this embodiment will be described with reference to FIGS. 45A–45J. The signals A, B, C, D and K shown in FIGS. 45A, 45B, 45C, 45D and 45E are the same as those in FIGS. 41A, 41B, 41C, 41D and 41E. The signal P shown in FIG. 45F indicates the result of the integration of signal K. The signal Q shown in FIG. 45G is a control signal for the selector 3903. The signal R shown in FIG. 45H is a larger-amplitude one of the signals C and D. The signal shown in FIG. 45I is the smaller-amplitude one multiplied by 0.375. The signal T shown in FIG. 45J is the envelope signal.

The subtracter 3901 makes subtraction between the absolute values of the in-phase input signal I and quadrature input signal Q, thus producing the signal K. The integrator 4301 integrates the signal K, thus producing the signal P. The discriminator 3902 decides the sign of the signal P, thus producing the control Q for the selector 3903. In other words, when the sign of the signal K is positive, the absolute value (signal C) of the in-phase input signal I is supplied as the signal R from the selector 3903 to the first adder 3907. Also, the absolute value (signal D) of the quadrature input signal Q is supplied as the signal s from the selector 3903 to the first and second bit-shifting devices 3904, 3905. When the sign of the signal P is negative, the absolute value (signal D) of the quadrature input signal Q is supplied as the signal R from the selector 3903 to the first adder 3907. In addition, the absolute value (signal C) of the in-phase input signal I is supplied as the signal s from the selector 3903 to the first and second bit-shifting devices 3904, 3905. After the first and second bit-shifting devices 3904, 3905 multiply the signal s by 0.125 and 0.25, respectively, the second adder 3906 adds the output signals from the devices 3904, 3905, thus producing the signal S. The first adder 3907 adds the signals R and S, thus producing the envelope signal T.

(Thirty-fifth Embodiment)

The receiver of a digital mobile communication system including the synchronizing apparatus of the thirty-fifth embodiment of the present invention is different from that of the thirty-second embodiment in that two selectors (second and third selectors 4501, 4502) and two memory portions (first and second memory portions 4503, 4504) are provided in place of the memory portion 3701 and second selector 1610 shown in FIG. 38. In other words, according to the synchronizing apparatus of this embodiment, the first and second memory portions 4503, 4504 as the envelope generator are operated at the same sampling speed as the symbol rate, thus achieving fast symbol rate and low power consumption.

The operation of the receiver including the synchronizing apparatus of this embodiment will be described below with reference to FIG. 46. The operations up to where the signals of the absolute values of the in-phase and quadrature input signals 1601, 1602 are produced from the first and second absolute value calculators 1606, 1607 are the same as those of the receiver including the synchronizing apparatus of the thirty-second embodiment. The signal indicating the absolute value of the in-phase input signal 1601 is supplied to the second selector 4501, which divides it into the odd-numbered samples and the even-numbered samples. The signal indicating the absolute value of the quadrature input signal 1602 is fed to the third selector 4502, which divides it into the odd-numbered samples and the even-numbered samples. The even-numbered samples of the absolute value signal of the in-phase input signal 1601 and the even-numbered samples of the absolute value signal of the quadrature input signal 1602 are supplied to the first memory portion 4503. The odd-numbered samples of the absolute value signal of the in-phase input signal 1601 and the odd-numbered samples of the absolute value signal of the quadrature input signal 1602 are supplied-to the second memory portion 4504. The first memory portion 4503 has envelope information already stored. The envelope information is read out in accordance with the even-numbered samples of the absolute value of the in-phase input signal 1601 and the even-numbered samples of the absolute value of the quadrature input signal 1602. That is, the envelope information about the even-numbered samples is produced from the first memory portion 4503. The second memory portion 4504 has envelope information already stored. The envelope information is read out in accordance with the odd-numbered samples of the absolute value of the in-phase input signal 1601 and the odd-numbered samples of the absolute value of the quadrature input signal 1602. That is, the envelope information about the odd-numbered samples is produced from the second memory portion 4504. The envelope information from the first memory portion 4503 is fed to the first integrator 1611, and the envelope information from the second memory portion 4504 is supplied to the second integrator 1612. The following operations are the same as those of the receiver including the synchronizing apparatus of the thirty-second embodiment.

(Thirty-sixth Embodiment)

Figure 46:
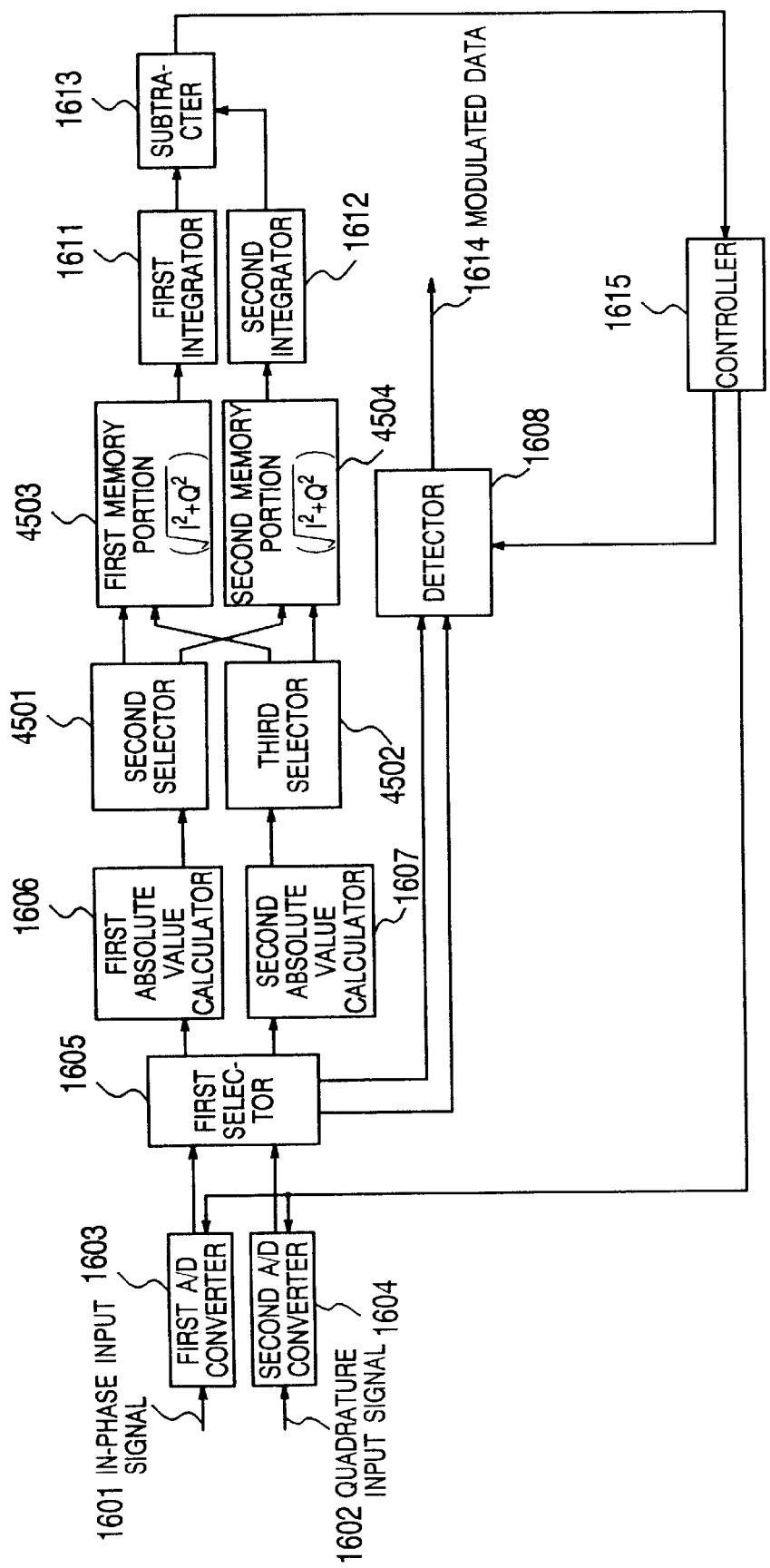
FIG. 46 is a block diagram of a receiver including a synchronizing apparatus of a thirty-fifth embodiment of the present invention.

The receiver of a digital mobile communication system including the synchronizing apparatus of the thirty-sixth embodiment of the present invention is different from that of the thirty-fifth embodiment in that four absolute value calculators (first to fourth absolute value calculators 4601–4604) are provided in place of the two absolute value calculators (the first and second absolute value calculators 1606, 1607) shown in FIG. 46, and that two selectors (second and third selectors 4501, 4502) are provided between the first selector 1605 and the four absolute value calculators (the first to fourth absolute value calculators 4601–4604). In other words, according to the synchronizing apparatus of this embodiment, the first to fourth absolute value calculators 4601–4604 and the first and second memory portions 4503, 4504 as the envelope generator are operated at the same sampling speed as the symbol rate, thereby achieving faster symbol rate and lower power consumption than in the synchronizing apparatus of the thirty-fifth embodiment.

Figure 47:
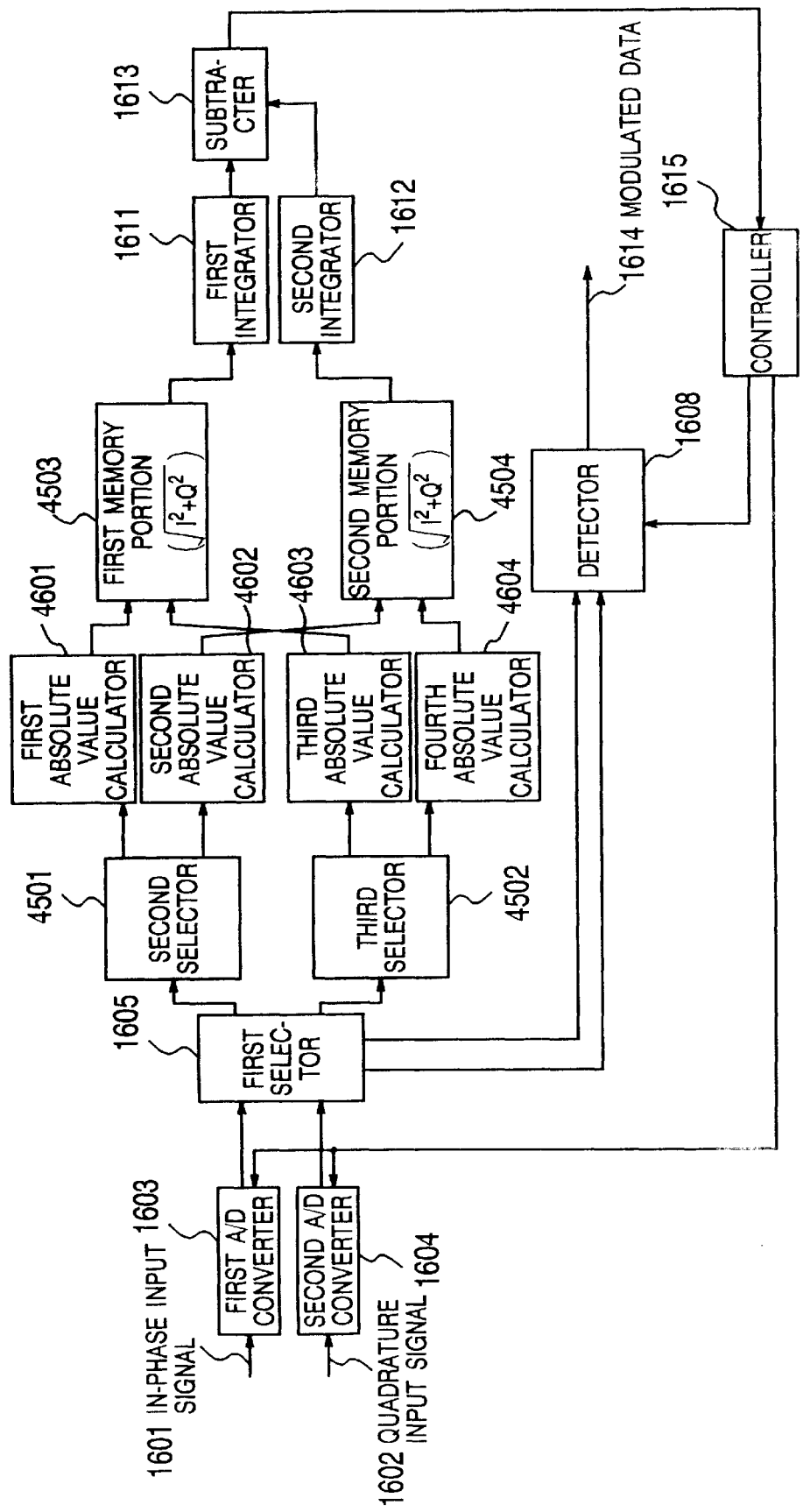
FIG. 47 is a block diagram of a receiver including a synchronizing apparatus of a thirty-sixth embodiment of the present invention.

The operation of the receiver including the synchronizing apparatus of this embodiment will be described with reference to FIG. 47. The operations up to the first selector 1605 are the same as those of the synchronizing apparatus of the thirty-fifth embodiment. The in-phase input signal 1601 from the first selector 1605 is fed to the second selector 4501, which divides it into the odd-numbered samples and the even-numbered samples. The quadrature input signal 1602 from the first selector 1605 is fed to the third selector 4502, which divides it into the odd-numbered samples and the even-numbered samples. The first absolute value calculator 4601 calculates the absolute values of the even-numbered samples of the in-phase input signal 1601. The second absolute value calculator 4602 calculates the absolute values of the odd-numbered samples of the in-phase input signal 1601. The third absolute value calculator 4603 calculates the absolute values of the even-numbered samples of the quadrature input signal 1602. The fourth absolute value calculator 4604 calculates the absolute values of the odd-numbered samples of the quadrature input signal 1602.

The signal indicating the absolute values of the even-numbered samples of the in-phase input signal 1601 from the first absolute value calculator 4601 and the signal indicating the absolute values of the even-numbered samples of the quadrature input signal 1602 from the third absolute value calculator 4603 are supplied to the first memory portion 4503. The signal indicating the absolute values of the odd-numbered samples of the in-phase input signal 1601 from the second absolute value calculator 4602 and the signal indicating the absolute values of the odd-numbered samples of the quadrature input signal 1602 from the fourth absolute value calculator 4604 are supplied to the second memory portion 4504. The following operations are the same as those of the receiver including the receiver of the thirty-fifth embodiment.

The present invention has the following effects.

(1) It is able to detect the zero-cross points of the received IF-band signal at N times the symbol rate, and establish the optimum symbol synchronization from the histogram to the detected time.

(2) Since the zero-cross histogram is detected, erroneous operation is not caused even if symbols of which the number corresponds to that of zero-cross points do not successively occur like information symbols.

(3) Even when the burst length is short or when the clock precision is very high, synchronization is established and maintained by a small number of symbols, and thus the synchronizing circuit can be stopped so that the consumption power can be reduced.

(4) Even when the burst length is long or when the clock precision is low, synchronization can be detected in information symbols, and thus synchronization tracking can be achieved by the addition of a simple circuit.

(5) Since synchronization acquisition can be performed by use of A/D converted data, more accurate synchronization position can be detected than when analog data is used before A/D conversion. It is effective when a serious problem may be caused by the difference between the times required for signals respectively to reach the synchronizing circuit and the A/D converter (particularly when the symbol rate is high). In addition, the synchronizing circuit can be achieved by a simple circuit using an adder.

(6) The synchronization pulling-in can be performed with high speed and high precision by integrating and comparing the absolute values of data sampled at different timings. Moreover, by detecting synchronization acquisition and automatically bringing about the synchronization holding state, it is possible to suppress jitter at the time of data demodulation, improve the error rate, and there is no need to make synchronization holding control. In this case, when there is a particular-pattern preamble, a synchronization pulling-in method specialized for that pattern can be used, and thus synchronization pulling-in can be made with high speed and high precision.

(7) According to the sixteenth embodiment, after the synchronization holding state is brought about, the sampling frequency of the A/D converter can be reduced to be the same frequency as the symbol rate of I, Q signal, thereby further reducing the consumption power.

(8) According to the seventeenth to nineteenth embodiments, since the sampling frequency can be reduced by use of the information of whether the I signal (or Q signal) after A/D conversion and I signal (Q signal) one sampling period ((symbol period)/2) after are in phase with each other or have opposite phases, the receiver can prevent synchronization from being erroneous immediately after the synchronization holding state is brought about.

(9) According to the twentieth embodiment, since the I, Q signals after A/D conversion undergo DC offset removal processing, higher-precision synchronization can be acquired.

(10) According to the twenty-first to twenty-third embodiments, it is also possible to acquire frame synchronization by integrating the demodulated data over the range corresponding to the number of data of preamble, and detecting the time at which the integrated value is the maximum.

(11) According to the twenty-fourth and twenty-fifth embodiments, since the thermal noise components can be further decreased, synchronization acquisition can be made with higher precision.

(12) According to the twenty-sixth and twenty-seventh embodiment, since the number of necessary integrators can be reduced to one, the circuit scale can be decreased to about ½ as small as the usual size.

(13) According to the twenty eighth embodiment, since the absolute value calculator and adder for calculating the sum of the absolute values of I signal and Q signal after A/D conversion are operated at the same sampling frequency as the signal transmission speed, the consumption power can be further reduced.

(14) According to the twenty-ninth to thirty-first embodiments, since the thermal noise components can be decreased without increasing the number of integrators, synchronization can be acquired with higher precision.

(15) According to the thirty-second and thirty-sixth embodiments, since synchronization acquisition is performed by use of the envelope signal, the synchronization acquisition characteristic can be prevented from being deteriorated by frequency offset.

What is claimed is:

1. A synchronizing apparatus comprising:
   means for detecting a code from an input signal;
   means for detecting from said code the variable points of said code at several times as high as a symbol rate;
   means for calculating a histogram of said detected variable points of said code to time; and
   means for deciding that a phase number at which said calculated histogram takes the maximum value is a symbol synchronization point.

2. A synchronizing apparatus according to claims 1, wherein after synchronization establishment, timing correction is performed by calculating said histogram at a position a certain phase unit before and after said synchronization establishment point, and detecting said associated correct phase number.

3. A synchronizing apparatus according to claim 2, wherein when the precision of frequency is known to be low, said phase number detection is more frequently made to follow synchronization, but when the precision of frequency is known to be high, said phase number detection is less frequently made.

4. A synchronizing apparatus according to claim 1, wherein synchronization acquisition is performed by use of analog-to-digital converted data.

5. A synchronizing apparatus according to claim 4, wherein when a synchronizing signal is a sine wave of which the phase is changed 180 degrees at each symbol, the absolute values of said analog-to-digital converted sampled data of in-phase and quadrature signals are added, respectively, and a more accurate one of said sums is selected.

6. A synchronizing apparatus according to claim 5, wherein when said synchronizing signal is a sine wave of which the phase is changed 180 degrees at each symbol, calculation is performed for the sums of the absolute values of each of said in-phase and quadrature signals in said sampled data sampled at four times as high as a symbol rate, selection is made for a pair of adjacent maximum values of a larger one of said in-phase and quadrature signals of which the levels are previously determined, calculation is again performed for the sums of the absolute values of said sampled data sampled at an intermediate timing therebetween, the resulting three values are compared, and the timing for the largest one is determined, thereby acquiring synchronization.

7. A synchronizing apparatus according to claim 6, wherein a pair of adjacent minimum values are selected, calculation is again performed for the sum of the absolute values of said sampled data sampled at an intermediate timing therebetween, the resulting three values are compared, and the timing for the smallest one is determined, thereby acquiring synchronization.

8. A synchronizing apparatus according to claim 5, wherein when said synchronizing signal is a sine wave of which the phase is changed 180 degrees at each symbol, calculation is performed for the sum of the absolute values of said sampled data of said in-phase and quadrature signals sampled at four times as high as a symbol rate, selection is performed for a pair of adjacent maximum values of said sum, calculation is performed for the sum of the absolute values of said sampled data sampled at an intermediate timing rate therebetween, the three resulting values are compared, and the timing for the largest one is determined, thereby acquiring synchronization.

9. A synchronizing apparatus according to claim 4, wherein when a synchronizing signal is a sine wave of which the phase is changed 180 degrees at each symbol, the absolute values of said analog-to-digital converted sampled data of in-phase and quadrature signals are added.

10. A synchronizing apparatus comprising:
    means for detecting a code from an input signal;
    latch means for detecting from said code the variable points of said code at several times as high as a symbol rate;
    means for calculating a histogram of said detected variable points of said code to time; and
    means for deciding that a phase number at which said calculated histogram first exceeds a threshold is a symbol synchronization point.

11. A synchronizing apparatus comprising:
    means for detecting a code from an input signal;
    latch means for detecting from said code the variable points of said code at several times as high as a symbol rate;
    means for calculating a histogram of the detected variable points of said code to time; and
    means for deciding that a phase number at which said calculated histogram first exceeds a threshold is a symbol synchronization point, and that when there is no phase number at which said calculated histogram exceeds said threshold within a certain detected time, a phase number at which said calculated histogram first exceeds the maximum value is a symbol synchronization point.

* * * * *